US012606442B2

(12) United States Patent
Gadikota

(10) Patent No.: US 12,606,442 B2
(45) Date of Patent: Apr. 21, 2026

(54) METHODS AND SYSTEMS FOR PRODUCING SOLID INORGANIC CARBONATE AND BICARBONATE COMPOUNDS

(71) Applicant: CORNELL UNIVERSITY, Ithaca, NY (US)

(72) Inventor: Greeshma Gadikota, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 455 days.

(21) Appl. No.: 18/044,003

(22) PCT Filed: Sep. 3, 2021

(86) PCT No.: PCT/US2021/049025
§ 371 (c)(1),
(2) Date: Mar. 3, 2023

(87) PCT Pub. No.: WO2022/051598
PCT Pub. Date: Mar. 10, 2022

(65) Prior Publication Data

US 2024/0051832 A1 Feb. 15, 2024

Related U.S. Application Data

(60) Provisional application No. 63/074,193, filed on Sep. 3, 2020.

(51) Int. Cl.

| | |
|---|---|
| ***C01D 7/00*** | (2006.01) |
| ***B01D 53/62*** | (2006.01) |
| ***C01B 32/50*** | (2017.01) |
| ***C01B 32/60*** | (2017.01) |
| ***C01D 7/16*** | (2006.01) |
| ***C01D 15/08*** | (2006.01) |
| ***C01F 11/18*** | (2006.01) |
| *C02F 1/46* | (2023.01) |

(52) U.S. Cl.
CPC .............. *C01B 32/60* (2017.08); *B01D 53/62* (2013.01); *C01B 32/50* (2017.08); *C01D 7/00* (2013.01); *C01D 7/16* (2013.01); *C01D 15/08* (2013.01); *C01F 11/18* (2013.01); *C02F 1/46* (2013.01)

(58) Field of Classification Search
CPC ............ C01B 32/60; C01D 7/16; B01D 53/62
See application file for complete search history.

(56) References Cited

U.S. PATENT DOCUMENTS

| | | | | |
|---|---|---|---|---|
| 7,972,747 | B2 * | 7/2011 | Fischel .................. | B01J 16/005 429/513 |
| 8,453,742 | B2 * | 6/2013 | Noui-Mehidi .......... | E21B 43/27 166/307 |
| 8,840,706 | B1 | 9/2014 | Srinivasachar | |
| 2009/0038955 | A1 | 2/2009 | Rau | |
| 2009/0143211 | A1 | 6/2009 | Riman et al. | |
| 2009/0301352 | A1 | 12/2009 | Constantz et al. | |
| 2010/0111810 | A1 | 5/2010 | Constantz et al. | |
| 2011/0158873 | A1 | 6/2011 | Riman et al. | |
| 2013/0108532 | A1 | 5/2013 | Idem et al. | |
| 2014/0356268 | A1 * | 12/2014 | Schraven ........... | B01D 53/1493 252/190 |
| 2016/0096773 | A1 | 4/2016 | Quinn et al. | |
| 2017/0106331 | A1 | 4/2017 | Aronu et al. | |
| 2018/0002240 | A1 | 1/2018 | Riman | |

FOREIGN PATENT DOCUMENTS

| | | |
|---|---|---|
| KR | 101447818 B1 | 10/2014 |

OTHER PUBLICATIONS

International Search Report and Written Opinion from PCT/US2021/049025, mailed Feb. 18, 2022.

Jo et al., "Cooling and Antisolvent Crystallization of Potassium Bicarbonate in the Presence of Sterically Hindered Alkanolamines," Clean Technology, 2014, vol. 20(4): pp. 383-389. Abstract only.

Donners et al., "Control over calcium carbonate phase formation by dendrimer/surfactant templates," Chemistry, 2002, vol. 8(11): pp. 2561-2567.

Rahmani, O. et al., "An experimental study of accelerated mineral carbonation of industrial waste red gypsum for CO2 Sequestration," Journal of CO2 Utilization, 2020, vol. 35: pp. 265-271.

Liu et al., "Single-Step, Low Temperature and Integrated CO2 Capture and 8 Conversions using Sodium Glycinate to Produce Calcium Carbonate", 2020.

Kwon et al., "Mineralization for $CO_2$ Sequestration Using Olivine Sorbent in the Presence of Water Vapor," Georgia Institute of Technology, Ph.D. Dissertation, 2011.

Kasturi et al., "Near-Term and Long-Term Carbon Dioxide Sequestration Potential in the United States using Bio-Energy with Carbon Capture and Storage," Geogia Institute of Technology, Ph.D. Dissertation, 2020.

(Continued)

*Primary Examiner* — Stuart L Hendrickson

(74) *Attorney, Agent, or Firm* — Heslin Rothenberg Farley & Mesiti P.C.

(57) ABSTRACT

The present disclosure includes a method of producing solid inorganic carbonate compounds by capturing, converting, and storing carbon dioxide comprising providing one or more precursor compound; providing one or more carbon dioxide capture solvent or capture additive; and reacting said one or more precursor compound with said one or more carbon dioxide capture solvent or capture additive under conditions effective to produce one or more solid inorganic carbonate compound. Also disclosed is a method of producing solid inorganic bicarbonate compounds by capturing, converting, and storing carbon dioxide comprising providing one or more precursor compound; providing one or more carbon dioxide capture solvent or capture additive; and reacting said one or more precursor compound with said one or more carbon dioxide capture solvent or capture additive under conditions effective to produce one or more solid inorganic bicarbonate compound. Also disclosed herein are systems for producing solid inorganic carbonate and bicarbonate compounds.

20 Claims, 35 Drawing Sheets

(56) References Cited

OTHER PUBLICATIONS

Kang et al., "Carbon fixation using calcium oxide by an aqueous approach at moderate conditions," Chemical Engineering Journal, 2014, vol. 245(15): pp. 200-207.
Long et al: "Integrated absorption-mineralisation for low-energy CO2 capture and sequestration", Applied Energy., vol. 225, Sep. 1, 2018 (Sep. 1, 2018), pp. 356-366, XP093314793, GB ISSN: 0306-2619, DOI: 10.1016/j.apenergy.2018.04.108.
Meishen et al: "Single-step, low temperature and integrated CO2 capture and conversion using sodium glycinate to produce calcium carbonate", Fuel, vol. 275, Sep. 1, 2020 (Sep. 1, 2020), p. 117887, XP093011023, GB ISSN: 0016-2361, DOI: 10.1016/j.fuel.2020.117887.
Extended European Search Report in European Application No. 21865173.5, 10 pages. Oct. 8, 2025.
Liu et al., "Integrated $CO_2$ Capture, Conversion, and Storage To Produce Calcium Carbonate Using an Amine Looping Strategy," Energy Fuels, 2018, vol. 33(3): pp. 1722-1733.
Arti et al., "Single Process for $CO_2$ Capture and Mineralization in Various Alkanolamines Using Calcium Chloride," Energy Fuels, 2017, vol. 31(1): pp. 763-769. Abstract only.
Murnandari et al., "Effect of process parameters on the $CaCO_3$ production in the single process for carbon capture and mineralization," Korean Journal of Chemistry Engineering, 2017, vol. 34: pp. 935-941. Abstract only.
Gadikota, G., "Commentary: Ex Situ Aqueous Mineral Carbonation," Frontiers in Energy Research, 2016, vol. 6:21.
Gerdemann et al., "Ex-Situ and In-Situ Mineral Carbonation as a Means to Sequester Carbon Dioxide," DOE/ARC-2004031, 2004, 17 pages.
Brethomé et al., "Direct air capture of $CO_2$ via aqueous-phase absorption and crystalline-phase release using concentrated solar power," Nature Energy, 2018, vol. 3: pp. 553-559. Abstract only.
Garrabrant et al., "Energy-Efficient $CO_2$ Capture from Flue Gas by Absorption with Amino Acids and Crystallization with a Bis-Iminoguanidine," Industrial & Engineering Chemistry Research, 2019, vol. 58: pp. 10510-10515. Abstract only.
Custecean et al., "Direct Air Capture of $CO_2$ with Aqueous Amino Acids and Solid Bis-iminoguanidines (BIGs)," Industrial & Engineering Chemistry Research, 2019, vol. 58: pp. 23338-23346. Abstract only.
Milella et al., "Estimating speciation of aqueous ammonia solutions of ammonium bicarbonate: application of least square methods to infrared spectra✓," Reaction Chemistry & Engineering, 2019, vol. 4: pp. 1284-1302.
Davis et al., "A vibrational-spectroscopic study of the species present in the $CO_2$ —$H_2O$ system," Journal of Solution Chemistry, 1972, vol. 1: pp. 329-339. Abstract only.
Pretsch et al., "Structure Determination of Organic Compounds," Berlin: Springer-Verlag, 2000, 443 pages.
Hisatsune, C., "Low-temperature infrared study of ammonium carbamate formation," Canadian Journal of Chemistry, 1984, vol. 62(5): pp. 945-948.
Chessin et al., "Position and Thermal Parameters of Oxygen Atoms in Calcite,"Acta Crystallographica, 1965, vol. 18 (4): pp. 689-593. p. 689 only.
Wang et al., "Structure and carbonate orientation of vaterite ($CaCO_3$)," American Mineralogist, 2009, vol. 94: pp. 380-386.
Dal Negro et al., "Refinement of the Crystal Structure of Aragonite," American Mineralogist, 1971, vol. 56(5-6): pp. 768-772. Abstract only.
Primak et al., "X-Ray Diffraction Studies of Systems Involved in the Preparation of Alkaline Earth Sulfide and Selenide Phosphors1," Journal of the American Chemical Society, 1948, vol. 70(6): pp. 2043-2043. p. 2043 only.
Petch et al., "The Hydrogen Positions in Portlandite, Ca(OH)2+ as Indicated by the Electron Distribution," Acta Crystallographica, 1961, vol. 14(9): pp. 950-957. p. 950 only.
Hu et al., "Carbon dioxide capture by solvent absorption using amino acids: A review," Chinese Journal of Chemical Engineering, 2018, vol. 26(11): pp. 2229-2237. Abstract only.
Guo et al., "Amino Acids as Carbon Capture Solvents: Chemical Kinetics and Mechanism of the Glycine + $CO_2$ Reaction," Energy Fuels, 2013, vol. 27(7): pp. 3898-3904. Abstract only.
Zhang et al., Absorption of $CO_2$ by amino acid-functionalized and traditional dicationic ionic liquids: Properties, Henry's law constants and mechanisms, Chemical Engineering Journal, 2013, vol. 214: pp. 355-363. Abstract only.
Frasco, D. L., "Infrared Spectra of Ammonium Carbamate and Deuteroammonium Carbamate," The Journal of Chemical Physics, 1964, vol. 41: pp. 2134. Abstract only.
Daval et al., "The effect of silica coatings on the weathering rates of wollastonite ($CaSiO_3$) and forsterite ($Mg_2SiO_4$): An apparent paradox?", 2010, Water-Rock Interaction, pp. 713-717.
Daval et al., "Linking nm-scale measurements of the anisotropy of silicate surface reactivity to macroscopic dissolution rate laws: new insights based on diopside," Geochimica et Cosmochimica Acta, 2013, vol. 107: pp. 121-134.
Palandri et al., A Compilation of Rate Parameters of Water-Mineral Interaction Kinetics for Application to Geochemical Modeling, U.S. Geological Survey, 2004, 72 pages.
Weyl, P.K. "The change in solubility of calcium carbonate with temperature and carbon dioxide content," Geochimica et Cosmochimica Acta, 1959, vol. 17(3-4): pp. 214-225. Abstract only.
Muller et al., "Crystal Structure Refinement: A Crystallographer's Guide to SHELXL", Oxford University Press, abstract only. Jul. 13, 2006.

* cited by examiner

Monoethanolamine (MEA)
Primary amine

Diethanolamine (DEA)
Secondary amine

Methyldiethanolamine (MDEA)
Tertiary amine

Piperazine
Cyclical amine

2-Amino-2-methyl-1-propanol (AMP)
Hindered amine

Sodium glycinate
Amino acid salt

METHODS AND SYSTEMS FOR PRODUCING SOLID INORGANIC CARBONATE AND BICARBONATE COMPOUNDS

This application is a national stage filing under section 371 of International Application No. PCT/US2021/049025, filed on Sep. 3, 2021, and published on Mar. 10, 2022 as WO 2022/051598, which claims benefit of U.S. Provisional Patent Application Ser. No. 63/074,193, filed Sep. 3, 2020. The entire contents of WO 2022/051598 and U.S. Provisional Patent Application Ser. No. 63/074,193 are hereby incorporated by reference herein.

GOVERNMNET RIGHTS STATEMENT

This invention was made with government support under DE-AR0001608 and DE-EE0009391 awarded by the U.S. Department of Energy. The government has certain rights in the invention.

FIELD

The present disclosure relates to methods and systems for producing solid inorganic carbonate and bicarbonate compounds.

BACKGROUND

Rising anthropogenic carbon emissions to the atmosphere to the order of 35,000 million metric tons of $CO_2$ and the heterogeneity in gaseous waste streams call for the development of adaptive and transformative technologies for integrated $CO_2$ capture, utilization and storage. National Academies of Sciences Engineering and Medicine, *Gaseous Carbon Waste Streams Utilization: Status and Research Needs* (2019). Carbon mineralization which involves converting $CO_2$ to water insoluble and stable Ca- and Mg-carbonates is a thermodynamically downhill pathway for the integrated capture, utilization and storage of $CO_2$. National Academies of Sciences Engineering and Medicine, *Gaseous Carbon Waste Streams Utilization: Status and Research Needs* (2019); Liu & Gadikota, "Probing the Influence of Thermally Induced Structural Changes on the Microstructural Evolution in Shale Using Multiscale X-ray Scattering Measurements," *Energy & Fuels* 32:8193-8201 (2018); Liu & Gadikota, "Chemo-morphological Coupling During Serpentine Heat Treatment for Carbon Mineralization," *Fuel* 227:379-385 (2018); Gerdemann et al., "Ex Situ Aqueous Mineral Carbonation," *Environ. Sci. Technol.* 41:2587-2593 (2007); Lackner et al., "Progress on Binding $CO_2$ in Mineral Substrates," *Energy Convers. Manag.,* 38:S259-S264 (1997); K. S. Lackner, "Carbonate Chemistry for Sequestering Fossil Carbon," *Annual Review of Energy and the Environment* 27:193-232 (2011); Park et al., "$CO_2$ Mineral Sequestration: Chemically Enhanced Aqueous Carbonation of Serpentine," *Can. J. Chem. Eng.* 81:885-890 (2003); Park et al., "$CO_2$ Mineral Sequestration: Physically Activated Dissolution of Serpentine and pH Swing Process," *Chemical Engineering Science* 59:5241-5247 (2004); Liu & Gadikota, "Integrated $CO_2$ Capture, Conversion, and Storage To Produce Calcium Carbonate Using an Amine Looping Strategy," *Energy & Fuels* 33:1722-1733 (2018); Liu & Gadikota, "Phase Evolution and Textural Changes During the Direct Conversion and Storage of $CO_2$ to Produce Calcium Carbonate From Calcium Hydroxide," *Geosciences* 8:445 (2018); Gadikota et al., "Chemical and Morphological Changes During Olivine Carbonation for $CO_2$ Storage in the Presence of NaCl and $NaHCO_3$," *Phys. Chem. Chem. Phys.* 10:4679-4693 (2014); Gadikota & Park, ACCELERATED CARBONATION OF CA- AND MG-BEARING MINERALS AND INDUSTRIAL WASTES USING $CO_2$, 115-137 (2015); Gadikota et al., in ADVANCES IN $CO_2$ CAPTURE, SEQUESTRATION, AND CONVERSION, eds. F. Jin, L. N. He and Y. H. Hu, American Chemical Society, 295-322 (2015); Gadikota et al., "In Situ Angstrom-to-Micrometer Characterization of the Structural and Microstructural Changes in Kaolinite on Heating Using Ultrasmall-Angle, Small-Angle, and Wide-Angle X-ray Scattering (USAXS/SAXS/WAXS)," *Ind. Eng. Chem. Res.,* 56:11791-11801 (2017); Gadikota & Park, "Accelerated Carbonation of Ca- and Mg-bearing Minerals and Industrial Wastes Using $CO_2$," in CARBON DIOXIDE UTILISATION 115-137 (2015); G. Gadikota, "*Geo-chemo-physical Studies of Carbon Mineralization for Natural and Engineered Carbon Storage*," Doctoral Thesis, Columbia University (2014); and Power et al., "Carbon Mineralization: From Natural Analogues to Engineered Systems," *Rev. Mineral. Geochemistry* 77:305-360 (2013). Ca- and Mg-bearing alkaline feedstocks include earth abundant silicate-rich minerals such as olivine ($(Mg,Fe)_2SiO_4$), wollastonite ($CaSiO_3$), and serpentine ($(Mg,Fe)_3Si_2O_5(OH)_4$), and alkaline industrial residues such as coal, fly ash, steel slag, cement kiln dust, and red mud. Bobicki et al., "Carbon Capture and Storage Using Alkaline Industrial Wastes," *Prog. Energy Combust. Sci.* 38:302-320 (2012); Salman et al., "Effect of Accelerated Carbonation on AOD Stainless Steel Slag for its Valorisation as a $CO_2$-sequestering Construction Material," *Chem. Eng. J.* 246:39-52 (2014); Huntzinger et al., "Carbon Dioxide Sequestration in Cement Kiln Dust Through Mineral Carbonation," *Environ. Sci. Technol.* 43:1986-1992 (2009); and Yadav et al., "Sequestration of Carbon Dioxide $CO_2$ Using Red Mud," *J Hazard Matter.* 176:1044-1052 (2010).

Broadly, two main approaches have been developed for the accelerated conversion of $CO_2$ to Ca- and Mg-carbonates. In the first approach, high purity silica and carbonates are produced through the sequential use of acids and bases. Acids are used for extracting Ca and Mg ions into the aqueous phase with concurrent production of silica. Bases are then used to increase pH and enhance the generation of carbonate ions for producing Ca- and Mg-carbonates. Park et al., "$CO_2$ Mineral Sequestration: Chemically Enhanced Aqueous Carbonation of Serpentine," *Can. J. Chem. Eng.* 81:885-890 (2003); Park et al., "$CO_2$ Mineral Sequestration: Physically Activated Dissolution of Serpentine and pH Swing Process," *Chemical Engineering Science* 59:5241-5247 (2004); Gadikota & Park, "Accelerated Carbonation of Ca- and Mg-bearing Minerals and Industrial Wastes Using $CO_2$," in CARBON DIOXIDE UTILISATION 115-137 (2015); Sanna et al., "A Review of Mineral Carbonation Technologies to Sequester $CO_2$," *Chem Soc Rev.* 43:8049-8080 (2014); Fargerland et al., "An Experimental Study of $Mg(OH)_2$," *Int. J. Greenh. Gas Control* 5:1406-1412 (2011); and Eloneva et al., "Ammonium Salt-based Steelmaking Slag Carbonation: Precipitation of $CaCO_3$ and Ammonia Losses Assessment," *Greenh. Gases Sci. Technol.* 1:305-311 (2011). This approach facilitates the production of high purity silica and Ca- and Mg-carbonates. Another approach involves using elevated temperatures greater than 90° C. and high $CO_2$ pressures greater than 50 atm to accelerate carbon mineralization. Gerdemann et al., "Ex Situ Aqueous Mineral Carbonation," *Environ. Sci. Technol.* 41:2587-2593 (2007); Gadikota & Park, ACCELERATED CARBONATION OF CA- AND MG-BEARING MINERALS AND INDUSTRIAL WASTES USING $CO_2$, 115-137 (2015); and Gadikota & Park, "Accelerated Carbonation of Ca- and Mg-bearing Minerals and Industrial Wastes Using $CO_2$," in Carbon Dioxide Utilisation 115-137 (2015). Several rate limiting steps such as $CO_2$ hydration, mineral dissolution and carbonate precipitation are overcome at these experimental conditions. For example, elevated $CO_2$ pressures enable enhanced $CO_2$ solvation in the aqueous phase. Duan et al., "An Improved Model Calculating $CO_2$ Solubility in Pure Water and Aqueous NaCl Solutions from 273 to 533 K and from 0 to 2000 Bar," *Chem. Geol.* 193:257-271 (2003) and Duan et al., "An Improved Model for the Calculation of $CO_2$ Solubility in Aqueous Solutions Containing Na+, K+, Ca2+, Mg2+, Cl−, SO42−," *Mar. Chem.* 92:131-139 (2006). Elevated temperatures accelerate dissolution of Ca- and Mg-bearing silicate minerals. Chen et al., "Dissolution of Forsteritic Olivine at 65° and 2<pH<5," *Chem. Geol.* 165:267-281 (2000); Wogelius et al., "Olivine Dissolution Kinetics at Near-surface Conditions," *Chem. Geol.* 97:101-112 (1992); Awad et al., "Forsteritic Olivine: Effect of Crystallographic Direction on Dissolution Kinetics," *Geochim. Cosmochim.* 10:1765-1772 (2000); Liu et al., "Mechanism for the Dissolution of Olivine Series Minerals in Acidic Solutions," *Am. Mineral.* 91:455-458 (2006); and Hänchen et al., "Validation a Population Balance Model for Olivine Dissolution," *Chem. Eng. Sci.* 22:6413-6422 (2007). The solubility of Ca- and Mg-carbonates decreases with increasing temperature which aids the precipitation of Ca- and Mg-carbonates. Ellis, A. J., "The Solubility of Calcite in Carbon Dioxide Solutions," *Am. J. Sci.* 257:354-365 (1959); Werner et al., "Flue Gas $CO_2$ Mineralization Using Thermally Activated Serpentine: From Single- to Double-Step Carbonation," *Phys. Chem. Chem. Phys.* 16:24978-24993 (2014); and White, "Chemistry and Karst," *Acta Carsologica* 44:349-362 (2015).

The motivation for exploring low temperature hydrothermal routes for enhanced carbon mineralization emerges from the high temperature and pressure associated with direct gas-solid reaction routes. Complete conversion of $Mg(OH)_2$ to magnesium carbonate is achieved at reaction temperature of 500° C. and $CO_2$ partial pressure of 340 bar in less than two hours. Lackner et al., "Progress on Binding $CO_2$ in Mineral Substrates," *Energy Convers. Manag.*, 38:S259-S264 (1997). About 30% conversion of serpentine to magnesium carbonate is achieved at 340 bar and temperatures in the range of 140 to 300° C. Lackner et al., "Progress on Binding $CO_2$ in Mineral Substrates," *Energy Convers. Manag.*, 38:S259-S264 (1997). In comparison, hydrothermal pathways reported by Gerdemann and co-workers (Gerdemann et al., "Ex Situ Aqueous Mineral Carbonation," *Environ. Sci. Technol.* 41:2587-2593 (2007)) and Gadikota and co-workers (Gadikota et al., "Chemical and Morphological Changes During Olivine Carbonation for $CO_2$ Storage in the Presence of NaCl and $NaHCO_3$," *Phys. Chem. Chem. Phys.* 10:4679-4693 (2014)) show that about 80% or higher conversion of olivine bearing 47.3 wt % MgO is converted to $MgCO_3$ at experimental conditions of 185° C., 1.0 M NaCl+0.64 M $NaHCO_3$, 15 wt % solid, $pCO_2$ of 150 atm or 139 atm at reaction times of 5 hours or greater. As reported by Gerdemann and co-workers, these high temperatures and $CO_2$ partial pressure requirements contribute to the high energy needs for carbon mineralization.

Efforts to accelerate carbon mineralization at lower temperatures and using flue gas streams led to the exploration of pathways to decouple $CO_2$ solubility, mineral dissolution and carbonate precipitation steps. To overcome the challenge of low solubility of $CO_2$ in water, additives such as carbonic anhydrase have been proposed. Vinoba et al., "Capture and Sequestration of $CO_2$ by Human Carbonic Anhydrase Covalently Immobilized onto Amine-Functionalized SBA-15," *J. Phys. Chem C.* 115:20209-20216 (2011); Power et al., "Accelerating Mineral Carbonation Using Carbonic Anhydrase," *Environ. Sci. Technol.* 50:2610-2618 (2016); and Sahoo et al., "Enhanced Biomimetic $CO_2$ Sequestration and $CaCO_3$ Crystallization Using Complex Encapsulated Metal Organic Framework," *J. Cryst. Growth* 373:96-101 (2013). The use of organic ligands such as oxalate, citrate or acetate were proposed to enhance mineral dissolution. Zhao et al., "Turning the Dissolution Kinetics of Wollastonite via Chelating Agents for $CO_2$ Sequestration With Integrated Synthesis of Precipitated Calcium Carbonates," *Phys. Chem. Chem.* 36:15185-15192 (2013) and Xue et al., "Dissolution and Mineralization of Plasma-Sprayed Wollastonite Coatings with Different Crystallinity," *Surf. Coatings Technol.* 200:2420-2427 (2005). Seeding surfaces of calcite and magnesite were found to aid the accelerated precipitation of the same phases. Reddy et al., "Kinetics of Calcium Carbonate (Calcite)-Seeded Crystallization: Influence of Solid/Solution Ratio on the Reaction Rate Constant," *J. Colloid Interface Sci.* 80:171-178 (1981) and Bénézeth et al., "Experimental Determination of the Solubility Product of Magnesite at 50 to 200 C," *Chem Geol.* 286:21-31 (2011). However, these accelerated pathways were developed independently, without considering their intended influence on coupling multiple reactions for accelerated carbon mineralization. Therefore, the scientific challenge lies in accelerating "step change" advancements in carbon mineralization. This is achieved by synergistically coupling multiple reaction pathways to direct the synthesis of Ca- and Mg-carbonates at temperatures below 100° C. using dilute flue gas streams of $CO_2$.

Rising concentrations of $CO_2$ in the atmosphere and the unabated reliance on carbonaceous energy sources has called for advancing engineered pathways with quantifiable controls on the extent of $CO_2$ captured, converted and stored. As noted in the recent reports by the Intergovernmental Panel on Climate Change (IPCC), there is urgency in developing pathways to remove carbon from the atmosphere in addition to curbing $CO_2$ emissions into the atmosphere. National Academies of Sciences, Engineering, and Medicine, "Gaseous Carbon Waste Streams Utilization: Status and Research Needs," *National Academies Press* (2019); National Academies of Sciences, Engineering, and Medicine, "Negative Emissions Technologies and Reliable Sequestration," *National Academies Press* (2019); and Masson-Delmotte et al., "Global Warming of 1.5° C. An IPCC Special Report on the Impacts of Global Warming of 1.5° C. Above Pre-Industrial Levels and Related Global Greenhouse Gas Emission Pathways, in the Context of Strengthening the Global Response to the Threat of Climate Change, Sustainable Development, and Efforts to Eradicate Poverty," *World Meteorological Organization* (2018). One of the versatile pathways that can be engineered to remove $CO_2$ from air and capture $CO_2$ from flue gas streams is carbon mineralization, in which $CO_2$ is converted to inorganic carbonates. Park et al., "$CO_2$ Mineral Sequestration: Physically Activated Dissolution of Serpentine and pH Swing Process," *Chem. Eng. Sci.* 39:5241-5247 (2004); Swanson et al., "Directed Precipitation of Hydrated and Anhydrous Magnesium Carbonates for Carbon Storage," *Phys. Chem. Chem. Phys.* 16:23440-23450 (2014); Gadikota et al., "Experimental Design and Data Analysis for Accurate Estimation of Reaction Kinetics and Conversion for Carbon Mineralization," *Ind. Eng. Chem. Res.* 53:6664-6676 (2014); Zhao et al., "Tuning the Dissolution Kinetics of Wollastonite via Chelating Agents for $CO_2$ Sequestration With Integrated Synthesis of Precipitated Calcium Carbonates," *Phys. Chem. Chem. Phys.* 15:15185-15192 (2013); Gadikota et al., "Accelerated Carbonation of Ca- and Mg-Bearing Minerals and Industrial Wastes Using $CO_2$," *Carbon Dioxide Utilisation: Closing the Carbon Cycle* 115-137 (2015); Smit et al., "The Grand Challenges in Carbon Capture, Utilization, and Storage," *Front. Energy Res.* 2:55 (2014); Gadikota et al., "Carbonation of Silicate Minerals and Industrial Wastes and Their Potential Use as Sustainable Construction Materials," *Advances in $CO_2$ Capture, Sequestration, and Conversion* 1194:295-322 (2015); Pan et al., "An Overview: Reaction Mechanisms and Modelling of $CO_2$ Utilization via Mineralization," *Aerosol Air Qual. Res.* 18:829-848 (2018); Gupta et al., "Pilot-Scale Demonstration of the OSCAR Process for High-Temperature Multipollutant Control of Coal Combustion Flue Gas, Using Carbonated Fly Ash and Mesoporous Calcium Carbonate," *Ind. Eng. Chem. Res.* 45:5051-5060 (2007); Park et al., "$CO_2$ Mineral Sequestration: Chemically Enhanced Aqueous Carbonation of Serpentine," *Can. J. Chem. Eng.* 81:885-890 (2008); and Gadikota et al., "Chemical and Morphological Changes During Olivine Carbonation for $CO_2$ Storage in the Presence of NaCl and $NaHCO_3$," *Phys. Chem. Chem. Phys.* 16:4679-4693 (2014). Despite the thermodynamically downhill and environmentally benign characteristics of these pathways, conventional carbon mineralization pathways have been kinetically challenged. Lackner et al., "Capturing Carbon Dioxide from Air," *Carbon Capture and Storage: $CO_2$ Management Technologies* 364-376 (2001); Sivansen et al., "Enhanced $CO_2$ Absorption and Desorption in a Tertiary Amine Medium with a Carbonic Anhydrase Mimic," *J. Ind. Eng. Chem.* 52:287-294 (2017); Arti et al., "Single Process for $CO_2$ Capture and Mineralization in Various Alkanolamines Using Calcium Chloride," *Energy & Fuels* 31:763-769 (2017); Murnandari et al., "Effect of Process Parameters on the $CaCO_3$ Production in the Single Process for Carbon Capture and Mineralization," *Korean J. Chem. Eng.* 34:935-941 (2017); Vinoba et al., "$CO_2$ Absorption and Sequestration as Various Polymorphs of $CaCO_3$ Using Sterically Hindered Amine," *Langmuir* 29:15655-15663 (2013); Mirjafari et al., "Investigating the Application of Enzyme Carbonic Anhydrase for $CO_2$ Sequestration Purposes," *Ind. Eng. Chem. Res.* 46:921-926 (2007); Gadikota et al., "Multiphase Carbon Mineralization for the Reactive Separation of $CO_2$ and Directed Synthesis of $H_2$," *Nat. Rev. Chem.* 4:78-89 (2020); Gadikota et al., "Multiscale X-Ray Scattering for Probing Chemo-Morphological Coupling in Pore-to-Field and Process Scale Energy and Environmental Applications," *Small Angle Scattering and Diffraction,"* 71-84 (2018); Gadikota, "Connecting the Morphological and Crystal Structural Changes During the Conversion of Lithium Hydroxide Monohydrate to Lithium Carbonate Using Multi-Scale X-ray Scattering Measurements," *Minerals* 7:169 (2017); and Gadikota, "Commentary: Ex Situ Aqueous Mineral Carbonation," *Front. Energy Res.* 4:21 (2016). The slow kinetics may arise from the low solubility of $CO_2$ in water, dissolution of Ca- and Mg-bearing silicates to release Ca and Mg, or the precipitation of inorganic carbonates. Wang et al., "Carbon Dioxide Capture and Utilization—Closing the Carbon Cycle," *Energy & Fuels* 33:1693 (2019); Liu et al., "Integrated $CO_2$ Capture, Conversion, and Storage To Produce Calcium Carbonate Using an Amine Looping Strategy," *Energy & Fuels* 33:1722-1733 (2018); Liu et al., "Probing the Influence of Thermally Induced Structural Changes on the Microstructural Evolution in Shale using Multiscale X-ray Scattering Measurements," *Energy & Fuels* 32:8193-8201 (2018); Liu et al., "Phase Evolution and Textural Changes during the Direct Conversion and Storage of $CO_2$ to Produce Calcium Carbonate from Calcium Hydroxide," *Geosciences* 8:445 (2018); Liu et al., "Chemo-morphological Coupling During Serpentine Heat Treatment for Carbon Mineralization," *Fuel* 227:379-385 (2018); and Liu et al., "Novel Aqueous Amine Looping Approach for the Direct Capture, Conversion and Storage of $CO_2$ to Produce Magnesium Carbonate," *Sustain. Energy Fuels* 4:1265-1275 (2020). Projections indicating that $10^4$-$10^6$ gigatons of carbon can be stored via carbon mineralization motivated several research efforts to accelerate carbon mineralization behavior. Sanna et al., "Post-processing Pathways in Carbon Capture and Storage by Mineral Carbonation (CCSM) towards the Introduction of Carbon Neutral Materials," *Energy Environ. Sci.* 5:7781-7796 (2012) and Zhao et al., "Remediation of Stainless Steel Slag with MnO for $CO_2$ Mineralization," *Process Saf. Environ. Prot.* 127:1-8 (2019).

One of the earliest approaches investigated involved direct gas-solid reactions in which $CO_2$ was reacted with magnesium silicate minerals, such as olivine, serpentine, talc, and industrial waste, at temperatures as high as 300° C. and pressures as high as 50 atm. Gadikota et al., "Chemical and Morphological Changes During Olivine Carbonation for $CO_2$ Storage in the Presence of NaCl and $NaHCO_3$," *Phys. Chem. Chem. Phys.* 16:4679-4693 (2014); Maroto-Valer et al., "Activation of Magnesium Rich Minerals as Carbonation Feedstock Materials for $CO_2$ Sequestration," *Fuel Process. Technol.* 86:1627-1645 (2005); Lackner et al., "Progress on Binding $CO_2$ in Mineral Substrates," *Energy Convers. Manag.* 38:S259-S264 (1997); O'Connor et al., "Aqueous Mineral Carbonation: Mineral Availability, Pretreatment, Reaction Parametrics, and Process Studies," Final Report *DOE/ARC-TR*-004-002 (2004); Chizmeshya et al., "A Novel Approach to Mineral Carbonation: Enhancing Carbonation While Avoiding Mineral Pretreatment Process Cost," DOE Report *FG*26-04*NT*42124 (2007); Zhao et al., "Towards Carbon Sequestration Using Stainless Steel Slag via Phase Modification and Co-extraction of Calcium and Magnesium," *Process Saf. Environ. Prot.* 133:73-81 (2020); Zhao et al., "Recovery of Calcium and Magnesium Bearing Phases from Iron- and Steelmaking Slag for $CO_2$ Sequestration," *Process Saf. Environ. Prot.* 135:81-90 (2020). However, complete conversion to carbonates was challenging to achieve due to mass transfer limitations. Gadikota et al., "Accelerated Carbonation of Ca- and Mg-Bearing Minerals and Industrial Wastes Using $CO_2$," *Carbon Dioxide Utilisation: Closing the Carbon Cycle* 115-137 (2015); Gerdemann et al., "Ex Situ Aqueous Mineral Carbonation," *Enviorn. Sci. Technol.* 41:2587-2593 (2007); Werner et al., "Flue Gas $CO_2$ Mineralization using Thermally Activated Serpentine: From Single- to Double-Step Carbonation," *Phys. Chem. Chem. Phys.* 16:24978-24993 (2014); and Puxty et al., "Comparison of the Rate of $CO_2$ Absorption Into Aqueous Ammonia and Monoethanolamine," *Chem. Eng. Sci.* 65:915-922 (2010). Alternatively, gas-liquid-solid configurations were explored in which $CO_2$-water-Ca- or Mg-silicate minerals were reacted at temperatures in the range of 100-200° C. and $CO_2$ partial pressures in the range of 67-200 atm. Gadikota, "Commentary: Ex Situ Aqueous Mineral Carbonation," *Front. Energy Res.* 4:21 (2016); Werner et al., "Flue Gas $CO_2$ Mineralization using Thermally Activated Serpentine: From Single- to Double-Step Carbonation," *Phys. Chem. Chem. Phys.* 16:24978-24993 (2014); and Gadikota, G., "Geo-Chemo-Physical Stuide of Carbon Mineralization for Natural and Engineered Carbon Storage," PhD Thesis, Columbia University (2014). For example, 85% conversion of $Mg_2SiO_4$ (olivine) to $MgCO_3$ (magnesite) was noted at 185° C., reaction time of 3 hours, $pCO_2$ of 139 atm, and a fluid composition of 1.0 M NaCl+0.64 M $NaHCO_3$. Gadikota et al., "Experimental Design and Data Analysis for Accurate Estimation of Reaction Kinetics and Conversion for Carbon Mineralization," *Ind. Eng. Chem. Res.* 53:6664-6676 (2014). Complete conversion of CaSiO3 (wollastonite) to calcium carbonate was achieved at 100° C., $pCO_2$ of 40 atm when reacted in distilled water for one hour. Gerdemann et al., "Ex Situ Aqueous Mineral Carbonation," *Enviorn. Sci. Technol.* 41:2587-2593 (2007) and Gerdemann et al., "Ex-Situ and In-Situ Mineral Carbonation as a Means to Sequester Carbon Dioxide," *DOE/ARC*-2004-031 (2004). Elevated temperatures favor dissolution and carbonate precipitation. High $CO_2$ partial pressures and the bicarbonate solution provide an abundant supply of carbonate ions for the carbon mineralization reactions. Gadikota et al., "Experimental Design and Data Analysis for Accurate Estimation of Reaction Kinetics and Conversion for Carbon Mineralization," *Ind. Eng. Chem. Res.* 53:6664-6676 (2014); Gadikota et al., "Accelerated Carbonation of Ca- and Mg-Bearing Minerals and Industrial Wastes Using $CO_2$," *Carbon Dioxide Utilisation: Closing the Carbon Cycle* 115-137 (2015); Gerdemann et al., "Ex Situ Aqueous Mineral Carbonation," *Environ. Sci. Technol.* 41:2587-2593 (2007); Werner et al., "Flue Gas $CO_2$ Mineralization using Thermally Activated Serpentine: From Single- to Double-Step Carbonation," *Phys. Chem. Chem. Phys.* 16:24978-24993 (2014); and Gadikota et al., "Morphological Changes During Enhanced Carbonation of Asbestos Containing Material and its Comparison to Magnesium Silicate Minerals," *J. Hazard. Mater.* 264:42-52 (2014). Alternatively, the two step carbon mineralization pathways in which low pH solutions are used to dissolve the minerals and high pH solutions are used to precipitate the solid carbonates were extensively investigated. Park et al., "$CO_2$ Mineral Sequestration: Physically Activated Dissolution of Serpentine and pH Swing Process," *Chem. Eng. Sci.* 39:5241-5247 (2004); Zhao et al., "Tuning the Dissolution Kinetics of Wollastonite via Chelating Agents for $CO_2$ Sequestration With Integrated Synthesis of Precipitated Calcium Carbonates," *Phys. Chem. Chem. Phys.* 15:15185-15192 (2013); Park et al., "$CO_2$ Mineral Sequestration: Chemically Enhanced Aqueous Carbonation of Serpentine," *Can. J. Chem. Eng.* 81:885-890 (2008); Werner et al., "Flue Gas $CO_2$ Mineralization using Thermally Activated Serpentine: From Single- to Double-Step Carbonation," *Phys. Chem. Chem. Phys.* 16:24978-24993 (2014); Sanna et al., "A Review of Mineral Carbonation Technologies to Sequester $CO_2$," *Chem. Soc. Rev.* 43:8049-808 (2014); Fagerlund et al., "An Experimental Study of $Mg(OH)_2$ Carbonation," *Int. J. Green. Gas Control* 5:1406-1412 (2011); and Eloneva et al., "Ammonium Salt-based Steelmaking Slag Carbonation: Precipitation of $CaCO_3$ and Ammonia Losses Assessment," *Greenh. Gases Sci. Technol.* 1:305-311 (2011). Further, the use of organic chelating agents such as acetate, gluconate, EDTA, oxalate, ascorbate, and glutamate were studied to enhance the dissolution behavior of Ca- and Mg-bearing minerals. Zhao et al., "Tuning the Dissolution Kinetics of Wollastonite via Chelating Agents for $CO_2$ Sequestration With Integrated Synthesis of Precipitated Calcium Carbonates," *Phys. Chem. Chem. Phys.* 15:15185-15192 (2013); Park et al., "$CO_2$ Mineral Sequestration: Chemically Enhanced Aqueous Carbonation of Serpentine," *Can. J. Chem. Eng.* 81:885-890 (2008); Vinoba et al., "Biomimetic Sequestration of $CO_2$ and Reformation to $CaCO_3$ Using Bovine Carbonic Anhydrase Immobilized on SBA-15," *Energy and Fuels* 25:438-445 (2011); Chiarello et al., "Otavite-calcite Solid-Solution Formation at the Calcite-Water Interface Studied in Situ by Synchrotron X-ray Scattering," *Geochim. Cosmochim. Acta* 61:1467-1474 (1997); Bonfils et al., "Comprehensive Analysis of Direct Aqueous Mineral Carbonation Using Dissolution Enhancing Organic Additives," *Int. J. Greenh. Gas Control* 9:334-346 (2012); and Olsen et al., "Oxalate-Promoted Forsterite Dissolution at Low pH," *Geochim. Cosmochim. Acta* 72:1758-1766 (2008). To overcome the limited solubility of $CO_2$, the use of biocatalysts such as carbonic anhydrase were studied. Vinoba et al., "Biomimetic Sequestration of $CO_2$ and Reformation to $CaCO_3$ Using Bovine Carbonic Anhydrase Immobilized on SBA-15," *Energy and Fuels* 25:438-445 (2011) and Di Lorenzo et al., "The Carbonation of Wollastonite: A Model Reaction to Test Natural and Biomimetic Catalysts for Enhanced $CO_2$ Sequestration," *Minerals* 8:209 (2018). Despite the advancements made in accelerating mineral dissolution or $CO_2$ hydration, the need for multiple unit operations to accelerate each of these steps motivated the design of multiphase reaction chemistries to accelerate carbon mineralization integrated with $CO_2$ capture.

During integrated capture and mineralization of $CO_2$, $CO_2$ is captured using a solvent in an absorber. The $CO_2$-loaded solvent then reacts with solutions or solids bearing $Ca^{2+}$ ions to produce calcium carbonate solids, while chemically regenerating the solvent. The effectiveness of this two-step capture-mineralization approach was demonstrated by Ji and co-workers using monoethanolamine (MEA) as the solvent and fly ash. Ji et al., "Integrated Absorption-Mineralisation for Energy-Efficient $CO_2$ Sequestration: Reaction Mechanism and Feasibility of Using Fly Ash as a Feedstock," *Chem. Eng. J.* 352:151-162 (2018); Ji et al., "Integrated Absorpiton-Mineralisation for Low-energy $CO_2$ Capture and Sequestration," *Appl. Energy* 225:356-366 (2018); and Yu et al., "Integration of Diamine Solvent Based Absorption and Coal Fly Ash Based Mineralisatin for $CO_2$ Sequestration," *Fuel Proces. Technol.* 192:220-226 (2019). Yu and co-workers investigated the influence of diamine solvents such as N,N-Dimethylethylenediamine, N,N-Diethylethylenediamine, 3-(Diethylamino)propylamine, 1-(2-hydroxyethyl)-4-aminopiperidine) and $CO_2$ mineralization by CaO-rich fly ash. Yu et al., "Integration of Diamine Solvent Based Absorption and Coal Fly Ash Based Mineralisatin for $CO_2$ Sequestration," *Fuel Proces. Technol.* 192:220-226 (2019). Calcium chloride solution was investigated for $CO_2$ capture and mineralization using various solvents including monoethanolamine (MEA), diethanolamine (DEA), N-methyldiethanolamine (MDEA), and 2-amino-2-methyl-1-propanol (AMP). Arti et al., "Single Process for $CO_2$ Capture and Mineralization in Various Alkanolamines Using Calcium Chloride," *Energy & Fuels* 31:763-769 (2017) and Hong et al., "Low Temperature Regeneration of Amines Integrated with Production of Structure-Controlled Calcium Carbonates for Combined $CO_2$ Capture and Utilization," *Energy & Fuels* 34:3532-3539 (2020). Unlike the two-step approach, the advantage of the single step approach is the reduction in the number of unit operations for capturing and converting $CO_2$. In the single step approach, $CO_2$ is reacted with the solvent to capture $CO_2$ and the $CO_2$ loaded solvent reacts with the alkaline sorbent to produce the respective carbonate. The solvent is regenerated in a single step via in-situ chemical recycle. The key advantage is that the coupled absorption and mineralization process can be engineered to occur at a single temperature such that both reactions are accelerated, thus enhancing the energy and atomistic efficiency of this approach. The synergistic coupling of the reactions can reduce capital and operating expenditures of these processes. In the two-step process, $CO_2$ capture using the amino acid salt or amine solvents is decoupled from the carbon mineralization step where the $CO_2$-loaded solvent reacts with the alkaline sorbent to produce calcium carbonate. The decoupling allows for both processes to occur at different temperatures. Further, the time-scale of absorption and crystallization reactions need to be synchronized for the process to operate in a continuous mode. Additional unit operations and optimization are needed to ensure that the processes occur simultaneously. Unlike extensive investigations into the two-step approach where absorption and mineralization are decoupled. single step $CO_2$-solvent-alkaline sorbent pathways remain less explored. This process, also known as the Aqueous Amine Looping Approach was successfully demonstrated for the single-step capture, conversion and storage of $CO_2$ to produce Ca- and Mg-bearing carbonates starting from calcium oxide (CaO), calcium silicate ($CaSiO_3$), and magnesium oxide (MgO) precursors using monoethanolamine (MEA). Liu et al., "Integrated $CO_2$ Capture, Conversion, and Storage To Produce Calcium Carbonate Using an Amine Looping Strategy," *Energy & Fuels* 33:1722-1733 (2018) and Liu et al., "Novel Aqueous Amine Looping Approach for the Direct Capture, Conversion and Storage of $CO_2$ to Produce Magnesium Carbonate," *Sustain. Energy Fuels* 4:1265-1275 (2020).

There remains a need for improved methods of producing solid inorganic carbonate and bicarbonate compounds by capturing, converting, and storing carbon dioxide. The present disclosure is directed to overcoming these and other deficiencies in the art.

SUMMARY

A first aspect relates to a method of producing one or more solid inorganic carbonate compound by capturing, converting, and storing carbon dioxide. The method includes providing one or more precursor compound; providing one or more carbon dioxide capture solvent or capture additive; and reacting said one or more precursor compound with said one or more carbon dioxide capture solvent or capture additive under conditions effective to produce one or more solid inorganic carbonate compound.

A second aspect relates to a method of producing one or more solid inorganic bicarbonate compound by capturing, converting, and storing carbon dioxide. The method includes providing one or more precursor compound; providing one or more carbon dioxide capture solvent or capture additive; and reacting said one or more precursor compound with said one or more carbon dioxide capture solvent or capture additive under conditions effective to produce one or more solid inorganic bicarbonate compound.

A third aspect relates to a system for producing one or more solid inorganic carbonate compound by capturing, converting, and storing carbon dioxide. The system includes one or more precursor compound; one or more carbon dioxide capture solvent or capture additive; and a reactor, wherein said one or more precursor compound and said one or more carbon dioxide capture solvent or capture additive react in said reactor under conditions effective to produce one or more solid inorganic carbonate compound.

A fourth aspect relates to a system for producing one or more solid inorganic bicarbonate compound by capturing, converting, and storing carbon dioxide. The system includes one or more precursor compound; one or more carbon dioxide capture solvent or capture additive; and a reactor, wherein said one or more precursor compound and said one or more carbon dioxide capture solvent or capture additive react in said reactor under conditions effective to produce one or more solid inorganic bicarbonate compound.

Designing novel integrated chemical pathways for the capture, conversion, and storage of $CO_2$ is a crucial need for advancing sustainable energy conversion. The accelerated conversion of $CO_2$ to water-insoluble and stable magnesium carbonate is a thermodynamically downhill route for permanently storing $CO_2$. However, a practical constraint of carbon mineralization is the slow kinetics at low $CO_2$ concentrations. A direct integrated mineralization approach is investigated, whereby $CO_2$, amine solvents (such as monoethanolamine, MEA), water and alkaline Mg-bearing solids are reacted in a slurry reaction environment. About 70% conversion of magnesium oxide to magnesium carbonate was achieved at 50° C. after 3 hours. The looping of amine-bearing solvents between the $CO_2$ loaded and release states, facilitates the accelerated conversion of magnesium-bearing oxides to magnesium carbonate. Hydrated magnesium carbonate and magnesium hydroxide phases were noted when less than complete conversion of magnesium oxide was achieved. The morphological features were determined using in-operando ultra-small and small angle X-ray scattering (USAXS/SAXS) and grazing incidence-small angle X-ray scattering (GI-SAXS) measurements. The proposed pathway is an adaptive, low temperature, single-step approach for the direct capture, conversion and storage of $CO_2$. By demonstrating the effectiveness of aqueous alkaline amine looping approach for the accelerated carbon mineralization of MgO, the aim is to expand this approach to include heterogeneous alkaline industrial residues such as coal fly ash and steel slag and naturally occurring minerals such as magnesium silicate and calcium silicate.

The unabated reliance on carbonaceous fuel sources and the rising concentration of atmospheric $CO_2$ motivate the design of integrated thermodynamically downhill $CO_2$ capture and conversion pathways. Carbon mineralization which involves converting $CO_2$ to inorganic carbonates is a representative example. In present disclosure, the integrated $CO_2$ capture and conversion is investigated to produce calcium carbonate with CaO and $CaSiO_3$ as the precursors. To overcome the rate limiting step of $CO_2$ hydration, sodium glycinate is used for $CO_2$ capture. Bicarbonate ions resulting from $CO_2$ capture accelerate carbon mineralization. Carbon mineralization behavior in coupled capture and conversion processes is sensitive to the concentration of Na-glycinate, temperature, and reaction time. In this single step $CO_2$ capture and mineralization pathway, highest conversions of CaO and $CaSiO_3$ were achieved in 1.0 M Na-glycinate at 75° C. and with a reaction time of 3 hours in a system comprising 15 wt % solid and at a stirring rate of 300 rpm. Extents of carbon mineralization with CaO and $CaSiO_3$ are 94.2% and 31.0%, respectively. These data suggest that Na-glycinate undergoes multiple $CO_2$ capture and regeneration cycles in the aqueous phase facilitating greater availability of aqueous carbon species for carbonate precipitation. Calcite is the dominant crystalline phase with CaO as the precursor, while aragonite, calcite and vaterite are present in materials with $CaSiO_3$ as the precursor. These results demonstrate the effectiveness of Na-glycinate as a $CO_2$ capture agent for integrated capture and mineralization with inherent regeneration in the aqueous phase.

Prior work on the aqueous alkaline amine looping approach showed that complete conversion of CaO to calcium carbonate and 70% conversion of MgO to hydrated magnesium carbonate was achieved at 50° C. with 30 wt %

MEA and 15 wt % solid on reacting for 3 hours. Liu et al., "Integrated $CO_2$ Capture, Conversion, and Storage To Produce Calcium Carbonate Using an Amine Looping Strategy," *Energy & Fuels* 33:1722-1733 (2018) and Liu et al., "Novel Aqueous Amine Looping Approach for the Direct Capture, Conversion and Storage of $CO_2$ to Produce Magnesium Carbonate," *Sustain. Energy Fuels* 4:1265-1275 (2020), both of which are hereby incorporated by reference in their entirety. However, amine solvents as an alternative to amino acid salts need to be explored. Alternative solvents should have reduced solvent loss, higher resistance to oxidative degradation and lower toxicity. Mechanisms of $CO_2$ capture using MEA vs. Na-glycinate differ significantly. $CO_2$ capture using MEA proceeds via the formation of carbamate species. Hydrolysis of the carbamate species results in the formation of bicarbonate ions. Further, two molecules of MEA are required to capture one molecule of $CO_2$. In Na-glycinate, the zwitter ion formed post $CO_2$ capture decomposes to produce bicarbonate ions. One Na-glycinate molecule captures one molecule of $CO_2$.

Given this criteria, amino acid salts such as sodium or potassium glycinate were identified as appropriate solvents for $CO_2$ capture. Further, sodium or potassium glycinate were effective in capturing $CO_2$ from very dilute sources including directly from air. Williams et al., "$CO_2$ Capture via Crystalline Hydrogen-Bonded Bicarbonate Dimers," *Chem* 5:719-730 (2019); Brethomé et al., "Direct Air Capture of $CO_2$ via Aqueous-Phase Absorption and Crystalline-phase Release Using Concentrated Solar Power," *Nat. Energy* 3:553-559 (2018); Garrabrant et al., "Energy-Efficient $CO_2$ Capture from Flue Gas by Absorption with Amino Acids and Crystallization with a Bis-Iminoguanidine," *Ind. Eng. Chem. Res.* 58:10510-10515 (2019); and Custelcean et al., "Direct Air Capture of $CO_2$ with Aqueous Amino Acids and Solid Bis-Iminoguanidines (BIGs)," *Ind. Eng. Chem. Res.* 58:23338-23346 (2019), all of which are hereby incorporated by reference in their entirety. These factors motivated the investigation of sodium glycinate in the single-step capture and conversion of $CO_2$ to calcium carbonate using calcium oxide and calcium silicate as the alkaline precursors. FIG. 1 is a schematic representation of the reactions that correspond to $CO_2$ capture and regeneration using Na-glycinate. In the context of using Na-glycinate, there is interest in addressing the following research questions: (i) What is the influence of reaction temperature, concentration of sodium glycinate, and reaction time on the conversion of CaO and $CaSiO_3$ to calcium carbonate? (ii) What are the speciation mechanisms that correspond to $CO_2$ capture and regeneration of solvent on reacting with the alkalinity in the aqueous phase? (iii) What are the structural and morphological features of calcium carbonate precipitated in the presence of Na-glycinate? To address these questions, the influence of temperature is investigated in the range of 25-90° C., Na-glycinate concentrations in the range of 0-1 M and reaction times up to 5 hours on the carbon mineralization behavior of CaO and $CaSiO_3$. The compositions of the carbonate-bearing products, the structures and morphologies of the reacted materials are determined in these experiments. These investigations are designed to probe the effectiveness of Na-glycinate as an agent for $CO_2$ capture and transfer in the aqueous phase for the accelerated carbon mineralization of CaO and $CaSiO_3$ at temperatures below 100° C. and $CO_2$ partial pressure of 1 atm.

BRIEF DESCRIPTION OF THE DRAWINGS

FIG. 3A shows the identification of the functional groups present in the reacted solid. FIG. 3B shows the identification of the functional groups present in the reacted fluid obtained from reacting MgO with 30 wt % MEA at 50° C. with $P_{CO_2}$=1 atm for 3 hours and stirring rate of 300 rpm, using ATR-FTIR measurements.

FIG. 4A shows unreacted magnesium oxide. FIG. 4B shows MgO reacted with 30 wt % MEA. Experimental conditions for the images shown in FIG. 4B represent 50° C. with $P_{CO_2}$=1 atm for 3 hours and stirring rate of 300 rpm. The needle-shaped particles in FIG. 4B correspond to nesquehonite particles.

FIG. 5A shows changes to produce magnesium carbonate. FIGS. 5B and 5C respectively show the characteristic peak of lansfordite at q=0.5 $Å^{-1}$ and the normalized integrated intensity. The integrated intensity is normalized to the highest peak intensity which is noted at 385 minutes.

FIG. 6A shows a power law slope and radius of gyration ($R_g$) values obtained from the fitting of experimental USAXS/SAXS curves in the q-range of 0.02-0.8 $Å^{-1}$. FIGS. 6B and 6C show the pore size distribution and cumulative pore volume for unreacted MgO and MgO reacted with 30 wt % MEA for 3 hours are represented, respectively. The pore size distributions were determined by using the BJH method on $N_2$ desorption isotherm. FIG. 6C show the emergence of (001) lansfordite ($MgCO_3 \cdot 5H_2O$) (Giester et al., "The Crystal Structure of Nesquehonite, $MgCO_3 \cdot 3H_2O$, From Lavrion, Greece," *Mineral. Petrol.* 70:153-163 (2000) and Ming et al., "Synthesis and Characterization of Lansfordite and Nesquehonite," *Soil Sci. Soc. Am. J.* 49:1303-1308 (2010), both of which are hereby incorporated by reference in their entirety) peak from MgO.

FIG. 7A SHOWS the in-situ cell for Grazing Incidence-Small Angle X-Ray Scattering (GI-SAXS) measurements. FIG. 7B shows a representative scattering image and FIG. 7B shows the scattering curve that correspond to the nucleation of magnesium carbonate particles on quartz (0 0 1) surface. FIG. 7D shows the size distribution obtained from fitting the scattering curve using the Guinier-Porod slope. The experiments were performed at 25° C. 0.1988 mL 30 wt % $CO_2$-loaded MEA solution was injected into 5 mL 0.1 M $Mg(NO_3)_2$ solution, which marked the beginning of the in-situ measurement.

FIGS. 13A-13D shows experimental USAXS/SAXS scattering curves and fitted models for samples reacted for (FIG. 13A) 0 min, (FIG. 13B) 122 min, (FIG. 13C) 239 min, and (FIG. 13D) 385 min. The data were fitted using the Modelling-II tool in Irena package embedded in Igor Pro. The curve in FIG. 13A was modeled using two unified fit levels between the q-ranges of 0.001-0.02 $Å^{-1}$ and 0.02-0.8 $Å^{-1}$. FIGS. 13B-13D shows curves in panels besides two unified fit levels in q-ranges of 0.001-0.02 $Å^{-1}$ and 0.02-0.3 $Å^{-1}$, and a Lorentzian diffraction peak was also fitted between q values of 0.3-0.8 $Å^{-1}$.

FIGS. 17A-17C represent experiments performed to investigate the influence of temperature (FIG. 17A), amino acid salt concentration (FIG. 17B), and reaction time (FIG. 17C), respectively. Ramachandran et al., "XRD, Thermal, FTIR and SEM Studies on Gel Grown γ-glycine Crystals," *Cryst. Res. Technol.* 42:73-77 (2007); Doki et al., "Process Control of Seeded Batch Cooling Crystallization of the Metastable α-Form Glycine Using an In-Situ ATR-FTIR Spectrometer and an In-Situ FBRM Particle Counter," *Cryst. Growth. Des.* 4:949-953 (2004); and Ahmed et al., "Comparison Between FTIR and XPS Characterization of Amino Acid Glycine Adsorption onto Diamond-like Carbon (DLC) and Silicon Doped DLC," *Appl. Surf Sci.* 273:507-514 (2013), all of which are hereby incorporated by reference in their entirety.

FIGS. 18A-18C represent experiments performed to investigate the influence of temperature (FIG. 18A), amino acid salt concentration (FIG. 18B), and reaction time (FIG. 18C), respectively. Ramachandran et al., "XRD, Thermal, FTIR and SEM Studies on Gel Grown γ-glycine Crystals," *Cryst. Res. Technol.* 42:73-77 (2007); Doki et al., "Process Control of Seeded Batch Cooling Crystallization of the Metastable α-Form Glycine Using an In-Situ ATR-FTIR Spectrometer and an In-Situ FBRM Particle Counter," *Cryst. Growth. Des.* 4:949-953 (2004); and Ahmed et al., "Comparison Between FTIR and XPS Characterization of Amino Acid Glycine Adsorption onto Diamond-like Carbon (DLC) and Silicon Doped DLC," *Appl. Surf Sci.* 273:507-514 (2013), all of which are hereby incorporated by reference in their entirety.

FIG. 19A shows changes in the presence of 1 M sodium glycinate at 25, 50, 75, and 90° C. reacted for 3 hour. FIG. 19B shows different concentration of 0, 0.5, 1, and 3 M sodium glycinate at 75° C. for 3 hours. FIG. 19C shows results with 1 M sodium glycinate at 75° C. for different reaction time of 1, 3, and 5 hours. All the experiments are performed at $P_{CO2}$=1 atm and a stirring rate of 300 rpm. Peaks are identified based on the crystallographic data reported for calcium oxide, calcite, vaterite, and aragonite. Crystallographic phases are identified based on the data presented in references. Müller et al., "Crystal Structure Refinement: A Crystallographer's Guide to SHELXL," Oxford Scholarship Online (2010); Chessin et al., "Positions and Thermal Parameters of Oxygen Atoms in Calcite," *Acta Cryst.* 18:689-693 (1965); Wang et al., "Structure and Carbonited Orientation of Vaterite ($CaCO_3$)," *Am. Minerl.* 94:380-386 (2009); Dal Negro et al., "Refinement of the Crystal Structure of Aragonite," *Am. Mineral.* 56:768-772 (1971); Primak et al., "X-Ray Diffraction Studies of Systems Involved in the Preparation of Alkaline Earth Sulfide and Selenide Phosphors," *J. Am. Chem. Soc.* 70:2043-2046 (1948); and Petch, "The Hydrogen Positions in Portlandite, $Ca(OH)_2$, as Indicated by the Electron Distribution," *Acta Cryst.* 14:950-957 (1961), all of which are hereby incorporated by reference in their entirety. The morphological changes of the CaO samples on carbonation are probed by SEM. FIG. 19D represents the unreacted CaO. FIG. 19E represents the reaction with $H_2O$ at 75° C. for 3 hours. FIG. 19F represents CaO after the reaction with 1 M sodium glycinate at 75° C. for 3 hr. Müller et al., "Crystal Structure Refinement: A Crystallographer's Guide to SHELXL," Oxford Scholarship Online (2010); Wang et al., "Structure and Carbonited Orientation of Vaterite ($CaCO_3$)," *Am. Minerl.* 94:380-386 (2009); Dal Negro et al., "Refinement of the Crystal Structure of Aragonite," *Am. Mineral.* 56:768-772 (1971); Chessin et al., "Positions and Thermal Parameters of Oxygen Atoms in Calcite," *Acta Cryst.* 18:689-693 (1965); and Maslen et al., "X-ray Study of the Electron Density in Calcite, $CaCO_3$," *Acta Cryst.* 49:636-641 (1993), all of which are hereby incorporated by reference in their entirety.

FIG. 20A shows changes in the phases present in calcium silicate on carbon mineralization in the presence of 1 M sodium glycinate at 25, 50, 75, and 90° C. reacted for 3 hours. FIG. 20B shows changes with different concentration of 0, 0.5, 1, and 3 M sodium glycinate at 75° C. for 3 hours. FIG. 20C shows changes with 1 M sodium glycinate at 75° C. for different reaction time of 1, 3, and 5 hours. All the experiments are performed at $P_{CO2}$=1 atm and a stirring rate of 300 rpm. Peaks are identified based on the crystallographic data reported for calcium silicate (or wollastonite), calcite, vaterite, and aragonite. Crystallographic phases are identified based on the data presented in Müller et al., "Crystal Structure Refinement: A Crystallographer's Guide to SHELXL," Oxford Scholarship Online (2010); Chessin et al., "Positions and Thermal Parameters of Oxygen Atoms in Calcite," *Acta Cryst.* 18:689-693 (1965); Wang et al., "Structure and Carbonited Orientation of Vaterite ($CaCO_3$)," *Am. Minerl.* 94:380-386 (2009); Dal Negro et al., "Refinement of the Crystal Structure of Aragonite," *Am. Mineral.* 56:768-772 (1971); Primak et al., "X-Ray Diffraction Studies of Systems Involved in the Preparation of Alkaline Earth Sulfide and Selenide Phosphors," *J. Am. Chem. Soc.* 70:2043-2046 (1948); and Petch, "The Hydrogen Positions in Portlandite, $Ca(OH)_2$, as Indicated by the Electron Distribution," *Acta Cryst.* 14:950-957 (1961), all of which are hereby incorporated by reference in their entirety. The morphological changes of the $CaSiO_3$ samples on carbonation are probed by SEM. FIG. 20D represents the unreacted $CaSiO_3$. FIG. 20E represents the reaction with $H_2O$ at 75° C. for 3 hours. FIG. 20F represents $CaSiO_3$ after the reaction with 1 M sodium glycinate at 75° C. for 3 hr. Müller et al., "Crystal Structure Refinement: A Crystallographer's Guide to SHELXL," Oxford Scholarship Online (2010); Wang et al., "Structure and Carbonited Orientation of Vaterite ($CaCO_3$)," *Am. Minerl.* 94:380-386 (2009); Dal Negro et al., "Refinement of the Crystal Structure of Aragonite," *Am. Mineral.* 56:768-772 (1971); Chessin et al., "Positions and Thermal Parameters of Oxygen Atoms in Calcite," *Acta Cryst.* 18:689-693 (1965); and Maslen et al., "X-ray Study of the Electron Density in Calcite, $CaCO_3$," *Acta Cryst.* 49:636-641 (1993), all of which are hereby incorporated by reference in their entirety. FIG. 20E shows calcite crystals are identified as "c".

FIG. 22A shows changes in the bonds present in calcium oxide on carbon mineralization in the presence of 1 M sodium glycinate at different temperatures of 25, 50, 75, and 90° C. for 3 hr. FIG. 22B shows changes with different concentration of 0, 0.5, 1, and 3 M sodium glycinate at 75° C. for 3 h. FIG. 22C shows changes with 1 M sodium glycinate at 75° C. for different reaction time of 1, 3, and 5 hr, represented by ATR-FTIR spectra. All the experiments are performed at $P_{CO2}$=1 atm and a stirring rate of 300 rpm.

FIG. 23A shows changes in the presence of 1 M sodium glycinate at different temperatures of 25, 50, 75, and 90° C. for 3 h. FIG. 23B shows changes with different concentration of 0, 0.5, 1, and 3 M sodium glycinate at 75° C. for 3 h. FIG. 23C shows changes with 1 M sodium glycinate at 75° C. for different reaction time of 1, 3, and 5 hr, represented by ATR-FTIR spectra. All the experiments are performed at $P_{CO2}$=1 atm and a stirring rate of 300 rpm.

FIG. 30A shows an image of a Taylor-Couette (T-C) reactor. FIG. 30B shows layout of flow visualization setup.

FIG. 31A shows change in the particle size distributions (PSD) measured via DLS of precipitated calcium carbonate (PCC) formed under 0.02 L/min $CO_2$ flowrate. FIG. 31B shows change in the particle size distributions (PSD) measured via DLS of precipitated calcium carbonate (PCC) formed under 0.1 L/min $CO_2$ flowrate.

DETAILED DESCRIPTION

Figure 1:
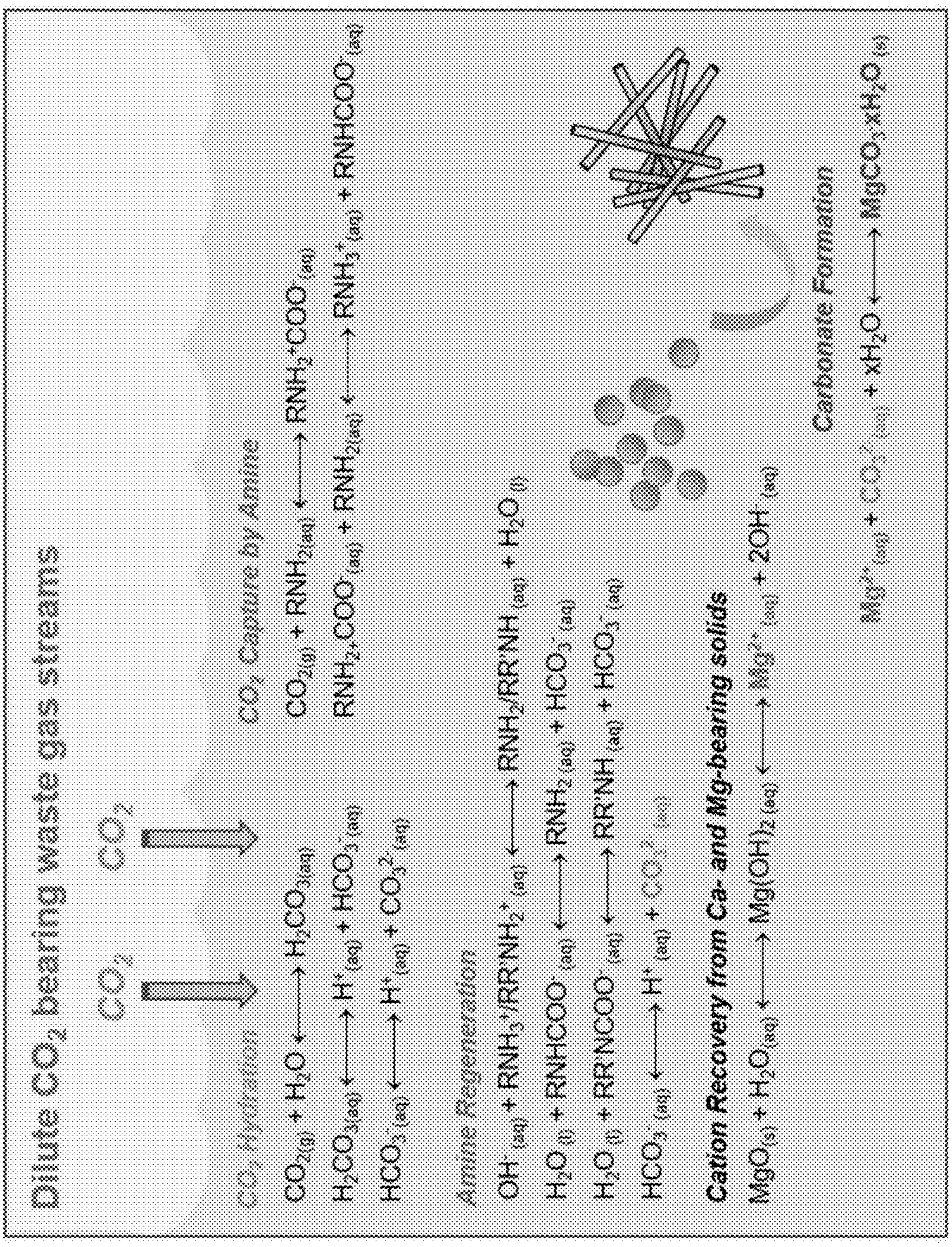
FIG. 1 is a schematic representation of the alkaline aqueous amine looping process for the carbon mineralization of magnesium oxide to produce magnesium carbonate.

A first aspect relates to a method of producing one or more solid inorganic carbonate compound by capturing, converting, and storing carbon dioxide. The method includes providing one or more precursor compound; providing one or more carbon dioxide capture solvent or capture additive; and reacting said one or more precursor compound with said one or more carbon dioxide capture solvent or capture additive under conditions effective to produce one or more solid inorganic carbonate compound.

As used herein, "about" or "approximately," when used in connection with a numerical variable, generally refers to the value of the variable and to all values of the variable that are within the experimental error (e.g., within the 95% confidence interval for the mean) or within ±10% of the indicated value, whichever is greater.

Where a range of values is provided, it is understood that each intervening value, to the tenth of the unit of the lower limit unless the context clearly dictates otherwise, between the upper and lower limit of that range and any other stated or intervening value in that stated range, is encompassed within the present disclosure. The upper and lower limits of these smaller ranges may independently be included in the smaller ranges and are also encompassed within the present disclosure, subject to any specifically excluded limit in the stated range. Where the stated range includes one or both of the limits, ranges excluding either or both of those included limits are also included in the present disclosure.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which the present disclosure belongs. Although any methods and materials similar or equivalent to those described herein can also be used in the practice or testing of the present disclosure, representative illustrative methods and materials are now described.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible.

The present disclosure generally relates new methods, processes, and systems for producing solid inorganic carbonates by capture, conversion, storage, extraction, reduction, disposal, or sequestration of carbon dioxide ($CO_2$), particularly from the air, and involves new processes to reduce or eliminate $CO_2$, e.g., greenhouse gas $CO_2$, from the environment. The processes described herein are aimed at effective and efficient carbon management, including cost effectiveness and efficient heat management. Thus, the processes and products of the present disclosure provide useable and economically viable technologies for tackling and handling the escalating problem of global warming.

The sequestration of carbon dioxide gas in repositories that are isolated from the atmosphere is a developing technology that is widely recognized as an essential element in global attempts to reduce carbon dioxide emissions to the atmosphere. The rapid increase in atmospheric carbon dioxide concentrations is of concern due to its properties as greenhouse gas and its contribution to the phenomena of global warming and climate change.

As described herein, the methods and systems include capturing, converting, and storing carbon dioxide ($CO_2$). The source of $CO_2$ may be any convenient $CO_2$ source. The $CO_2$ source may be a gas, a liquid, a solid (e.g., dry ice), a supercritical fluid, or $CO_2$ dissolved in a liquid. In some embodiments, the $CO_2$ source is a gaseous $CO_2$ source. The gaseous stream may be substantially pure $CO_2$ or comprise multiple components that include $CO_2$ and one or more additional gases and/or other substances such as ash and other particulates. The $CO_2$ may be, for example, anthropogenic, or originating from human activity. In some embodiments, the gaseous $CO_2$ source may be a waste gas stream (for example, a by-product of an active process of the industrial plant) such as exhaust from an industrial plant. The nature of the industrial plant may vary and may include, for example, power plants, chemical processing plants, mechanical processing plants, refineries, cement plants, steel plants, and other industrial plants that produce $CO_2$ as a by-product of fuel combustion or another processing step.

Waste gas streams comprising $CO_2$ may include both reducing (e.g., syngas, shifted syngas, natural gas, hydrogen, and the like) and oxidizing condition streams (e.g., flue gases from combustion). Waste gas streams that may be useful in accordance with the present disclosure may include oxygen-containing combustion industrial plant flue gas, for example, from coal or another carbon-based fuel with little or no pretreatment of the flue gas; turbo charged boiler product gas; coal gasification product gas; shifted coal gasification product gas; anaerobic digester product gas; wellhead natural gas stream; reformed natural gas or methane hydrates; and the like. Combustion gas from any convenient source may be used in methods and systems of the present disclosure. In some embodiments, combustion gases in post-combustion effluent stacks of industrial plants such as power plants, cement plants, and coal processing plants may be used.

Thus, a waste stream may be produced from a variety of different types of industrial plants. Suitable waste streams in accordance with the present disclosure may include waste streams produced by industrial plants that combust fossil fuels (e.g., coal, oil, natural gas) and anthropogenic fuel products of naturally occurring organic fuel deposits (e.g., tar sands, heavy oil, oil shale). In some embodiments, waste streams suitable for systems and methods of the present disclosure are sourced from a coal-fired power plant, such as a pulverized coal power plant, a supercritical coal power plant, a mass burn coal power plant, or a fluidized bed coal power plant. In some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas, or, gas that is produced by the gasification of organic matter, for example, coal, or biomass may be used. In other embodiments, waste streams from integrated gasification combined cycle plants may be used. In other embodiments, waste streams produced by Heat Recovery Steam Generator plants may be used in accordance with systems and methods of the present disclosure.

Waste streams produced by cement plants are also suitable sources of carbon dioxide for the systems and methods of the present disclosure. Cement plant waste streams include waste streams from both wet process and dry process plants, which plants may employ shaft kilns or rotary kilns, and may include pre-calciners. These industrial plants may burn a single fuel, or may burn two or more fuels sequentially or simultaneously. Other industrial plants such as smelters and refineries are also useful sources of waste streams that include carbon dioxide.

Industrial waste gas streams may contain carbon dioxide as the primary non-air derived component, or may, especially in the case of coal-fired power plants, contain additional components such as nitrogen oxides (NOx), sulfur oxides (SOx), and one or more additional gases. Additional gases and other components may include carbon monoxide, mercury and other heavy metals, and dust particles, for example, from calcining and combustion processes. Additional components in the gas stream may also include halides like hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, for example, $CO_2$ present in amounts of 10 ppm to 1,000,000 ppm, for example, about 10 ppm to about 200,000 ppm, including about 1000 ppm to about 200,000 ppm, about 2000 ppm to about 200,000 ppm, about 3000 ppm to about 200,000 ppm, about 4000 ppm to about 200,000 ppm, about 5000 ppm to about 200,000 ppm, about 6000 ppm to about 200,000 ppm, about 7000 ppm to about 200,000 ppm, about 8000 ppm to about 200,000 ppm, about 9000 ppm to about 200,000 ppm, and about 10,000 ppm to about 200,000 ppm, or any amount between 10 ppm and 1,000,000 ppm. The waste streams, particularly various waste streams of combustion gas, may include one or more additional components, for example, water, NOx (mononitrogen oxides: NO and $NO_2$), SOx (monosulfur oxides: SO, $SO_2$ and $SO_3$), VOC (volatile organic compounds), heavy metals such as mercury, and particulate matter (particles of solid or liquid suspended in a gas).

The precursor compound as described herein includes any compound that is capable of reacting with one or more $CO_2$ capture solvents and/or capture additives under conditions effective to produce one or more solid inorganic carbonate compounds and/or one or more solid inorganic bicarbonate compounds. For example, the precursor compounds described herein may include any non-carbonate metal species and/or non-bicarbonate metal species. In one embodiment, the one or more precursor compounds are a non-carbonate metal species or a non-bicarbonate metal species.

The precursor compound may be a solid compound or a liquid compound. In one embodiment, the one or more precursor compound is a solid precursor compound or a liquid precursor compound. In one embodiment, the one or more precursor compound includes, but is not limited to, a silicate compound, an oxide compound, a chloride compound, a hydroxide compound, a nitrate compound, a nitrite compound, a sulfite compound, and a sulfate compound, and/or any combination thereof.

The precursor compound described herein may, in one embodiment, may be a silicate compound, an oxide compound, a chloride compound, a hydroxide compound, a nitrate compound, a nitrite compound, a sulfite compound, sulfate compound, or a combination thereof. The one or more a silicate compound, an oxide compound, a chloride compound, a hydroxide compound, a nitrate compound, a nitrite compound, a sulfite compound, or sulfate compound as described herein may include any compound that contains a calcium-, magnesium-, lithium-, or aluminum-bearing silicate, or a calcium-, magnesium-, lithium-, or aluminum-bearing oxide group, or a combination of a calcium-, magnesium-, lithium-, or aluminum-bearing silicate and/or a calcium-, magnesium-, lithium-, or aluminum-bearing oxide group. In one embodiment, the one or more calcium- or magnesium-bearing compounds may be calcium-bearing silicate, magnesium-bearing silicate (e.g., $Mg_2SiO_4$), lithium-bearing silicate, or aluminum-bearing silicate, or may be a calcium-bearing hydroxide, magnesium-bearing hydroxide, lithium-bearing hydroxide, or aluminum-bearing hydroxide.

In one embodiment, the one or more calcium-, magnesium-, lithium-, or aluminum-bearing compounds may be a synthetic compound or, alternatively, the one or more calcium-, magnesium-, lithium-, or aluminum-bearing compounds may be a naturally-occurring compound. Alternatively, the one or more calcium-, magnesium-, lithium-, or aluminum-bearing compounds may be a combination of synthetic and naturally-occurring compounds. High purity silica-free Ca- and Mg-hydroxides may, in one embodiment, be synthesized from $CaSiO_3$ and $Mg_2SiO_4$, respectively. In one embodiment, the one or more precursor compound is a calcium-, magnesium-, lithium-, or aluminum-bearing silicate or a calcium-, magnesium-, lithium-, or aluminum-bearing oxide. In one embodiment, the one or more precursor compound comprises coal, fly ash, steel slag, minerals, mine-tailings, industrial residues, or rocks. The precursor compound may from a waste gas stream, a liquid waste stream, or solid waste. In one embodiment, the one or more precursor compound is selected from the group consisting of CaO, $CaSiO_3$, MgO, LiCl, $MgCl_2$, $CaCl_2$, NaCl, heterogeneous mineral and rock matrices, and combinations thereof.

The calcium-, magnesium-, lithium-, or aluminum-bearing silicate and/or hydroxide as described herein includes silicates and/or hydroxides comprising magnesium, calcium, lithium, aluminum, or any combination thereof. Part of the magnesium, calcium, lithium, or aluminum may be replaced by other metals, for example iron or manganese. Any magnesium, calcium, lithium, or aluminum silicate or hydroxide belonging to the group of sheet silicates may be used in the methods and processes of the present disclosure. Examples of suitable silicates or hydroxides are serpentine, talc, and sepiolite. Serpentine and talc are examples of useful silicate hydroxides.

The methods and processes described herein may use, for example, silicate-based minerals or materials. A non-limiting example of a silicate based material is serpentine, which occurs naturally and may be generally described by the formula of $X_{2-3}Si_2O_5(OH)_4$, where X is selected from the following: Mg, Ca, $Fe^{2+}$, $Fe^{3+}$, Ni, Al, Zn, and Mn, where the serpentine material is a heterogeneous mixture comprised primarily of magnesium hydroxide and silica. Other examples of silicate-based minerals include, but are not limited to, olivine, which is a natural magnesium-iron silicate ($(Mg, Fe)_2SiO_4$), and can be generally described by the formula $X_2(SiO_4)_n$, where X is selected from Mg, Ca, $Fe^{2+}$, $Fe^{3+}$, Ni, Al, Zn, and Mn, and n=2 or 3; and a calcium silicate, for example wollastonite, which naturally occurs in metamorphic rocks. The silicate-based minerals may be used individually or in combination with each other. Additionally, the silicate based materials may be found in nature or may be manufactured. Examples of industrial by-products include but are not limited to waste cement and calcium-rich fly ash.

"Slag" as described herein includes conventional commercial slag which includes or comprises of dicalcium silicate. Any other slag known commercially is within the scope of this application. Accordingly, slag used herein, may contain between about 25-60 wt % CaO. "Slag solid" as described herein includes solid slag. Typically, slag is a large-grain solid which may be milled down to a smaller size. The size of the grain in slag may vary and may be between 1 micron-5 mm; or between 1 micron-1 mm; or between 1 micron-500 micron; or between 1 micron-100 micron. Slag and slag solid may be used interchangeably herein.

In some embodiments, the silica present in methods and processes of the present disclosure is provided by material comprising metal silicates or a combination of materials comprising metal silicates with supplemental sources of silica (e.g., fly ash, cement kiln dust, and/or other anthropogenic sources).

Rock, a naturally occurring solid aggregate comprising minerals and/or mineraloids, is suitable for use in the present disclosure, particularly rock comprising magnesium and/or calcium (e.g., peridotite, basalt, gabbro, diabase) that, upon processing like size reduction or digestion, provides one or more calcium- or magnesium-bearing compounds. Rock may also provide silica content to compounds of the present disclosure. Minerals, which have characteristic compositions with highly ordered atomic structure and distinct physical properties, may be useful in some embodiments. Minerals comprising magnesium and/or calcium may also provide silicates (e.g., metal silicates, which contain at least one metal along with silicon such as such as calcium silicates, magnesium silicates, aluminosilicates, iron-bearing silicates, and mixtures thereof) that, upon processing, provide silica to compositions of the present disclosure. As rock may be used in the present disclosure, both pure or impure minerals are suitable for the methods and processes of the present disclosure.

Many different materials comprising metal silicates are suitable for use in accordance with the present disclosure, including naturally occurring materials comprising metal silicates such as those present in rocks, minerals, and mineral-rich clays. Metal silicates that may be used in the present disclosure include, but are not limited to, orthosilicates, inosilicates, phyllosilicates, and tectosilicates. Orthosilicates may include, for example, olivine group minerals ($(Mg,Fe)_2SiO_4$). Inosilicates, which are often referred to as "chain silicates", include, for example, single chain inosilicates such as pyroxene group minerals ($XY(Si,Al)_2O_6$), where X represents ions of calcium, sodium, iron (e.g., $Fe^{2+}$), or magnesium and Y represents ions of smaller size, like chromium, aluminum, iron (e.g., $Fe^{3+}$ or $Fe^{2+}$), magnesium, manganese, scandium, titanium, and vanadium, and where pyroxene group minerals richer in magnesium may be used in some embodiments. Single chain inosilicates may also include, for example, pyroxenoid group minerals such as wollastonite ($CaSiO_3$), commonly in contact-metamorphosed limestone, and pectolite ($NaCa_2(Si_3O_8)(OH)$), which are also suitable for use in the present disclosure. Double chain inosilicates may include, for example, amphibole group minerals such as anthophyllite ($(Mg,Fe)_7Si_8O_{22}(OH)_2$). Phyllosilicates (i.e., sheet silicates) include, for example, serpentine group minerals (e.g., antigorite, chrysotile, and/or lizardite polymorphs of serpentine), phyllosilicate clay minerals (e.g., montmorillonite and talc), and mica group minerals (e.g., biotite). Tectosilicates (i.e., framework silicates), which are aluminosilicates (with the exception of quartz group minerals), include, for example, plagioclase feldspars such as labradorite and anorthite.

Mafic and ultramafic minerals (i.e., silicate-containing minerals rich in magnesium and iron, sometimes referred to as magnesium silicates) are examples of metal silicates described above. As such, mafic minerals and ultramafic minerals, and products or processed forms thereof, are also suitable for use in accordance with the present disclosure. Mafic and ultramafic rocks, which include mafic and ultramafic minerals, are suitable for use in accordance with the present disclosure as well. Such rocks may include, but are not limited to, pyroxenite, troctolite, dunite, peridotite, basalt, gabbro, diabase, and soapstone. Common rock-forming mafic minerals include olivine, pyroxene, amphibole, and biotite. Significant masses of olivine- and serpentine-bearing rocks exist around the world, particularly in ultramafic complexes, and in large serpentinite bodies. As described herein, serpentine is an abundant naturally occurring mineral having minor amounts of elements such as chromium, manganese, cobalt, and nickel. Serpentine may refer to any of more than twenty varieties belonging to the serpentine group. Olivine is a naturally occurring magnesium-iron silicate ($(Mg,Fe)_2SiO_4$), which ranges from forsterite (Fo) ($MgSiO_4$) to fayalite (Fa) ($Fe_2SiO_4$). Wollastonite is a naturally occurring calcium silicate that may be used in accordance with the present disclosure.

$Mg(OH)_2$, in one embodiment, may be produced by recycling ammonium sulphate salts as the extraction agents with magnesium silicates. In this extraction route, a solid-solid reaction of ammonium sulfate with magnesium silicate-bearing minerals such as serpentine (e.g., $Mg_3Si_2O_5(OH)_4$) may be completed at temperature in the range of 400° C.-550° C. extracts Mg into magnesium sulfate ($MgSO_4$). The gaseous by-products may include ammonia, water vapor, and sulfur dioxide. Ammonia and water may be recovered to produce ammonium hydroxide. Magnesium sulfate and ammonia hydroxide may be reacted in the aqueous phase at pH 11-12 and room temperature to produce high purity magnesium hydroxide and regenerate ammonium sulfate. In one embodiment, iron may be precipitated as FeO(OH) at pH 8-9.

The one or more silicate compound, an oxide compound, a chloride compound, a hydroxide compound, a nitrate compound, a nitrite compound, a sulfite compound, and a sulfate compound (e.g., Ca- and Mg-hydroxides or silicates) may have a varying and adjustable pH. For example, the pH of the calcium- or magnesium-bearing compounds may be 2, 3, 4, 5, 6, 7, 8, 9, 10, 11, or 12, or any amount therebetween and may be adjusted. For example, in various embodiments, the precipitation of silica may occur at pH 2-3, iron oxide precipitation may occur at pH of 8-9 (if iron is present in the silicates), and precipitation of hydroxides may occur at a pH of 11-12.

The methods and systems described herein further include one or more carbon dioxide capture solvent or capture additive. As described herein, a carbon dioxide capture solvent or capture additive may include a carbon dioxide loaded aqueous solvent such as sodium glycinate, monoethanoamine (MEA), diethanolamine (DEA), piperazine (PZ), 2-amino-2-methyl-1-propanol (AMP) and methyl diethanolamine (MDEA). In one embodiment, the one or more carbon dioxide capture solvent or capture additive comprises an amine, an amino acid, an amino acid salt, an amine functional group for carbon dioxide capture, or a carboxyl functional group for carbon dioxide capture. Table 1 provides a list of examples of carbon dioxide capture solvent or capture additive.

TABLE 1

| List of solvents for $CO_2$ capture | | |
|---|---|---|
| Monoethanolamine | 3-(Aminomethyl) piperidine (3AM-PD) | 4-(3-Aminopropyl) morpholine (APMor) |
| Diethanolamine | N-methyl-diethanolamine (MDEA) | 1-(2-Hydroxyethyl) piperazine (HEP) |
| Monoethanoldiamine | 2-Amino-2-methyl-1-propanol (AMP) | 1,2-Bis(2-aminoethoxy) ethane (BAEE) |
| 2-Amino-2-methyl-1-propanol | 1,3-Diaminopentane (1,3-DAP) | Bis[2-(N,N-dimethylamino) ethyl] ether (BDMAEE) |
| Imidazole | 2-(Aminomethyl) piperidine (2AM-PD) | 3-(Dimethylamino)-1,2-propanediol (DMA-PDL) |
| 1-Methylimidazole | 4-Aminopiperidine (4A-PD) | 3-(Diethylamino)-1,2-propanediol (DEA-PDL) |
| 2-Methylimidazole | Diisopropanolamine (DIPA) | 2-(Diisopropylamino) ethanol (DIPAE) |
| 4(5)-Methylimidazole | 2-Amino-1-butanol (2-AB) | 3-Methoxypropylamine (MOPA) |
| 2-Ethylimidazole | 2-Amino-2-ethyl-1,3-propanediol (AEPD) | 2-(2-dimethylaminoethoxy)-ethanol |
| 1,2-Dimethylimidazole | 2-(Isopropylamino) ethanol (IPAE) | 3-dimethyl-amino-propan-1-ol |
| 2-Ethyl 4-methylimidazole | N,N-Dimethylglycine (DMG) | Pyridine |
| Triethylenediamine (TEDA) | L-Proline (L-Pro) | N,N,N',N'-tetramethylethylenediamine (TMEDA) |
| 3-Quinuclidinol (3-QD) | L-Proline (L-Pro) | Piperazine |
| 4-Hydroxy-1-methylpiperidine (HMPD) | 4-Hydroxy-L-proline (HL-Pro) | |
| 1-(2-Hydroxyethyl) piperidine (HEPD) | Benzylamine | |
| 4-(2-Hydroxyethyl) morpholine (HEMor) | N-benzylethanolamine | |
| Tropine | 4-(Aminomethyl) piperidine (4AM-PD) | |
| Dimethylaminoethoxyethanol (DMAEE) | 2,2,6,6-tetramethyl-piperidin-4-one | |
| 2-(Diethylamino) ethanol (DEEA) | | |

In one embodiment, when the carbon dioxide capture solvent or capture additive comprises an amine, the amine is selected from the group consisting of monoethanolamine, piperazine, diethanolamine, 2-amino-2-methyl-1-propanol, and methyldiethanolamine. In one embodiment, the carbon dioxide capture solvent or capture additive is not monoethanolamine. In another embodiment, when the carbon dioxide capture solvent or capture additive includes an amino acid or amino acid salt, that amino acid or amino acid salt is a glycine compound. In one embodiment, the glycine compound is glycinate. In yet another embodiment, the glycinate is sodium glycinate or potassium glycinate.

The concentration of the carbon dioxide capture solvent or capture additive may be any concentration suitable for the methods and processes of the present disclosure. In one embodiment, where the carbon dioxide capture solvent or capture additive includes an amino acid or amino acid salt, the concentration of the amino acid or the amino acid salt ranges from between about 0.1 wt % to about 50.0 wt %. For example, the amino acid or the amino acid salt may be about 0.1 wt %, about 0.5 wt %, about 1.0 wt %, about 2.0 wt %, about 3.0 wt %, about 4.0 wt %, about 5.0 wt %, about 6.0 wt %, about 7.0 wt %, about 8.0 wt %, about 9.0 wt %, about 10.0 wt %, about 11.0 wt %, about 12.0 wt %, about 13.0 wt %, about 14.0 wt %, about 15.0 wt %, about 16.0 wt %, about 17.0 wt %, about 18.0 wt %, about 19.0 wt %, about 20.0 wt %, about 25.0 wt %, about 30.0 wt %, about 35.0 wt %, about 40.0 wt %, about 45.0 wt %, or about 50.0 wt % of the capture solvent or capture additive, or any amount therebetween. In one embodiment, the concentration of the amino acid or the amino acid salt is between about 0.1 M and about 10.0 M. For example, the amino acid salt may be about 0.1 M, 0.2 M, 0.3 M, 0.4 M, 0.5 M, 0.6 M, 0.7 M, 0.8 M, 0.9 M, 1.0 M, 2.0 M, 3.0 M, 4.0 M, 5.0 M, 6.0 M, 7.0 M, 8.0 M, 9.0 M, 10.0 M, or any amount therebetween.

In one embodiment, where the carbon dioxide capture solvent or capture additive includes an amine, the concentration of the amine is between about 0 wt % to about 50 wt %. For example, the amine may be about 0 wt %, 0.5 wt %, 1.0 wt %, 2.0 wt %, 3.0 wt %, 4.0 wt %, 5.0 wt % 6.0 wt % 7.0 wt % 8.0 wt % 9.0 wt % 10 wt %, 15 wt %, 20 wt %, 25 wt %, 30 wt %, 35 wt %, 40 wt %, 45 wt %, 50 wt %, or any amount therebetween.

The $CO_2$ capture solvent and/or capture additive may, in one embodiment, be aqueous solvent with amine dissolved therein. The $CO_2$ capture solvent and/or capture additive may, in one embodiment, further comprise providing one or more additional solvents. The additional solvent may be used to create a liquid or aqueous solution. The one or more additional solvent may be, for example, water.

The methods and systems described herein are effective to produce one or more solid inorganic carbonate compounds and/or one or more solid inorganic bicarbonate compounds. In one embodiment, the one or more solid inorganic carbonate compounds and/or one or more solid inorganic bicarbonate compounds may be, for example, magnesite, hydrated magnesium carbonates, calcite, vaterite, aragonite, lithium carbonate, $CaCO_3$, $MgCO_3$, $LiCO_3$, or any combination thereof.

The solid inorganic carbonate compounds of the present disclosure may be, for example, magnesite, hydrated magnesium carbonates, calcite, vaterite, aragonite, calcium carbonate ($CaCO_3$), magnesium carbonate ($MgCO_3$), and lithium carbonate ($LiCO_3$), sodium carbonate ($Na_2CO_3$), potassium carbonate ($K_2CO_3$), caesium carbonate ($Cs_2CO_3$), ammonium bicarbonate ($(NH_4)_2HCO_3$), and any combination thereof.

A calcium-bearing carbonate may include, for example, calcite, vaterite, and/or aragonite. A desirable feature of the disclosed reaction is to optimize the conditions to allow formation of desirable and stable carbonates. Calcite, for example, is a stable form and desirable product. A magnesium-bearing carbonate may include, for example, magnesite and hydrated magnesium carbonates. Magnesium, for example, is stable and desirable product.

In one embodiment, the method further includes producing water soluble carbonates via anti-solvent crystallization. Water soluble carbonates as described herein may include but are not limited to $NaHCO_3$ and $KHCO_3$.

The reaction conditions used in the methods and systems described herein may occur at a temperature range of between about 0° C. to about 200° C., in particular 100° C. or below, or between about 0° C. and about 100° C. For example, the temperature range may be between about 0° C. to about 200° C.; between about 0° C. and about 175° C.; between about 0° C. and about 150° C.; between about 0° C. and about 125° C.; between about 0° C. and about 100° C.; between about 25° C. and about 175° C.; between about 25° C. and about 150° C.; between about 25° C. and about 125° C.; between about 25° C. and about 100° C.; and any range therebetween. In one embodiment, the temperature may be 100° C. or less. For example, the temperature range may be between about 50° C. and about 100° C.; between about 0° C. and about 50° C.; between about 25° C. and about 75° C.; and any range therebetween. The temperature may be, for example, about 1° C., about 5° C., about 10° C., about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., or any temperature therebetween. In one embodiment, reacting said one or more precursor compounds with said one or more $CO_2$ capture solvents and/or capture additives occurs at a temperature below 100° C. In one embodiment, said reacting occurs at a temperature between about 25° C. and about 90° C.

The reaction conditions used in the methods and systems described herein may occur at a pressure range of between about 0.01 atm and about 10 atm. In one embodiment, reacting said one or more precursor compound with said one or more $CO_2$ capture solvents and/or capture additives occurs at a pressure of between about 0.1 atm and about 10 atm. The pressure may be, for example, between about 0.01 atm and about 25 atm; between about 0.01 atm and about 20 atm; between about 0.01 atm and about 15 atm; between about 0.01 atm and about 10 atm; between about 0.01 atm and about 5 atm; between about 0.01 atm and about 4 atm; between about 0.01 atm and about 3 atm; between about 0.01 atm and about 2 atm; between about 0.01 atm and about 1.5 atm; between about 0.01 atm and about 1.25 atm; between about 0.01 atm and about 1.0 atm; between about 0.5 atm and about 1.5 atm; between about 0.75 atm and about 1.25 atm, or any pressure therebetween. The pressure may, for example, be between 0.5 atm and about 10 atm; between about 0.5 atm and about 9 atm; between about 0.5 atm and about 8 atm; between about 0.5 atm and about 7 atm; between about 0.5 atm and about 6 atm; between about 0.5 atm and about 5 atm; between about 0.5 atm and about 1.5 atm; between about 1 atm and 10 atm; between about 0.1 atm and about 5 atm; between about 5 atm and about 10 atm, or any pressure therebetween. The pressure may be, for example about 0.1 atm, about 0.2 atm, about 0.3 atm, about 0.4 atm, about 0.5 atm, about 0.6 atm, about 0.7 atm, about 0.8 atm, about 0.9 atm, about 1 atm, about 1.5 atm, about 2 atm, about 2.5 atm, about 3 atm, about 3.5 atm, about 4 atm, about 4.5 atm, about 5 atm, about 5.5 atm, about 6 atm, about 6.5 atm, about 7 atm, about 7.5 atm, about 8 atm, about 8.5 atm, about 9 atm, about 9.5 atm, about 10 atm, or any pressure therebetween. In one embodiment, the pressure may be at or about 1 atm. In one embodiment, said reacting occurs at about atmospheric pressure. Alternatively, the pressure may be between about 10 atm and about 25 atm; between about 10 atm and about 20 atm; between about 10 atm and about 15 atm; between about 15 atm and about 30 atm; between about 20 atm and about 30 atm; between about 25 atm and about 30 atm, and/or any range therebetween. In other examples, the pressure may be as high as 200 atm.

In the methods and processes described herein, in one embodiment, the reacting occurs under continuous stirring conditions. The rate of stirring may be, for example, between about 10 rpm and about 500 rpm. For example, the rate of stirring may be between about 15 rpm and about 475 rpm; between about 25 rpm and about 450 rpm; between about 50 rpm and about 425 rpm; between about 75 rpm and about 400 rpm; between about 100 rpm and about 375 rpm; between about 125 rpm and about 350 rpm; between about 150 rpm and about 325 rpm; between about 175 rpm and about 300 rpm; between about 200 rpm and about 400 rpm; between about 225 rpm and about 375 rpm; between about 250 rpm and about 350 rpm; between about 275 rpm and about 325 rpm, and/or any range therebetween. In one embodiment, the continuous stirring conditions occur at a rate between about 250 rpm and about 350 rpm. In one embodiment, the continuous stirring conditions occur at a rate between about 250 rpm and about 350 rpm. For example, the rate may be about 250 rpm, about 275 rpm, about 300 rpm, about 325 rpm, about 350 rpm, or any rate therebetween. Alternatively, the reacting may occur in non-continuous stirring conditions or intermittent stirring conditions.

The reaction conditions used in the methods described herein may occur for varying periods of time. Reaction conditions may occur for between about 30 minutes and about 25 hours, for example, between about 1 hour and about 25 hours; between about 5 hours and about 20 hours; between about 10 hours and about 15 hours; between about 1 hours and about 10 hours; between about 1 hour and about 9 hours; between about 1 hour and about 8 hours; between about 1 hour and about 7 hours; between about 1 hour and about 6 hours; between about 1 hour and about 5 hours; between about 1 hour and about 4 hours; between about 1 hour and about 3 hours; between about 1 hour and about 2 hours; between about 2 hours and about 7 hours; and/or any range therebetween. For example, the reaction conditions may occur for about 1 hour, about 2 hours, about 3 hours, about 4 hours, about 5 hours, about 6 hours, about 7 hours, about 8 hours, about 9 hours, and/or any amount of time therebetween. In one embodiment of the methods and processes described herein, there is a reaction time of between about 1 hour and about 15 hours or any amount of time therebetween. For example, the reaction time may be about 1 hour, about 1.5 hours, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 8.5 hours, about 9 hours, about 9.5 hours, about 10 hours, about 10.5 hours, about 11 hours, about 11.5 hours, about 12 hours, about 12.5 hours, about 13 hours, about 13.5 hours, about 14 hours, about 14.5 hours, about 15 hours, or any amount of time therebetween.

The reaction conditions may occur in a single step or in two or more steps. In one embodiment, the reacting occurs in a single step. In another embodiment, the reacting occurs in two or more steps and wherein carbon dioxide capture is decoupled from production of one or more carbonate compound. In one embodiment, the one or more carbon dioxide capture solvent or capture additive is loaded with carbon dioxide.

The method may in certain examples regenerate a $CO_2$ capture solvent and/or a capture additive. In one embodiment, the method further comprises regenerating the one or more $CO_2$ capture solvents and/or capture additives.

In one embodiment, the method further includes providing one or more additional solvents. In another embodiment, the method further includes regenerating the one or more carbon dioxide capture solvent or capture additive. In one embodiment, the method further includes capturing carbon dioxide via the one or more carbon dioxide capture solvent or capture additive under conditions effective to form a carbon dioxide loaded state of the one or more carbon dioxide capture solvent or capture additive. In another embodiment, the one or more carbon dioxide capture solvent or capture additive changes from a carbon dioxide loaded state to a carbon dioxide release state upon converting carbon dioxide to one or more solid inorganic carbonate compound. In yet another embodiment, the one or more carbon dioxide capture solvent or capture additive repeatedly captures gaseous carbon dioxide and releases carbon dioxide to the one or more solid inorganic carbonate compound in a loop process.

As described herein, the methods and process may further include, in one embodiment, providing a carbonate compound size modulator. The carbonate compound size modulator may be a surfactant. In one embodiment, the surfactant is a cationic surfactant. Suitable cationic surfactants include, but are not limited to, $C_{12}$-$C_{18}$ alkyl dimethylammonium acetamide, $C_{12}$-$C_{18}$ alkyl trimethylammonium, and mixtures thereof. Examples of such cationic surfactants are cetyldimethylammonium acetamide, octadecyl-dimethylammonium acetamide, tetradecyl-dimethylammonium acetamide, dodecyl-dimethylammonium acetamide, cetyltrimethylammonium, octadcecyl-trimethylammonium, tetradecyl-trimethylammonium, dodecyl-trimethylammonium, dimethyldioctadecylammonium, dioctadecyldimethylammonium, and mixtures thereof. Suitable sources of these cations of the cationic surfactant include, but are not limited to, alkyltrimethylammonium salts: such as cetyl trimethylammonium bromide (CTAB) or cetyl trimethylammonium chloride (CTAC); cetylpyridinium chloride (CPC); dimethyldioctadecylammonium chloride; dioctadecyldimethylammonium bromide (DODAB); cetyldimethylammonium acetamide bromide; or other cationic surfactant alike, including lipids. Alternatively, the surfactant may be benzyl hexadecyl dimethyl ammonium chloride (BHDC).

In one embodiment, the method includes producing one or more acid and one or more base by electrochemical decomposition of waste water. Such an embodiment is particularly useful when carbon mineralization is sought in remote locations with silica materials, industrial residues, and mine-tailings (e.g., kimberlite tailings generated during diamond mining), where lack of access to point-source emissions of carbon dioxide and processing water with low salt concentrations are otherwise barriers to deployment. In such an embodiment, carbon dioxide from air may be captured by use of regenerable, environmentally benign solvents including, for example, sodium glycinate as described herein. Carbon dioxide-loaded solvents may react to produce magnesium carbonate, while regenerating the solvent. Simultaneously, acids (e.g., HCl) and bases (e.g., NaOH, $Ca(OH)_2$, and $Mg(OH)_2$) may be electrochemically produced from brines recovered from geological carbon storage in remote locations. Acids may then, in one embodiment, be used to accelerate dissolution of magnesium silicate materials abundant in mine tailings, and the alkaline earth bases may be mineralized into Ca- and Mg-carbonates. The NaOH may, in one embodiment, be used to regenerate sodium glycinate solvents.

A second aspect relates to a method of producing one or more solid inorganic bicarbonate compound by capturing, converting, and storing carbon dioxide. The method includes providing one or more precursor compound; providing one or more carbon dioxide capture solvent or capture additive; and reacting said one or more precursor compound with said one or more carbon dioxide capture solvent or capture additive under conditions effective to produce one or more solid inorganic bicarbonate compound.

This aspect is carried out in accordance with the previously described aspect.

In one embodiment, the one or more precursor compound is a non-bicarbonate metal species.

In one embodiment, the one or more solid inorganic bicarbonate compound includes calcium bicarbonate ($Ca(HCO_3)$), magnesium bicarbonate ($Mg(HCO_3)_2$), and lithium bicarbonate ($LiHCO_3$), sodium bicarbonate ($NaHCO_3$), potassium bicarbonate ($KHCO_3$), caesium bicarbonate ($CsHCO_3$), ammonium bicarbonate ($NH_4HCO_3$), carbonic acid ($H_2CO_3$), or any combination thereof.

A third aspect relates to a system for producing one or more solid inorganic carbonate compound by capturing, converting, and storing carbon dioxide. The system includes one or more precursor compound; one or more carbon dioxide capture solvent or capture additive; and a reactor, wherein said one or more precursor compound and said one or more carbon dioxide capture solvent or capture additive react in said reactor under conditions effective to produce one or more solid inorganic carbonate compound.

This aspect is carried out in accordance with the previously described aspects.

The system described herein may, in one embodiment, include a rotating inner chamber. The system may in one embodiment include a fixed outer chamber. The rotating inner chamber and fixed outer chamber are exemplified in FIGS. 25 and 34.

In one embodiment, the reactor comprises a first inlet, and said first inlet is positioned to accept carbon dioxide loaded capture solvent or capture additive. For example, the first inlet may accept 10-50 wt % carbon dioxide loaded aqueous solvents. The aqueous solvents may be, in one example, sourced from flue gas from power plants or industrial facilities. The solvents may be regenerated in one example. The first inlet is exemplified in FIGS. 25 and 34.

In one embodiment, the reactor comprises a second inlet, and said second inlet is positioned to accept one or more precursor compound. For example, the second inlet may accept 5-50 wt % slurry of calcium- or magnesium-bearing materials in water and calcium- or magnesium-bearing solutions obtained from dissolving alkaline materials. In one embodiment, the reactor comprises an outlet, and said outlet comprises an exit stream for said one or more solid inorganic carbonate compound. The second inlet and the outlet are exemplified in FIGS. 25 and 34.

The system may include a variety of additional features to improve functionality. For example, in one embodiment, the system further includes one or more pH probe. In another embodiment, the system further includes one or more sample withdrawal port. In yet another embodiment, the system further includes one or more temperature sensor. In another embodiment, the reactor controls particle size of one or more solid inorganic carbonate compound.

A fourth aspect relates to a system for producing one or more solid inorganic bicarbonate compound by capturing, converting, and storing carbon dioxide. The system includes one or more precursor compound; one or more carbon dioxide capture solvent or capture additive; and a reactor, wherein said one or more precursor compound and said one or more carbon dioxide capture solvent or capture additive react in said reactor under conditions effective to produce one or more solid inorganic bicarbonate compound.

This aspect is carried out in accordance with the previously described aspects.

In the following description, reference is made to the accompanying drawings that form a part hereof, and in which is shown by way of illustration specific embodiments which may be practiced. These embodiments are described in detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense.

The present disclosure may be further illustrated by reference to the following examples.

EXAMPLES

The following examples are intended to illustrate, but by no means are intended to limit, the scope of the present disclosure as set forth in the appended claims.

Example 1—Schematic Representation of Use of Amine-Bearing Solvents to Enhance Carbon Dioxide Hydration Via the Enhanced Formation of Bicarbonate and Carbonate Species The hypothesis is evaluated that utilizing aqueous amine-bearing solvents such as monoethanolamine (MEA) enhances $CO_2$ hydration via the enhanced formation of bicarbonate and carbonate species in the aqueous phase at relatively low temperature and low pressure. Carbonate and bicarbonate ions then react with dissolved Ca and Mg in the aqueous phase to produce Ca- and Mg-carbonates. FIG. 1 is a schematic representation of the proposed mechanism. The integrated gas-liquid-solid reaction pathways shown in FIG. 1 represents the coupling of multiple reactions including enhanced $CO_2$ capture and hydration using MEA solvents, mineral dissolution and carbonate precipitation. Alternatively, $CO_2$-loaded amine-bearing solutions can be directly reacted with oxides, hydroxides or silicates of Ca and Mg in a slurry reaction environment to produce Ca- and Mg-carbonates. Both pathways involve the looping of the amine-bearing solvents from the $CO_2$-loaded to $CO_2$-release states by converting $CO_2$ to Ca- and Mg-carbonates. This novel aqueous alkaline amine looping process was successfully demonstrated for the accelerated mineralization of calcium oxide and calcium chloride to produce calcium carbonate. Liu & Gadikota, "Integrated $CO_2$ Capture, Conversion, and Storage To Produce Calcium Carbonate Using an Amine Looping Strategy," *Energy & Fuels* 33:1722-1733 (2018); Ji et al., "Integrated Absorption-Mineralisation for Low-energy $CO_2$ Capture and Sequestration," *Appl. Energy* 225: 356-366 (2018); and Arti et al., "Single Process of $CO_2$ Capture and Mineralization in Various Alkanolamines Using Calcium Chloride," *Energy and Fuels* 31:763-69 (2017), all of which are hereby incorporated by reference in their entirety. Carbonate-induced solidification of calcium silicate using MEA was extensively studied. Bobicki et al., "Carbon Capture and Storage Using Alkaline Industrial Wastes," *Prog. Energy Combust. Sci.* 38:302-320 (2012); Li et al., "A Novel Strategy for Carbon Capture and Sequestration by rHLPD Processing," *Front. Energy Res.* 3:53 (2016); and U.S. Patent Application Publ. No. 2011/0182799 to Riman et al., all of which are hereby incorporated by reference in their entirety.

However, the carbon mineralization of Mg-bearing oxides, hydroxides or silicates using aqueous alkaline amine looping approach has not been established. Given the abundance of Mg-bearing minerals around the world, evaluating the reactivity of Mg-bearing minerals to produce Mg-bearing carbonates using the aqueous alkaline amine looping approach needs to be explored. Shand, M. A., The Chemistry and Technology of Magnesia Wiley-Interscience (2006) and Falkowski et al., "The Global Carbon Cycle: A Test of our Knowledge of Earth as a System," *Science* 290:291-296 (2000), both of which are hereby incorporated by reference in their entirety. The successful demonstration of the proposed process will allow for the unlocking of the potential of vast resources of Mg-bearing minerals for the accelerated capture, conversion and storage of $CO_2$ in a single step. The aim of this is to explore the feasibility of using Mg-bearing materials using simple precursors such as magnesium oxide for the accelerated capture, conversion and storage of $CO_2$ to produce magnesium carbonates. To achieve this aim, several research questions need to be addressed: (i) What is the influence of reaction temperature and MEA composition on the extent of carbon mineralization of magnesium oxide? (ii) What is the chemical composition of the carbonate-bearing materials? (3) How do the structural and morphological features of MgO dynamically evolve in these fluidic environments?

To address these research questions, laboratory-scale experiments were designed to probe the sensitivity of carbon mineralization behavior on the reaction conditions such as temperature and the composition of the MEA. This gas-liquid-solid reaction environment was designed for a constant pressure of 1 atm. The influence of aqueous phase compositions of 10-50 wt % MEA at temperatures in the range of 25° C.-90° C. on the carbon mineralization behavior of MgO was probed. A slurry composition of 15 wt % solid was held constant for all the experiments. Continuous stirring at the rate of 300 rpm±5 rpm was maintained to reduce mass transfer limitations. A second of experiments were designed to probe dynamic time-resolved structural and microstructural evolution of magnesium oxide as it is reacted to produce magnesium carbonate using Ultra Small/Small/Wide Angle X-Ray Scattering (USAXS/SAXS/WAXS) measurements. Liu & Gadikota, "Probing the Influence of Thermally Induced Structural Changes on the Microstructural Evolution in Shale Using Multiscale X-ray Scattering Measurements," *Energy & Fuels* 32:8193-8201 (2018); Liu & Gadikota, "Phase Evolution and Textural Changes During the Direct Conversion and Storage of $CO_2$ to Produce Calcium Carbonate From Calcium Hydroxide," Geosciences 8:445 (2018); Gadikota et al., "In Situ Angstrom-to-Micrometer Characterization of the Structural and Microstructural Changes in Kaolinite on Heating Using Ultrasmall-Angle, Small-Angle, and Wide-Angle X-ray Scattering (USAXS/SAXS/WAXS)," *Ind. Eng. Chem. Res.*, 56:11791-11801 (2017); Ilavsky et al., "Ultra-Small-Angle X-Ray Scattering at the Advanced Photon Source," *J. Appl. Crystallogr.* 42:469-479 (2009); Ilavsky et al., "Ultra-Small-Angle X-Ray Scattering Instrument at the Advanced Photon Source: History, Recent Development, and Current Status," *Metall. Mater. Trans. A Phys. Metall. Mater. Sci.* 44:68-76

(2013); and Benedetti et al., "Analysis of Textural Properties of CaO-Based $CO_2$ Sorbents by Ex Situ USAXS," *Chem. Eng. J.* 355:760-776 (2019); and Ilavsky et al., "Development of Combined Microstructure and Structure Characterization Facility for In Situ and Operando Studies at the Advanced Photon Source," *J. Appl. Crystallogr.* 51:867-882 (2018), all of which are hereby incorporated by reference in their entirety. Further, Grazing Incidence-Small Angle X-Ray Scattering (GI-SAXS) measurements were performed to determine the size of the nucleating magnesium carbonate particles on silica interfaces. This comprehensive research approach was used to evaluate the effectiveness of the coupled reaction pathways in directing the synthesis of magnesium carbonates in multiphase reaction environments and the underlying structural and morphological basis for the observed reactivity.

Example 2—Experimental Materials and Methods for Examples 3-5

Magnesium oxide used in this integrated carbon mineralization approach with aqueous alkaline amine looping approach was procured from Sigma-Aldrich. The mean particle size, surface area, and cumulative pore volume of magnesium oxide are 8.54 μm, 3.59 $m^2/g$, and 0.0078 $cm^3/g$, respectively. Monoethanolamine (MEA) with a purity of 98% used in these studies was procured from Alfa Aesar.

Aqueous alkaline amine looping process for accelerated carbon mineralization—The experiments to evaluate the influence of temperature and MEA concentrations on the accelerated conversion of magnesium oxide to magnesium carbonate using the aqueous alkaline amine looping process were performed in a batch environment (Parr Reactor, Series 4590 Micro Stirred Reactor). The slurry environment comprised 17 g of liquid and 3 g of solid sample. Aqueous phase compositions comprising deionized water, 10, 30, and 50 wt % MEA were used. $CO_2$ partial pressure of 1 atm was maintained throughout the length of the experiments. A constant stirring rate of 300 rpm±5 rpm was applied. Each experiment was performed over a length of 3 hours. Extents of carbon mineralization at reaction temperatures of 25° C., 50° C., 75° C. and 90° C. were evaluated. About 5-10 minutes were needed to reach the desired reaction temperature, which marked the beginning of the experiment. All experiments were performed over 3 hours. At the end of 3 hours, vacuum filtration was used to separate the liquid contents from the solids. The recovered solid was dried in a vacuum oven for 24 hours at 90° C. to remove any residual water in the solid sample.

Characterization of chemical and morphological properties—The carbon mineralization efficiency using the aqueous alkaline amine looping process was evaluated based on the extent of magnesium mineralized to produce magnesium carbonate. The carbonate content used in these calculations was determined using Thermogravimetric Analyses (TGA, TGA 550, TA Instruments). TGA data provides quantitative information into the changes in the weight of the samples on heating at specific temperatures. The heating rate was set to 5° C./min from 25° C. to 800° C. and the flow rate of the $N_2$ gas was 25 mL/min. The carbonate content in nesquehonite was determined from the weight change in the temperature range of 350° C.-450° C. Swanson et al., "Directed Precipitation of Hydrated and Anhydrous Magnesium Carbonates for Carbon Storage," *Phys. Chem. Chem. Phys.* 42:23440-23450 (2014), which is hereby incorporated by reference in its entirety. The stoichiometric mass of MgO needed for storing a unit mass of $CO_2$ was defined as $R_{CO_2}$. Gadikota et al., "Experimental Design and Data Analysis for Accurate Estimation of Reaction Kinetics and Conversion for Carbon Mineralization," *Ind. Eng. Chem. Res.* 53:6664-6676 (2014) and Gerdemann et al., "Ex Situ Aqueous Mineral Carbonation," *Environ. Sci. Technol.* 41:2587-2593 (2007), both of which are hereby incorporated by reference in their entirety. As reported in previous studies, the extent of carbon mineralization, $Y_{CO_2,TGA}$, a measure of the ratio of the amount of $CO_2$ present in the sample with respect to the $CO_2$ storage capacity was determined by the following relationship: $Y_{CO_2,TGA}=R_{CO_2}\times(TGA/100-TGA)\times100\%$ where TGA represents the weight change that corresponds to the carbonate content in the reacted materials. To identify the species in the aqueous and solid phases, Attenuated Total Reflection-Fourier Transform Infrared spectroscopy analyses were performed (ATR-FTIR, Thermo Fisher Nicolet iS 10). The spectra were collected in the range of 650~4000 $cm^{-1}$. The morphological features of the products were determined using Scanning Electron Microscopy (SEM, Hitachi High Technologies America, Hitachi S3400-N). The changes in the porosity and specific surface area of the powders were determined using the Brunauer-Emmett-Teller technique (BET, Quantachrome NOVAtouch® Analyzer, Boynton Beach, FL).

Time-resolved structural and microstructural features as MgO is reacted in the aqueous amine looping process were determined using in-operando Ultra Small/Small/Wide Angle X-Ray Scattering (USAXS/SAXS/WAXS) measurements at Sector 9-ID at the Advanced Photon Source (APS) in Argonne National Laboratory (ANL). Liu & Gadikota, "Probing the Influence of Thermally Induced Structural Changes on the Microstructural Evolution in Shale Using Multiscale X-ray Scattering Measurements," *Energy & Fuels* 32:8193-8201 (2018); Liu & Gadikota, "Chemo-morphological Coupling During Serpentine Heat Treatment for Carbon Mineralization," *Fuel* 227:379-385 (2018); Gadikota et al., "In Situ Angstrom-to-Micrometer Characterization of the Structural and Microstructural Changes in Kaolinite on Heating Using Ultrasmall-Angle, Small-Angle, and Wide-Angle X-ray Scattering (USAXS/SAXS/WAXS)," *Ind. Eng. Chem. Res.*, 56:11791-11801 (2017); Liu & Gadikota, "Phase Evolution and Textural Changes During the Direct Conversion and Storage of $CO_2$ to Produce Calcium Carbonate From Calcium Hydroxide," *Geosciences* 8:445 (2018); Ilavsky et al., "Ultra-Small-Angle X-Ray Scattering at the Advanced Photon Source," *J. Appl. Crystallogr.* 42:469-479 (2009); Ilavsky et al., "Development of Combined Microstructure and Structure Characterization Facility for In Situ and Operando Studies at the Advanced Photon Source," *J. Appl. Crystallogr.* 51:867-882 (2018); Gadikota et al., "Towards Understanding the Microstructural and Structural Changes in Natural Hierarchical Materials for Energy Recovery: In-operando Multi-Scale X-Ray Scattering Characterization of Na- and Ca-Montmorillonite on Heating to 1150° C.," *Fuel* 196:195-209 (2017), all of which are hereby incorporated by reference in their entirety. The arrangement comprised of a cell with a continuous flow of $CO_2$ at the rate of 10 mL/min. In this in-situ measurement, 1 mL 30 wt % $CO_2$-loaded MEA and 0.15 g MgO were added to an NMR tube with an internal diameter of 4 mm. $CO_2$ was continuously supplied to the aqueous phase to ensure high concentrations of inorganic carbon in the aqueous phase. The acquisition times for USAXS, SAXS, and WAXS were 90 s, 20 s, and 30 s respectively. Silver behenate was used to calibrate SAXS and LaB6 was used to calibrate WAXS measurements. Black et al., "Certification of NIST Standard Reference Material 640d," *Powder Diffr.* 25:187-190 (2010), which is hereby incorporated by reference in its entirety. The total X-ray flux, energy and corresponding wavelength were $10^{-13}$ photon $s^{-1}$, 21.0 keV, and 0.59 Å, respectively. Irena (Ilavsky et al., "Irena: Tool Suite for Modeling and Analysis of Small-Angle Scattering," *J. Appl. Crystallogr.* 42:347-353 (2009), which is hereby incorporated by reference in its entirety) and Nika (Ilavsky, J., "Nika: Software for Two-Dimensional Data Reduction," *J. Appl. Crystallogr.* 45:324-326 (2012), which is hereby incorporated by reference in its entirety) software packages embedded in IgorPro (Wavemetrics, Lake Oswego, OR) were used for data analyses. Ilavsky et al., "Irena: Tool Suite for Modeling and Analysis of Small-Angle Scattering," *J. Appl. Crystallogr.* 42:347-353 (2009) and Frykstrand et al., "On the Pore Forming Mechanism of Upsalite, a Micro- and Mesoporous Magnesium Marbonate," *Microporous Mesoporous Mater.* 190:99-104 (2014), both of which are hereby incorporated by reference in their entirety. To capture the hierarchical morphological features during the carbonation of MgO, the combined USAXS/SAXS data were modeled using the "Modeling II" tool in Irena package. Ilavsky et al., "Irena: Tool Suite for Modeling and Analysis of Small-Angle Scattering," *J. Appl. Crystallogr.* 42:347-353 (2009), which is hereby incorporated by reference in its entirety.

Figures 7A, 7B, 7C, 7D:
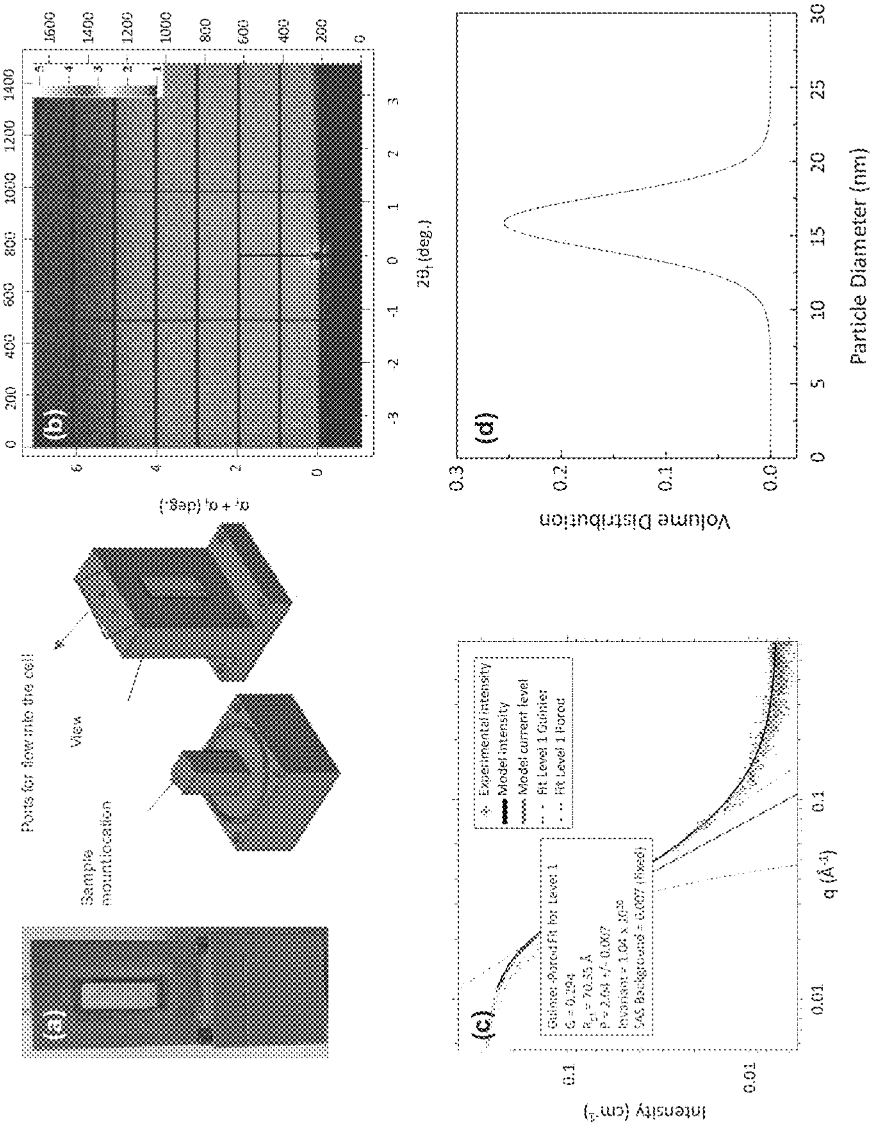
FIGS. 7A-7D show results of magnesium carbonate particles.

In-situ Grazing Incidence—Small Angle X-Ray Scattering (GI-SAXS) measurements were performed to determine the sizes of the nucleating particles. These measurements were conducted at the beamline 12 ID-B at the Advanced Photon Source (Argonne National Laboratory, USA). A custom designed cell was used for these measurements. The internal dimensions of this cell are 10 mm×10 mm×15 mm. 30 wt % $CO_2$-loaded MEA solution with a volume of 0.1988 mL was injected into 5 mL of 0.1 M $Mg(NO_3)_2$ solution, which marked the beginning of the in-situ measurement. The X-ray beam was directed to the substrate with an incidence angle of $\alpha_i$=0.11° through the two Kapton windows. This incident angle is lower than the critical angle for total reflection ($\alpha_c$-quartz=0.14° at 14 KeV incident X-ray energy). The scattered intensity from the nucleated magnesium carbonate particles was collected using a 2-dimensional Pilatus 2 M detector (Dectris Ltd., Baden, Switzerland). The incidence X-Ray energy, a sample-to-detector distance (ds-d), and q-range for these measurements were 14 keV, 2060 mm, and 0.005 $Å^{-1}$ to 0.6 $Å^{-}$, respectively. After background subtraction and 2D data reduction, the reduced data was fitted by Guinier-Porod fit[60] as shown in FIG. 7C. The equations that describe the relationships of the generalized Guinier Law are listed below. Hammouda, B., "A New Guinier-Porod Model," *J. Appl. Crystallogr.* 43:716-719 (2010), which is hereby incorporated by reference in its entirety.

$$I(Q) = \frac{G}{Q_s}\exp\left(\frac{-Q^2R_g^2}{3-s}\right) \text{ for } Q \le Q_1 \quad \text{(Equation 1)}$$

$$I(Q) = \frac{D}{Q^d} Q \ge Q_1 \quad \text{(Equation 2)}$$

$$Q_1 = \frac{1}{R_g}\left(\frac{3d}{2}\right)^{1/2} \quad \text{(Equation 3)}$$

$$D = G\exp\left(\frac{-Q^2R_g^2}{3}\right)Q_1^d = G\exp\left(\frac{-d}{2}\right)\left(\frac{3d}{2}\right)^{\frac{d}{2}}\frac{1}{R_g^d} \quad \text{(Equation 4)}$$

G and D are the Guinier and Porod scale factors. Q is the scattering variable, I(Q) is the scattered intensity, $R_g$ is the radius of gyration, d is the Porod exponent. $Q_1$ is set up to ensure the continuity of the slopes (derivatives). A dimensionality parameter (3-s) is defined to provide more flexibility for modeling different shapes of objects. For example, objects with spherical, rod-like, and lamellae or platelet dimensions, s=0, 1; or 2, respectively. Hammouda, B., "A New Guinier-Porod Model," *J. Appl. Crystallogr.* 43:716-719 (2010), which is hereby incorporated by reference in its entirety. The $R_g$ and Porod scale factors are calculated based on the equations represented above.

Example 3—Effect of Temperature and MEA Concentration

To evaluate the influence of temperature and MEA concentration on the extent of carbon mineralization of MgO, multiphase reaction environments are constructed. The pressure of $CO_2$ in the gas phase is held at 1 atm over the course of the experiment. The slurry was composed of 15 wt % solid. MEA compositions were evaluated as 10, 20, 30 and 50 wt % at temperatures of 25° C., 50° C., 75° C., and 90° C. Reaction times were set to 3 hours and the stirring rates at 300 rpm±5 rpm. The extents of carbon mineralization of MgO as a function of MEA concentration and temperature are noted in FIG. 2 and summarized in Table 2.

TABLE 2

The extents of carbon mineralization of MgO as a function of MEA concentrations and temperatures.

| Temperature | $H_2O$ | 10 wt % MEA | 20 wt % MEA | 30 wt % MEA | 50 wt % MEA |
|---|---|---|---|---|---|
| 25° C. | 8.1 | 2.1 | 1.6 | 1.5 | 4.2 |
| 50° C. | 18.1 | 32.7 | 46.9 | 70.2 | 12.2 |
| 75° C. | 42.0 | 46.3 | 52.4 | 62.2 | 52.7 |
| 90° C. | 27.8 | 32.4 | 37.5 | 35.6 | 24.2 |

A non-linear relationship of the influence of temperature and MEA on the carbon mineralization of MgO was noted. The highest conversion of MgO to magnesium carbonate achieved with 30 wt % MEA at 50° C. is 70%. Subsequent increase in reaction temperature resulted in a lower extent of carbon mineralization. This is a result of the competing effects of temperature on $CO_2$ absorption and carbon mineralization. Temperatures below 50° C. favor $CO_2$ absorption in MEA[61] but the kinetics of carbon mineralization are slow. Higher temperatures favor carbon mineralization but the equilibrium constant associated with $CO_2$ uptake in MEA decreases as the reaction temperature increases. Gupta et al., "Modeling Temperature Dependency of Amine Basicity Using PCM and SM8T Implicit Solvation Models," *J. Phys. Chem. B.* 116:1865-1875 (2012) and Kim et al, "Heat of Absorption of Carbon Dioxide ($CO_2$) in Monoethanolamine (MA) and 2-(Aminoethyl)ethanolanine (AEE A) Solutions," *Ind. Eng. Chem. Res.* 46:5803-5809, both of which are hereby incorporated by reference in their entirety. As a result, there is a non-monotonic dependence in the combined absorption-mineralization behavior of MgO with temperature.

At similar experimental conditions, 100% conversion of CaO to calcium carbonate was reported. Liu & Gadikota, "Integrated $CO_2$ Capture, Conversion, and Storage To Produce Calcium Carbonate Using an Amine Looping Strategy," *Energy & Fuels* 33:1722-1733 (2018), which is hereby incorporated by reference in its entirety. As MEA concentrations are increased starting from DI water to 10 wt % and 20 wt % MEA, high conversions of MgO to magnesium carbonate are achieved at 75° C. At 30 wt % MEA, higher extents of carbon mineralization were achieved at 50° C. At 50 wt % MEA, gel formation was noted with MgO which made it challenging to separate the solid and liquid constituents. The hypothesis is that the enhanced hydrogen bonding resulting from the interactions between the dissolved fluidic constituents result in gel formation. This observation is consistent with the formation of magnesium carbonate-based porous gels. Frykstrand et al., "On the Pore Forming Mechanism of Upsalite, a Micro- and Mesoporous Magnesium Marbonate," *Microporous Mesoporous Mater.* 190:99-104 (2014), which is hereby incorporated by reference in its entirety. The hypothesis for the limited reactivity of MgO at high concentrations of MEA, i.e., 50 wt % emerges from the mass transfer limitations caused by gel formation.

Figures 3A, 3B:
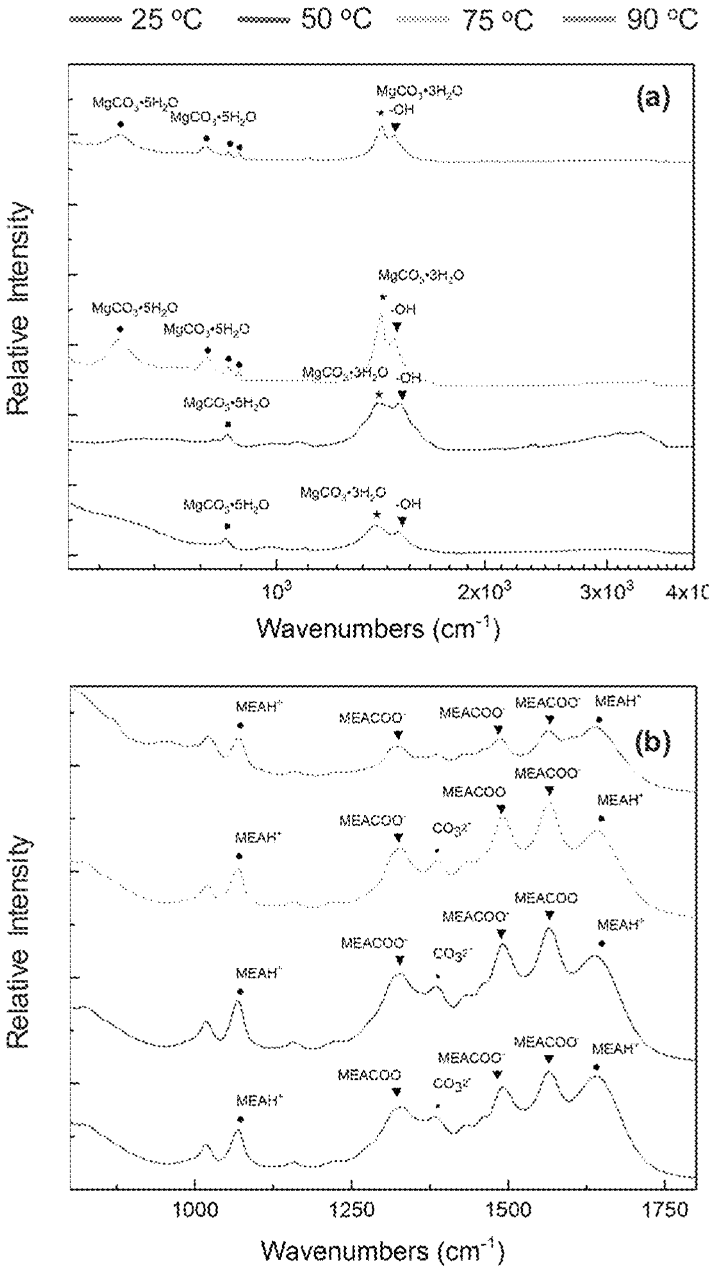
FIGS. 3A-3B show the functional groups present in reacted solid and fluid obtained from MgO and MEA.
Figures 8A, 8B, 8C:
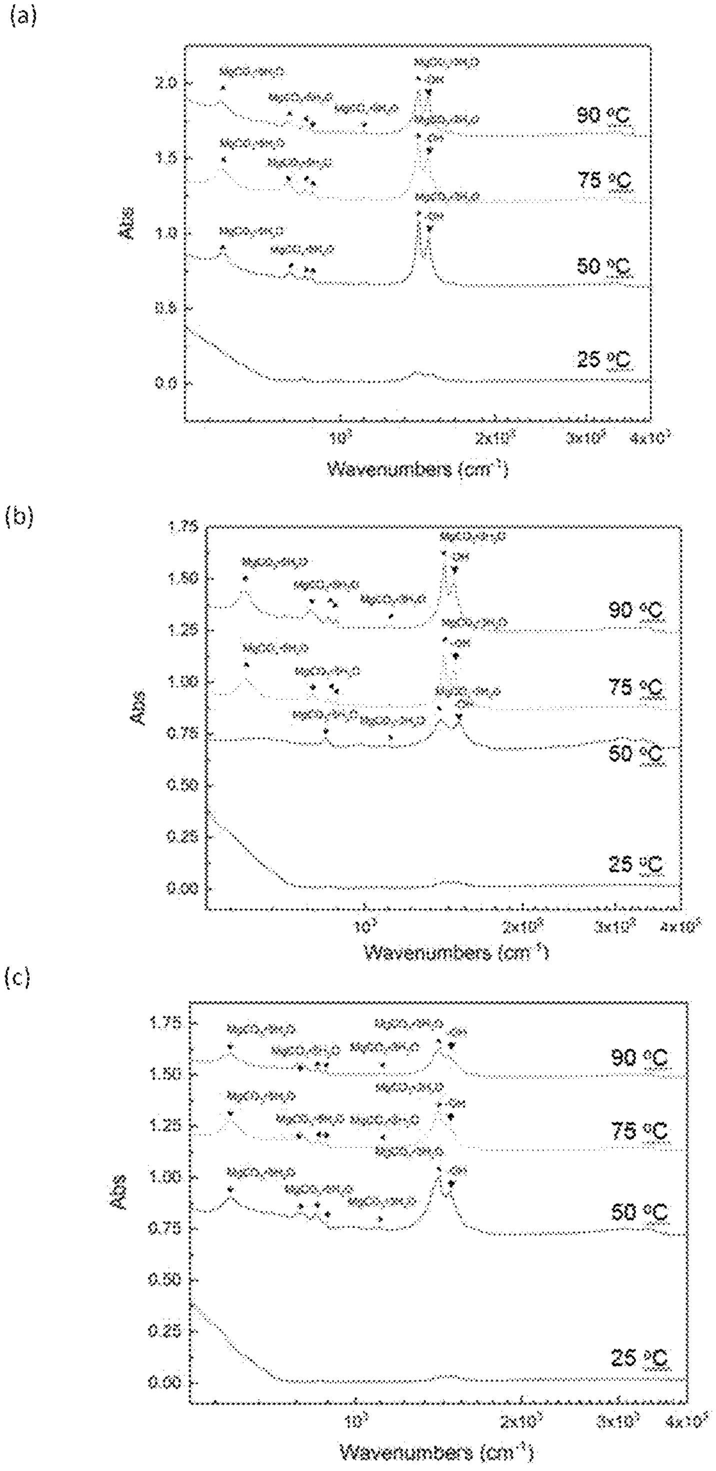
FIGS. 8A-8C show identification of the functional groups present in the solid obtained after reacting MgO with water, 10 wt %, and 20 wt % MEA at 25° C., 50° C., 75° C., and 90° C. with $P_{CO_2}$=1 atm for 3 hours and stirring rate of 300 rpm±5 rpm, using ATR-FTIR measurements.
Figures 9A, 9B, 9C:
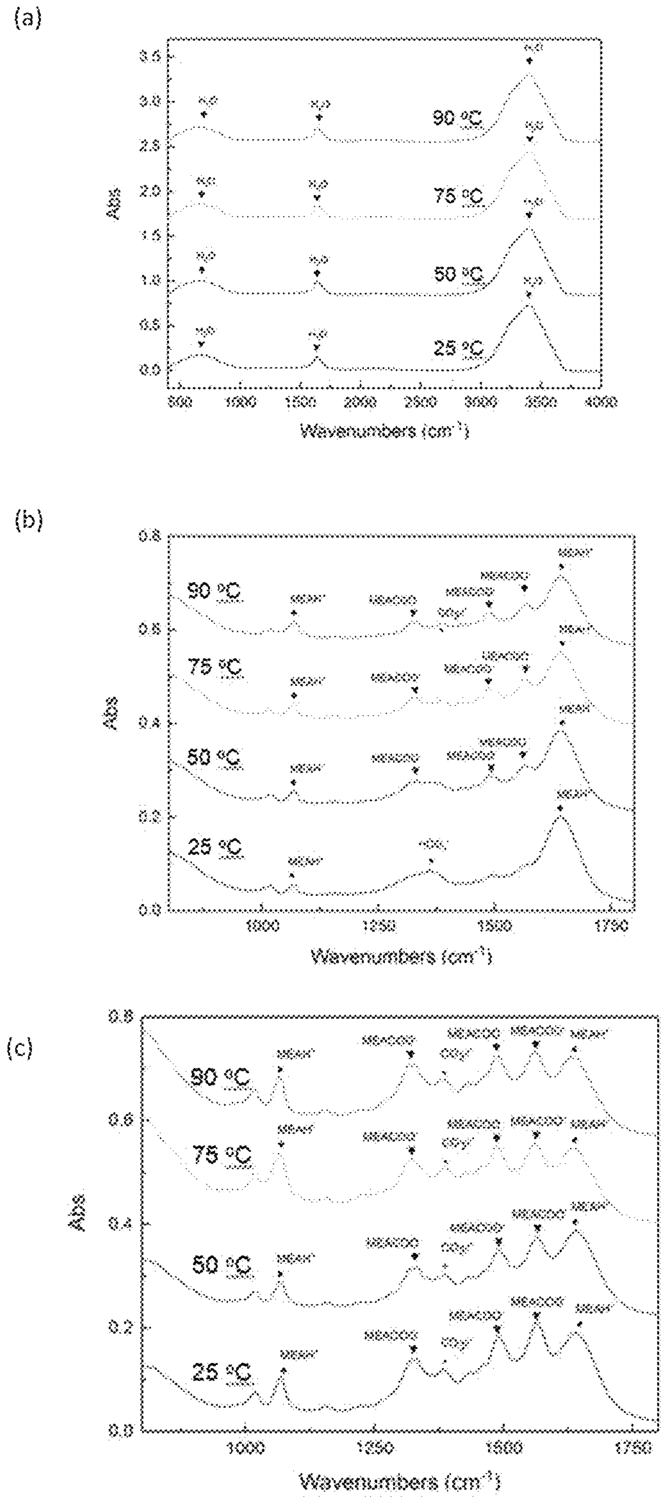
FIGS. 9A-9C show identification of the functional groups present in the fluid obtained from reacting MgO with water (FIG. 9A), 10 wt % (FIG. 9B), and 20 wt % (FIG. 9C) MEA at 25° C., 50° C., 75° C., and 90° C. with $P_{CO_2}$=1 atm for 3 hours and stirring rate of 300 rpm±5 rpm, using ATR-FTIR measurements.
Figure 10:
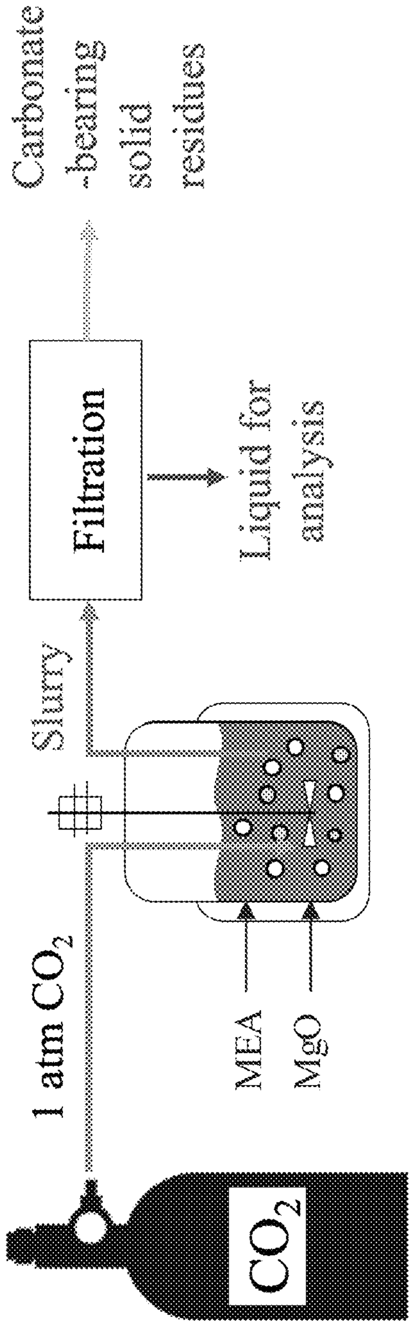
FIG. 10 shows an experimental configuration of aqueous alkaline amine looping process for accelerated carbon mineralization.
Figure 11:
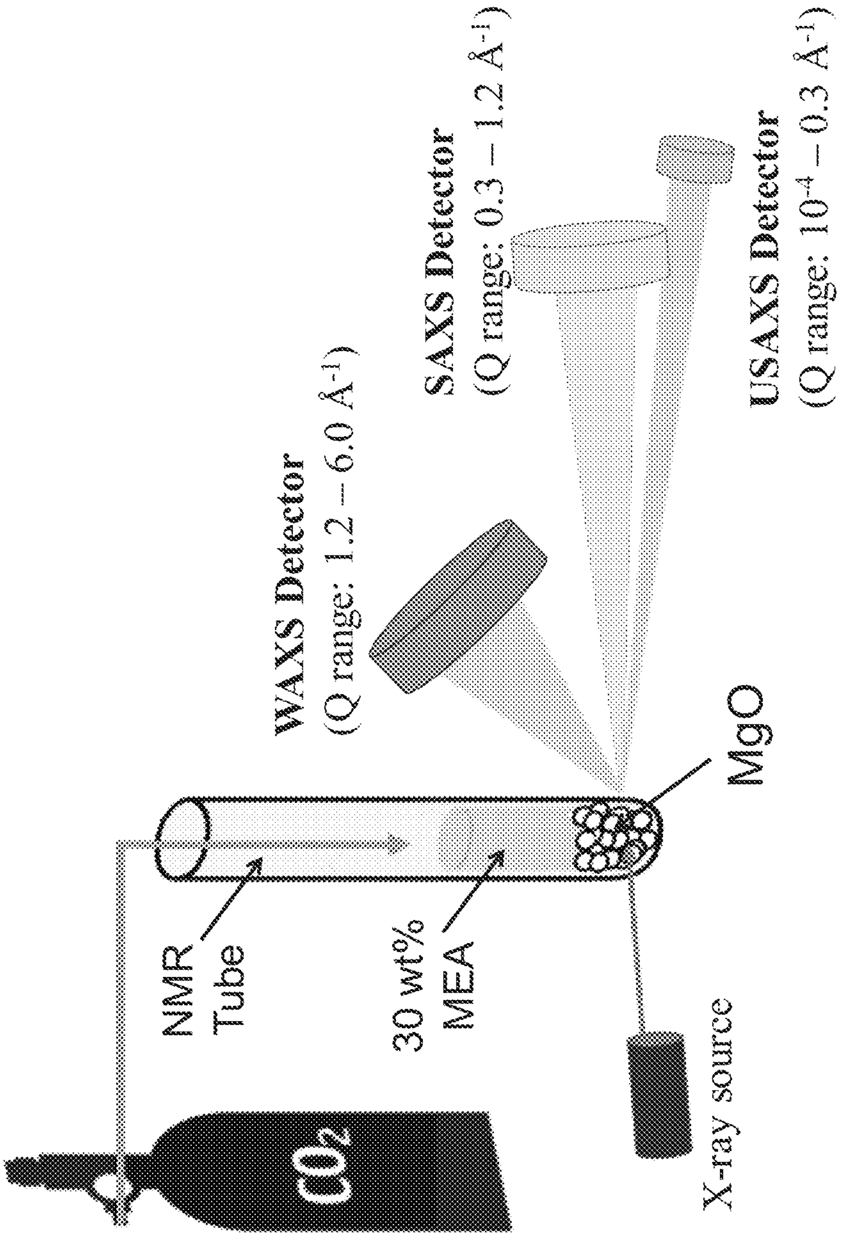
FIG. 11 shows an experimental configuration of MgO reacting with $CO_2$-loaded MEA in the USAXS/SAXS measurement.
Figure 12:
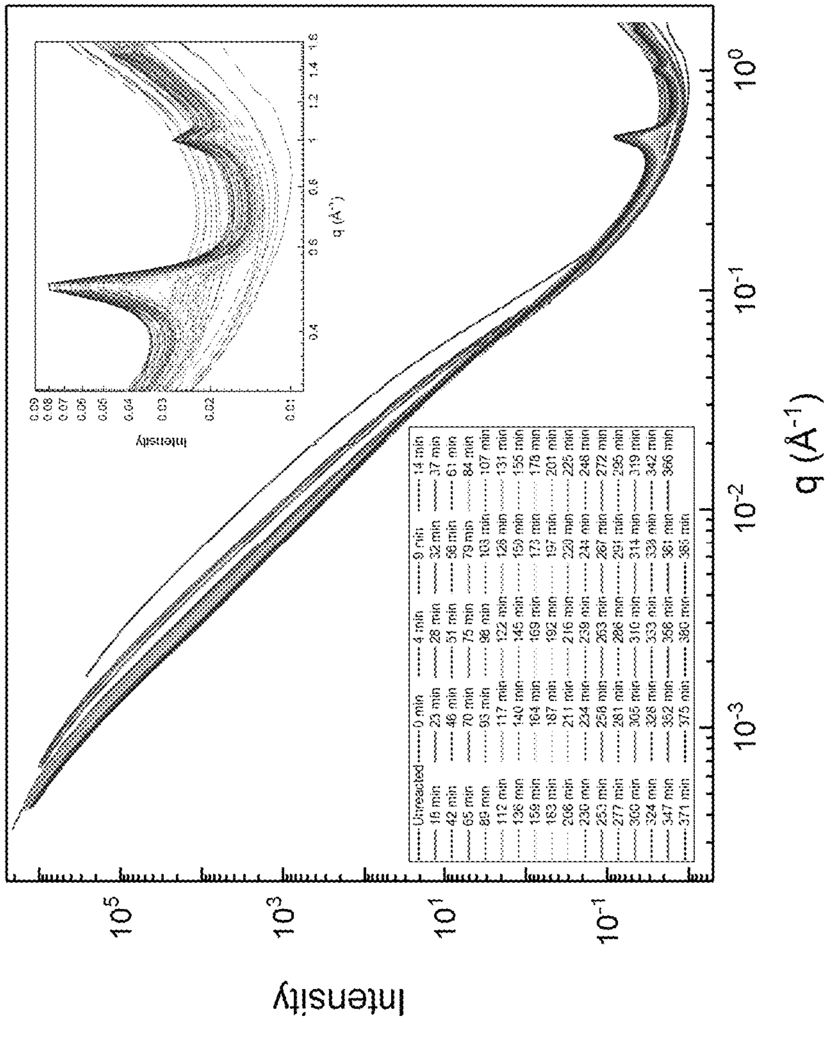
FIG. 12 shows changes in the combined slit-smeared USAXS/SAXS data as MgO is reacted with $CO_2$-loaded MEA to produce magnesium carbonate (full data set).

To identify the constituents in the solid phase and aqueous phase, ATR-FTIR analyses were performed. A wide range of phases were identified. Absorption bands at 1471 $cm^{-1}$ and 1515 $cm^{-1}$ indicates ν3 asymmetric $CO_3^{2-}$ stretching mode, which matches with features of nesquehonite ($MgCO_3·3H_2O$), and lansfordite ($MgCO_3·5H_2O$). Morgan et al., "Increased Thermal Stability of Nesquehonite ($MgCO_3·3H_2O$) in the Presence of Humidity and $CO_2$: Implications for Low-Temperature $CO_2$ Storage," *Int. J. Greenh. Gas Control* 39:366-376 (2015); Yin et al., "Synthesis and Formation Mechanism of Micro/nano Flower-like $MgCO_3·5H_2O$," *Int. J. Minerals Metallurgy Mater.* 21:304-310 (2014); and Hopkinson et al., "Phase Transitions in the System MgO—$CO_2$—$H_2O$ During $CO_2$ Degassing of Mg-Bearing Solutions," *Geochim. Cosmochim. Acta* 76:1-13 (2012), all of which are hereby incorporated by reference in their entirety. The bands at 1097 $cm^{-1}$ and 852 $cm^{-1}$ reflect the ν1 symmetric C—O, and the ν2 C—O non-planar bending vibrations, respectively. These observations are consistent with previous studies that show the formation of hydrated magnesium carbonates at the experimental conditions of interest (FIGS. 3A and 8). Analyses of the liquid recovered post-reaction at 30 wt % MEA and 50° C. showed that $MEAH^+$, $MEACOO^-$, and $CO_3^{2-}$ ions are the dominant species present in the aqueous phase (FIGS. 3B and 9). At lower MEA concentrations of 10 wt % and 20 wt %, the relative intensities of these liquid species, in particular carbonate species is lower compared to that at 30 wt % MEA. The aqueous species are identified using FT-IR analyses in this with MgO as the reactant are consistent with the observations reported by others with CaO as the reactant. Ji et al., "Integrated Absorption-Mineralisation for Low-energy $CO_2$ Capture and Sequestration," *Appl. Energy* 225:356-366 (2018), which is hereby incorporated by reference in its entirety. The $CO_2$ uptake and release behavior of MEA is evident from the multiple MEA species detected in the ATR FT-IR spectra.

Example 4—Morphological Characterization of Magnesium Carbonates

Figure 2:
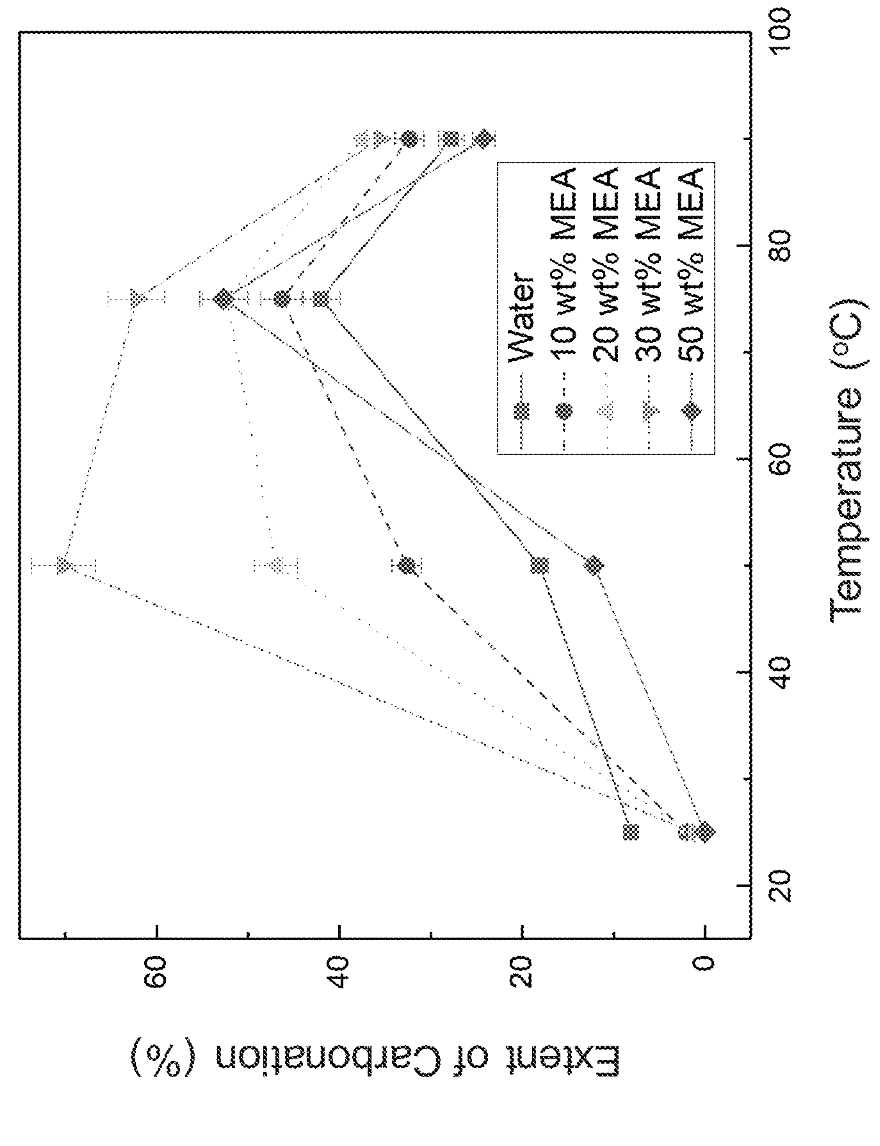
FIG. 2 shows extent of carbon mineralization of MgO reacted with water, 10 wt %, 20 wt %, 30 wt %, and 50 wt % at 25° C., 50° C., 75° C., and 90° C. at $P_{CO_2}$=1 atm for 3 hrs and stirring rate of 300 rpm. Experiments were performed in duplicate.
Figures 4A, 4B:
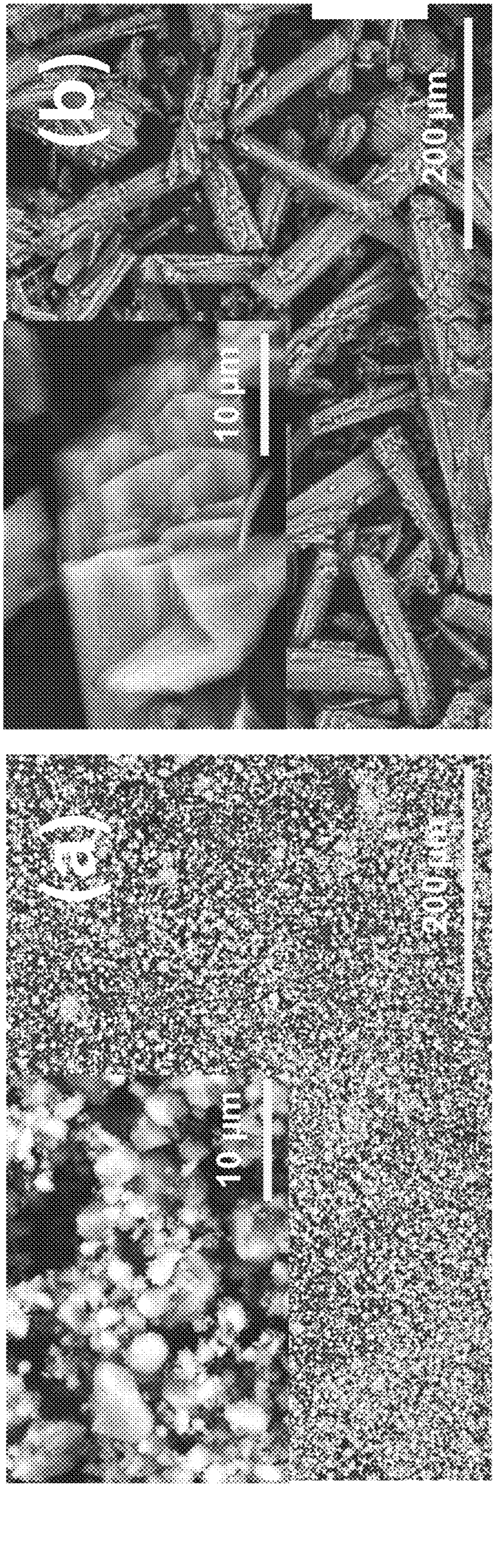
FIGS. 4A-4B show a comparison of the morphological changes in MgO.
Figure 5A:
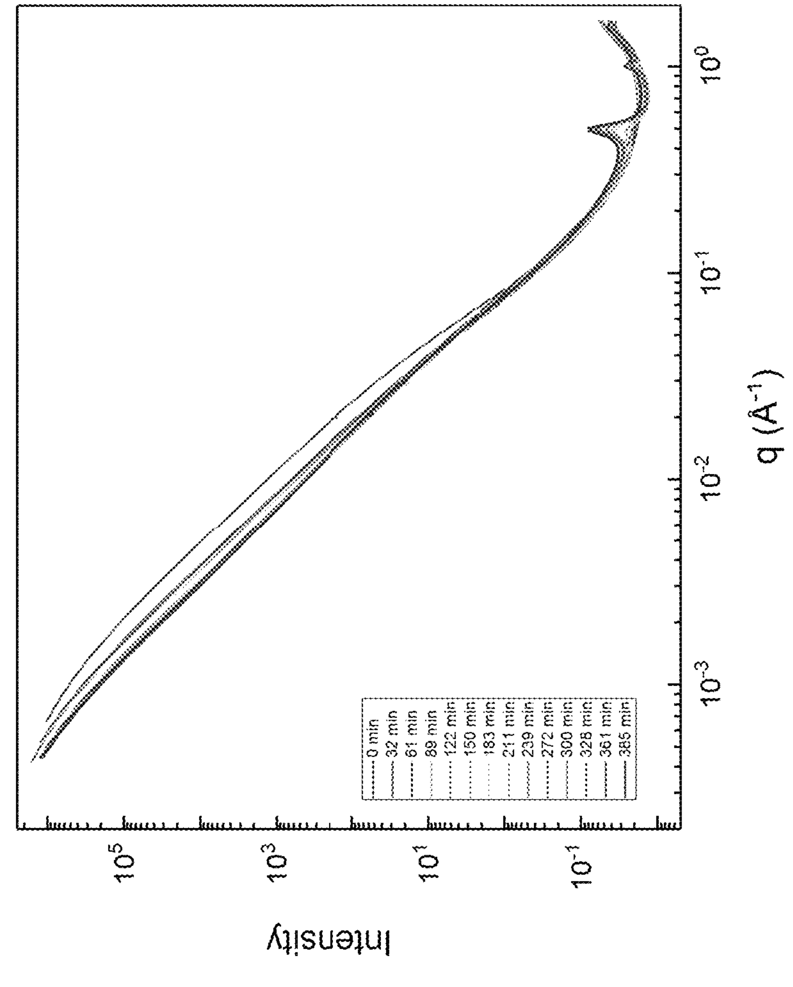
FIGS. 5A-5C show changes in the combined slit-smeared USAXS/SAXS data as MgO is reacted with $CO_2$-loaded MEA.

The morphological features before and after reacting $CO_2$ with MgO were determined using scanning electron microscopy images. The sizes of the unreacted MgO grains is to the order of a few micrometers (FIG. 4A). Needle-shaped nesquehonite ($MgCO_3·3H_2O$) is dominant after MgO is reacted with 30 wt % MEA at 50° C. in $pCO_2$=1 atm (FIG. 4B). Further, in-operando Ultra Small and Small Angle X-Ray Scattering (USAXS/SAXS) measurements were performed to determine the dynamic evolution in the structural and morphological features as MgO is reacted with $CO_2$-loaded MEA (FIG. 5A). The experimental conditions at which these measurements were performed are 25° C., 1 atm, and $CO_2$-loaded MEA concentrations of 30 wt %. These time-resolved measurements show the emergence of carbonate phases in the high q regimes that corresponds to the SAXS regime. The peaks at q~1.02 $Å^{-1}$ and q~0.51 $Å^{-1}$ correspond to the (0 0 2) and (0 0 1) reflections of lansfordite ($MgCO_3·5H_2O$). Giester et al., "The Crystal Structure of Nesquehonite, $MgCO_3·3H_2O$, From Lavrion Greece," *Mineral. Petrol.* 70:153-163 (2000) and Ming et al., "Synthesis and Characterization of Lansfordite and Nesquehonite," *Soil Sci. Soc. Am. J.* 49:1303-1308 (2010), both of which are hereby incorporated by reference in their entirety. These data suggest that lansfordite growth is a precursor to the formation of nesquehonite. In hydrothermal environments where the effects of temperature and MEA compositions on the accelerated carbon mineralization of MgO to magnesium carbonate are evaluated as shown in FIG. 2, it is hypothesized that lansfordite undergoes pseudomorphic transformations to produce nesquehonite.

Figures 5B, 5C:
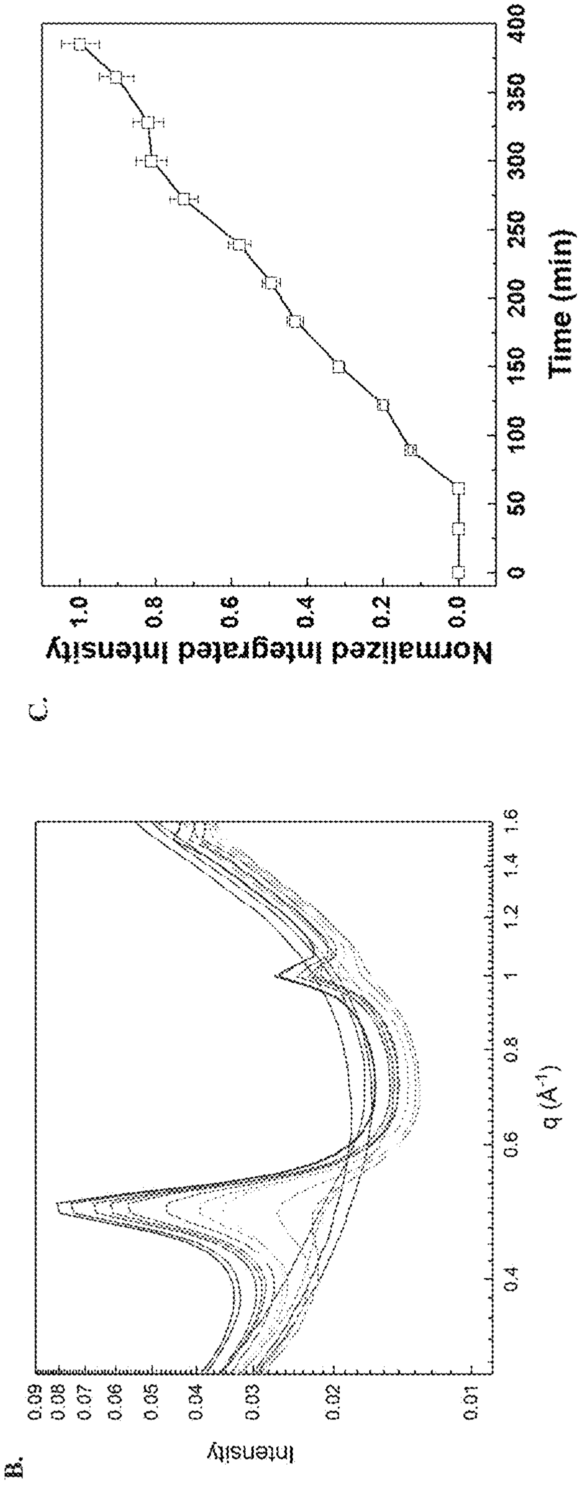
Figures 13A, 13B, 13C, 13D:
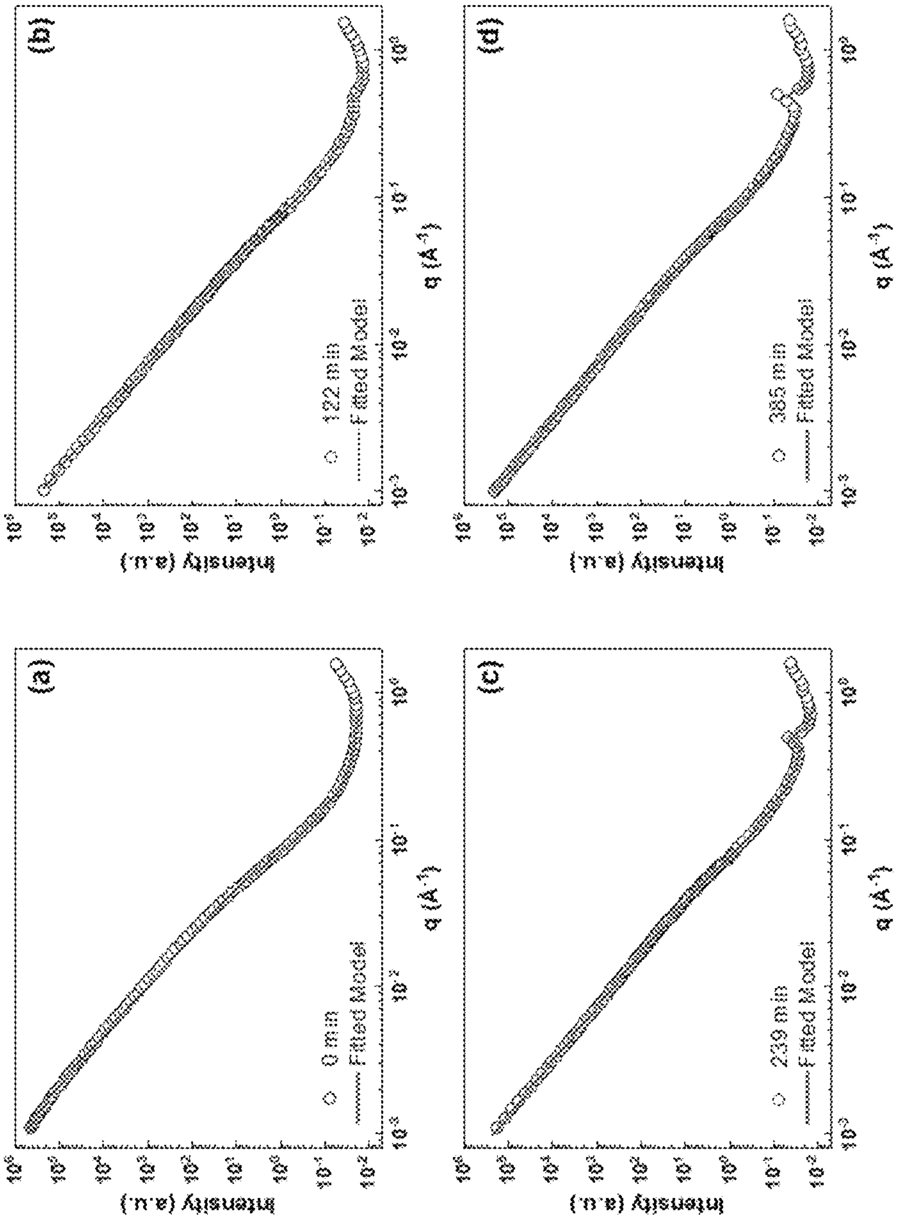
FIGS. 13A-13D shows intensity results.

Since the characteristic peak for (001) plane of lansfordite ($MgCO_3·5H_2O$) emerged after 89 min of reaction time, the data were modeled in two stages. Morgan et al., "Increased Thermal Stability of Nesquehonite ($MgCO_3·3H_2O$) in the Presence of Humidity and $CO_2$: Implications for Low-Temperature $CO_2$ Storage," *Int. J. Greenh. Gas Control* 39:366-376 (2015); Yin et al., "Synthesis and Formation Mechanism of Micro/nano Flower-like $MgCO_3·5H_2O$," *Int. J. Minerals Metallurgy Mater.* 21:304-310 (2014); and Hopkinson et al., "Phase Transitions in the System MgO—$CO_2$—$H_2O$ During $CO_2$ Degassing of Mg-Bearing Solutions," *Geochim. Cosmochim. Acta* 76:1-13 (2012), all of which are hereby incorporated by reference in their entirety. In the first stage, the USAXS/SAXS curves were modeled using two unified fit levels in two different q regions, where $q=(4\pi/\lambda)\sin(\theta/2)$ and $\lambda$ is the wavelength of incident X-ray and $\theta$ is the scattering angle. The two q-regions 0.001-0.02 $Å^{-1}$ and 0.02-0.8 $Å^{-1}$, were modeled based on the approach proposed by Beaucage. Beaucage, "Approximations Leading to a Unified Exponential/Power-law Approach to Small-angle Scattering," *J. Appl. Crystallogr.* 28:717-728 (1995) and Giester et al., "The Crystal Structure of Nesquehonite, $MgCO_3·3H_2O$, From Lavrion, Greece," *Mineral. Petrol.* 70:153-163 (2000), both of which are hereby incorporated by reference in their entirety. The fit in each level can be described by a Guinier regime and a power-law regime. Typically, the model assumes a spherical and centrosymmetric shape of the scattering objects. However, it can be applied to a broad range of scatterer shapes, including spheres, rods, lamellae, cylinders etc. based on its formulation in terms of radius of gyration ($R_g$) and free power-law slope. In the second stage of fitting, for all the data curves after 89 min, the scattering profiles were fitted using three levels of fits. Like the approach in first stage, two regions of unified fit were modeled in q ranges of 0.001-0.02 $Å^{-1}$ and 0.02-0.3 $Å^{-1}$, respectively. Additionally, a Lorentzian diffraction peak was fitted in the q range of 0.3-0.8 $Å^{-1}$. The representative model fits overlaid on experimental data are shown in FIG. 13. The normalized integrated intensity of (001) peak of lansfordite is presented in FIG. 5B. Morgan et al., "Increased Thermal Stability of Nesquehonite ($MgCO_3·3H_2O$) in the Presence of Humidity and $CO_2$: Implications for Low-Temperature $CO_2$ Storage," *Int. J. Greenh. Gas Control* 39:366-376 (2015); Yin et al., "Synthesis and Formation Mechanism of Micro/nano Flower-like $MgCO_3 \cdot 5H_2O$," *Int. J. Minerals Metallurgy Mater.* 21:304-310 (2014); and Hopkinson et al., "Phase Transitions in the System MgO—$CO_2$—$H_2O$ During $CO_2$ Degassing of Mg-Bearing Solutions," *Geochim. Cosmochim. Acta* 76:1-13 (2012), all of which are hereby incorporated by reference in their entirety. Additionally, the modeling results from the unified fit in q range of 0.02-0.8 $Å^{-1}$, were of interest and are discussed further. The power-law slope and radius of gyration ($R_g$) obtained from the unified fit are presented in FIG. 6A. The $R_g$ values are representative of pore dimensions.

Figures 6A, 6B, 6C, 6D:
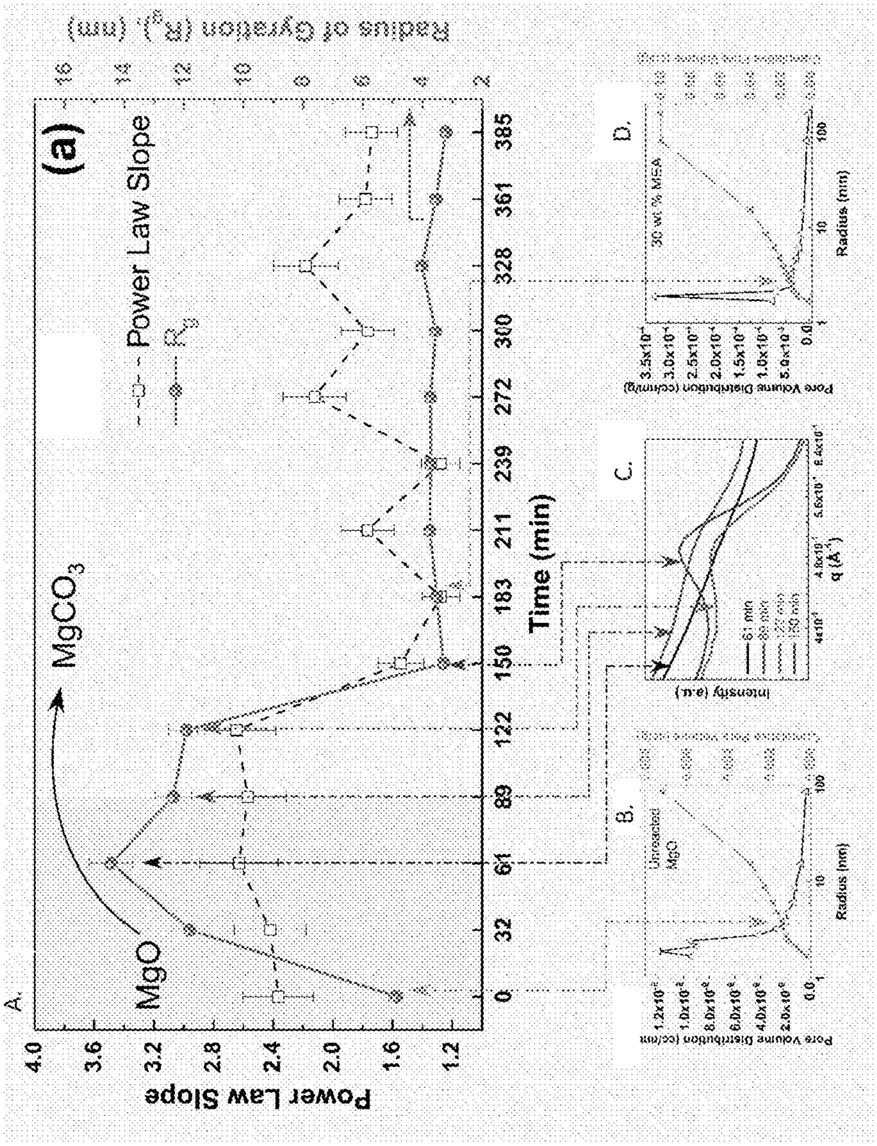
FIGS. 6A-6D show the Power law scop, pore size distribution, and cumulative pore volume.

The evolution in the pore morphology as MgO is converted to $MgCO_3$ is determined by tracking changes in the characteristic radius of gyration, $R_g$. Initially, an $R_g$ value of ~5 nm was noted for the precursor, MgO. This value is comparable to the representative pore size determined from $N_2$ BET adsorption measurements (FIG. 6B). The increase in $R_g$ values noted until 61 minutes of reaction time, is attributed to the dissolution of MgO. As discussed earlier, the (001) peak for lansfordite first emerged after 89 minutes of reaction time (FIG. 5B), the $R_g$ values started to decrease and achieved a value of ~3.4 nm as the carbonation of MgO began. The changes in the $R_g$ values corresponding to the phase change of MgO to $MgCO_3$ during reaction are mapped in (FIG. 6C). These values of $R_g$ remained persistent till the end of reaction (385 minutes). For comparison, the pore dimensions of $MgCO_3$ powder obtained after reaction of MgO with 30 wt. % MEA in a batch reactor for 3 hours was compared with the $R_g$ value at 183 minutes. The $N_2$ BET data determined at these experimental conditions and shown in FIG. 6D) is mapped to FIG. 6A). The Rg values determined from USAXS/SAXS measurements are comparable to the pore radius data determined from $N_2$ BET measurements. The reduction in the pore radius as carbon mineralization occurs suggests that the diffusion limitations may contribute to the changes in reactivity.

Insights into the evolution of pore-solid interfaces can be obtained from the porod exponent. Porod exponent between 2 and 3 represents scattering from branched networks or mass fractals. Porod exponents between 2.2-2.8 are noted prior to the development of the lansfordite phase. Concurrent dissolution of MgO and lansfordite phase growth result in Porod slopes in the range of 1.6-2.4. These data show that the fractal character of the pore-solid interfaces evolves as MgO reacts to produce $MgCO_3$. While USAXS/SAXS measurements provide insights into the influence of bulk morphological changes and structural evolution during the carbon mineralization of magnesium oxide, it is challenging to determine the sizes of the magnesium carbonate particles in the proposed process. The research question in this context is as follows: How can the sizes of the carbonate particles once the Mg cations are mobilized in the aqueous phase be determined? To address this research question, in-operando Grazing Incidence-Small Angle X-Ray Scattering (GI-SAXS) measurements to determine the sizes of the magnesium carbonate particles is used. FIG. 7A is a schematic of the GI-SAXS cell. 0.1988 mL of 30 wt % $CO_2$-loaded MEA solution was injected into 5 mL 0.1 M $Mg(NO_3)_2$ solution. The reaction vessel used in these experiments was made from silica. To mimic the formation of magnesium carbonate particles on these silica surfaces, solid quartz substrate (100) was used. These quartz surfaces were rinsed with acetone to remove any organic contaminants. Fernandez-Martinez et al., "In Situ Determination of Interfacial Energies between Heterogeneously Nucleated $CaCO_3$ and Quartz Substrates: Thermodynamics of $CO_2$ Mineral Trapping," *Environ. Sci. Technol.* 47:102-109 (2013), which is hereby incorporated by reference in its entirety. FIG. 7B is an example of raw 2D GISAXS scattering pattern from quartz (100) substrates with MgO. The original image is shown, without background subtraction and further processing. After background subtraction and 2D data reduction, the reduced data was fitted by Guinier-Porod fit (Hammouda, B., "A New Guinier-Porod Model," *J. Appl. Crystallogr.* 43:716-719 (2010), which is hereby incorporated by reference in its entirety) as shown in FIG. 7C.

The formation of magnesium carbonate particles was noted after about 60 minutes. The scattering curves were obtained by reducing the data contained in the 2-D images. Fernandez-Martinez et al., "In Situ Determination of Interfacial Energies between Heterogeneously Nucleated $CaCO_3$ and Quartz Substrates: Thermodynamics of $CO_2$ Mineral Trapping," *Environ. Sci. Technol.* 47:102-109 (2013), which is hereby incorporated by reference in its entirety. The sizes of the particles are obtained by fitting the Guinier-Porod fit based on Equations 1-4. Hammouda, B., "A New Guinier-Porod Model," *J. Appl. Crystallogr.* 43:716-719 (2010), which is hereby incorporated by reference in its entirety. Also, the factor s was set as 1 based on the formation of rod-like shape particles observed in the SEM images in FIG. 4B. The size distribution in FIG. 7D was extrapolated from the FIG. 7C based on the maximum entropy method using Irena and Nika packages. From these data, the sizes of the precipitates are inferred to the order of 15-16 nm (FIG. 7D). At these experimental conditions, the formation of hydrated magnesium carbonates is expected. Fernandez-Martinez et al., "In Situ Determination of Interfacial Energies between Heterogeneously Nucleated $CaCO_3$ and Quartz Substrates: Thermodynamics of $CO_2$ Mineral Trapping," *Environ. Sci. Technol.* 47:102-109 (2013), which is hereby incorporated by reference in its entirety. In comparison, the sizes of the calcium carbonate is approximately 2 nm. Fernandez-Martinez et al., "in Situ Determination of Interfacial Energies between Heterogeneously Nucleated $CaCO_3$ and Quartz Substrates: Thermodynamics of $CO_2$ Mineral Trapping," *Environ. Sci. Technol.* 47:102-109 (2013) and Radha et al., "Energetic and Structural Studies of Amorphous Ca1-xMgx$CO_3 \cdot nH_2O$ ($0 \le x \le 1$)," *Geochim. Cosmochim. Acta* 90:83-95 (2012), both of which are hereby incorporated by reference in their entirety. These GI-SAXS data provide insights into the size of the magnesium carbonate particles on silica surfaces, while the USAXS/SAXS data show the emergence of metastable lansfordite and the characteristic pore size as MgO is converted to metastable magnesium carbonate phases.

Example 5—Discussion of Examples 1-4

In the above examples, the effectiveness of utilizing aqueous alkaline amine looping process for the directed synthesis of magnesium carbonate starting from magnesium oxide as the precursor is examined. Experiments were performed in a multiphase reaction environment comprising $CO_2$ at a pressure of 1 atm with temperature varying between 25° C. to 90° C., and aqueous concentrations of MEA varying from 0 to 50 wt %. The maximum extent of carbon mineralization achieved with magnesium oxide was 70% in 30 wt % MEA solution at 50° C. for a reaction time of 3 hours. The formation of hydrated phases of magnesium carbonate such as nesquehonite ($MgCO_3 \cdot 3H_2O$) was noted. Small angle X-ray scattering measurements showed the formation of lansfordite at system conditions as likely precursors prior to the formation of nesquehonite. The high carbonate conversions achieved with the use of magnesium oxide using the aqueous alkaline amine looping demonstrate the effectiveness of using the proposed approach for the direct capture, conversion and storage of $CO_2$ or can be adapted for the reactive separation of $CO_2$. In the context of Carbon Capture and Storage (CCS) or more broadly processes needed for decarbonization or carbon removal, a single integrated process is presented that combines $CO_2$ capture and storage as Mg-bearing carbonates. The end-product of this process which is magnesium carbonate produced from anthropogenic $CO_2$ can be utilized in filler materials. The high extents of carbon mineralization with MgO at significantly lower temperatures of 50° C. demonstrate that the proposed reaction pathways are promising alternatives to the high pressure and high temperature routes or chemically intensive routes for carbon mineralization previously reported in literature. Having demonstrated the feasibility of these chemical pathways with pure precursor MgO, subsequent research efforts will be directed towards exploring the use of alkaline industrial residues with high Ca and Mg content and naturally occurring Ca- and Mg-bearing silicate minerals for the low temperature and integrated capture, conversion and storage of $CO_2$ as Ca- and Mg-bearing carbonates.

Example 6—Experimental Materials and Methods for Examples 7-8

The alkaline precursors used in the present disclosure calcium oxide (CaO) and calcium silicate ($CaSiO_3$) were procured from Sigma-Aldrich. Glycine was purchased from Alfa Aesar with 99% purity. Sodium hydroxide was procured from Fisher Scientific. Na-glycinate solutions with varying concentrations was prepared by combining predetermined concentrations of NaOH with glycine and stirring at 500 rpm for 60 minutes. The reaction associated with producing Na-glycinate is as follows: $CH_2COOHNH_2$+NaOH↔$CH_2COOHNH^-$+$Na^+$+$H_2O$. As noted in this reaction, the stoichiometric ratio of NaOH and glycine is 1:1. Hu et al., "Carbon Dioxide Capture by Solvent Absorption Using Amino Acids: A Review," *Chinese J. Chem. Eng.* 26:2229-2237 (2018), which is hereby incorporated by reference in its entirety.

Figure 21:
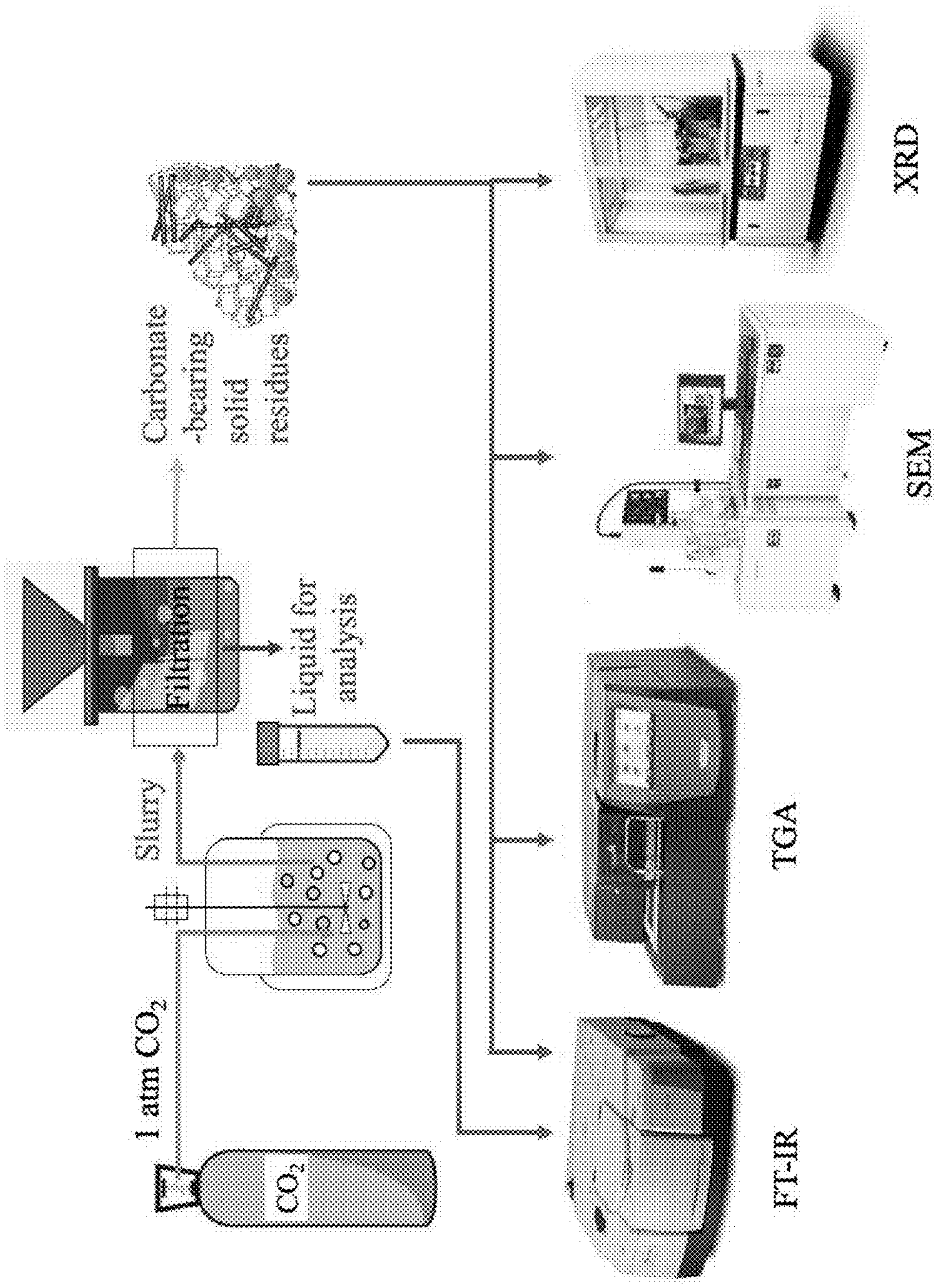
FIG. 21 shows experimental set up and characterization.
Figures 22A, 22B, 22C:
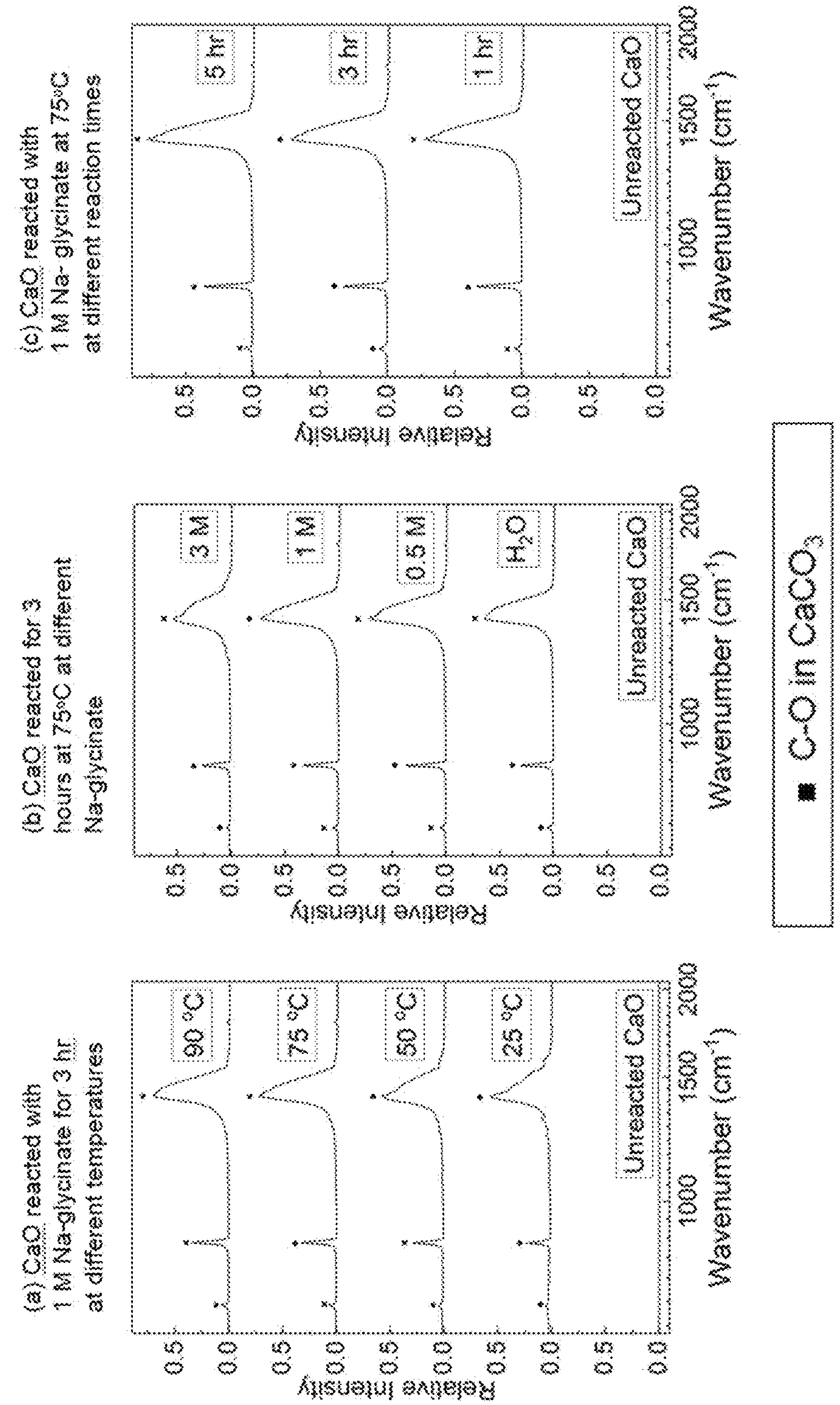
FIGS. 22A-22C show changes in the bonds present in calcium oxide on carbon mineralization.
Figures 23A, 23B, 23C:
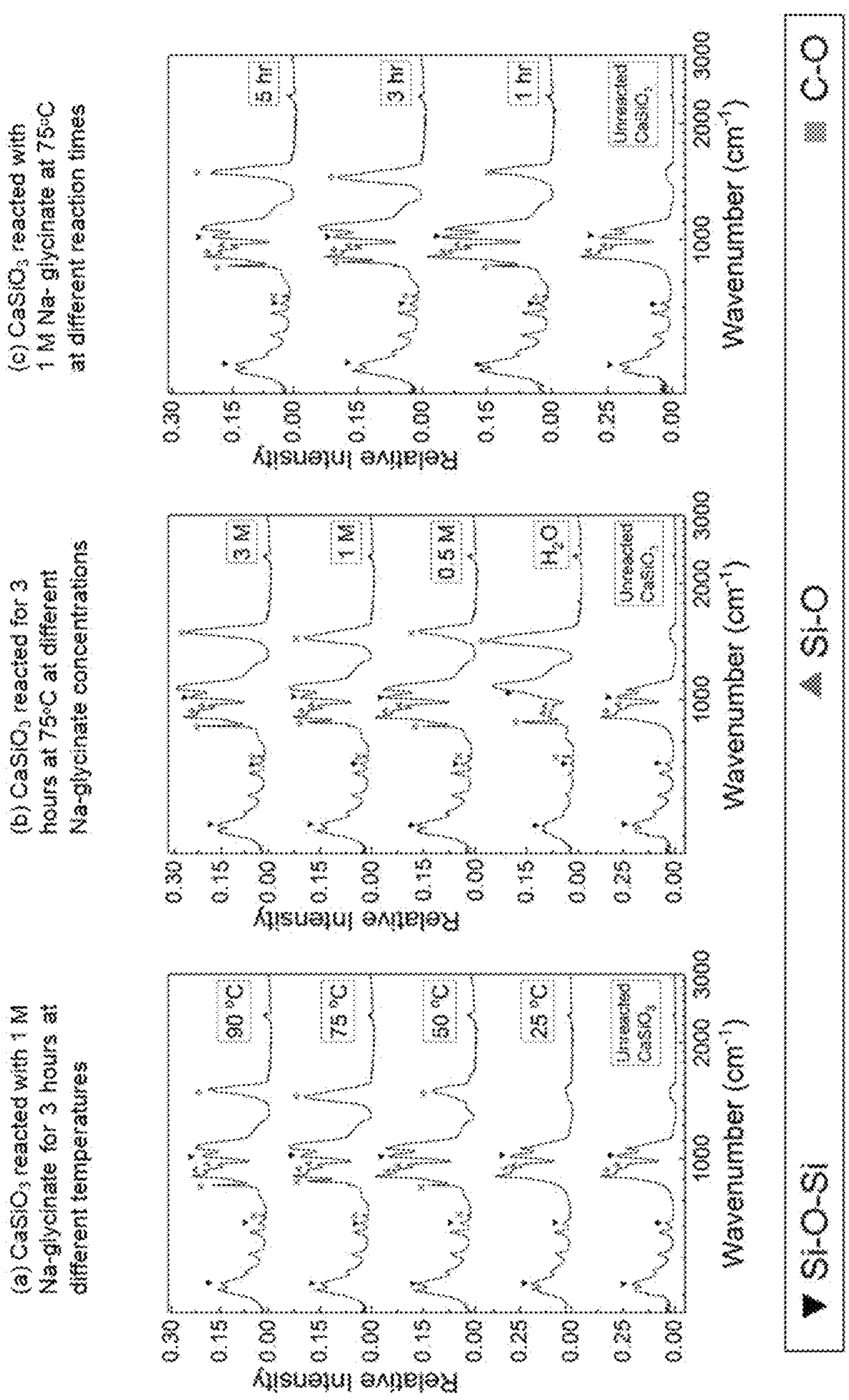
FIGS. 23A-23C show changes in the bonds present in calcium silicate on carbon mineralization.

Aqueous alkaline amino acid looping process for accelerated carbon mineralization—The experiments were performed in the Parr Reactor (Series 4590 Micro Stirred Reactor). The solid to liquid ratio is maintained at 3:17 by weight for all the experiments. Experiments were performed in water and Na-glycinate concentrations of 0.5 M and 1.0 M. The reactor was purged with pure $CO_2$ for 1 min to remove air from the headspace. $CO_2$ partial pressure was maintained at 1 atm for all the experiments. A stirring rate of 300 rpm±5 rpm was held constant for all the experiments. The experiments were performed for 1 hour, 3 hours, and 5 hours. Reaction temperatures of 25° C., 50° C., 75° C. and 90° C. were studied. At the end of the experiment, the liquid and solid contents were separated using vacuum filtration. Residual water in the solid samples was removed by drying in a vacuum oven for 12 hours at 90° C. A schematic of the experimental setup is shown in FIG. 21.

Quantification of Carbonate Formation and the Corresponding Morphological Features—The effectiveness of Na-glycinate in enabling the mineralization of $CO_2$ was determined using the extent of carbon mineralized. The carbonate content was determined using Thermogravimetric Analyses (SDT, TA Instruments, SDT 650). The heating rate was set to 5° C./min, with starting and ending temperatures of 25° C. and 800° C., respectively. The flow rate of the $N_2$ gas in the TGA balance was set to 10 mL/min. The carbonate content in the recovered samples was determined based on the change in the weight of the samples. Calcium carbonate decomposition to produce CaO and $CO_2$ occurs in the temperature range of 600-800° C. Li et al., "Decomposition Kinetic Characterists of Calcium Carbonate Containing Organic Acids by TGA," *Arab. J. Chem.* 10:52534-52538 (2017), which is hereby incorporated by reference in its entirety. The following relationship was used to determine the extent of carbon mineralized, where TGA represents the weight change that corresponds to the carbonate content in the reacted materials and $R_{CO_2}$ represents to the amount of the mineral needed to store a unit mass of $CO_2$. Gadikota et al., "Experimental Design and Data Analysis for Accurate Estimation of Reaction Kinetics and Conversion for Carbon Mineralization," *Ind. Eng. Chem. Res.* 53:6664-6676 (2014) and O'Connor et al., "Aqueous Mineral Carbonation: Mineral Availability, Pretreatment, Reaction Parametrics, and Process Studies," Final Report *DOE/ARC-TR*-004-002 (2004), both of which are hereby incorporated by reference in their entirety.

$$Y_{CO_2,TGA} = R_{CO_2} \times \left(\frac{TGA}{100 - TGA}\right) \times 100\%$$

The changes in the functional groups were identified based on the infrared absorption spectra determined using Attenuated Total Reflection-Fourier Transform Infrared spectroscopy analyses (ATR-FTIR, Thermo Fisher Nicolet iS50) in the range of 300~4000 $cm^{-1}$. The morphological features of the products were determined using Scanning Electron Microscopy (SEM, LEO 1550 FESEM). The crystalline features were determined using Wide Angle X-Ray Scattering (WAXS) measurements were performed at Sector 9-ID at the Advanced Photon Source (APS) in Argonne National Laboratory (ANL). Liu et al., "Probing the Influence of Thermally Induced Structural Changes on the Microstructural Evolution in Shale using Multiscale X-ray Scattering Measurements," *Energy & Fuels* 32:8193-8201 (2018); Liu et al., "Phase Evolution and Textural Changes during the Direct Conversion and Storage of $CO_2$ to Produce Calcium Carbonate from Calcium Hydroxide," *Geosciences* 8:445 (2018); Liu et al., "Chemo-morphological Coupling During Serpentine Heat Treatment for Carbon Mineralization," *Fuel* 227:379-385 (2018); Ilvasky et al., "Ultra-small-angle X-ray scattering at the Advanced Photon Source," *J. Appl. Cryst.* 42:469-479 (2009); Ilvask et al, "Development of Combines Microstructure and Structure Characterization Facility for In Situ and Operando Studies at the Advances Photon Source," *J. Appl. Cryst.* 51:867-882 (2018); Gadikota et al., "In Situ Angstrom-to-Micrometer Characterization of the Structural and Microstructural Changes in Kaolinite on Heating Using Ultrasmall-Angle, Small-Angle, and Wide-Angle X-ray Scattering (USAXS/SAXS/WAXS)," *Ind. Eng. Chem. Res.* 56:11791-11801 (2017); and Gadikota et al, "Towards Understanding the Microstructural and Structural Changes in Natural Hierarchical Materials for Energy Recovery: In-operando Multi-Scale X-ray Scattering Characterization of Na- and Ca-montmorillonite on heating to 1150° C.," *Fuel* 196:195-209 (2017), all of which are hereby incorporated by reference in their entirety. The total X-ray flux, energy and corresponding wavelength were $10^{-13}$ photon $s^{-1}$, 21.0 keV, and 0.59 Å, respectively. The WAXS measurements were calibrated using LaB6 (Black et al., "Certification of NIST Standard Reference Material 640d," *Powder Diffr.* 25:187-190 (2010), which is hereby incorporated by reference in its entirety), and the acquisition time for each measurement was set to 30 seconds. Data reduction and analyses were performed using the Nika (Ilvasky et al., "Nika: Software for Two-Dimensional Data Reduction," *J. Appl. Cryst.* 45:324-328 (2012), which is hereby incorporated by reference in its entirety) software packages embedded in IgorPro (Wavemetrics, Lake Oswego, OR). Ilvasky et al., "Irena: Tool Suite for Modeling and Analysis of Small-Angle Scattering," *J. Appl. Cryst.* 42:347-353 (2009) and Ilvasky et al., "Nika: Software for Two-Dimensional Data Reduction," *J. Appl. Cryst.* 45:324-328 (2012), both of which are hereby incorporated by reference in their entirety. X-Ray Diffraction (XRD) analyses was performed using the Bruker D8 Advance ECO powder diffractometer. The acquisition times for each data point is 0.1 s, and the increment of the time step is 0.0195°.

Example 7—Results of Example 6

Figure 14:
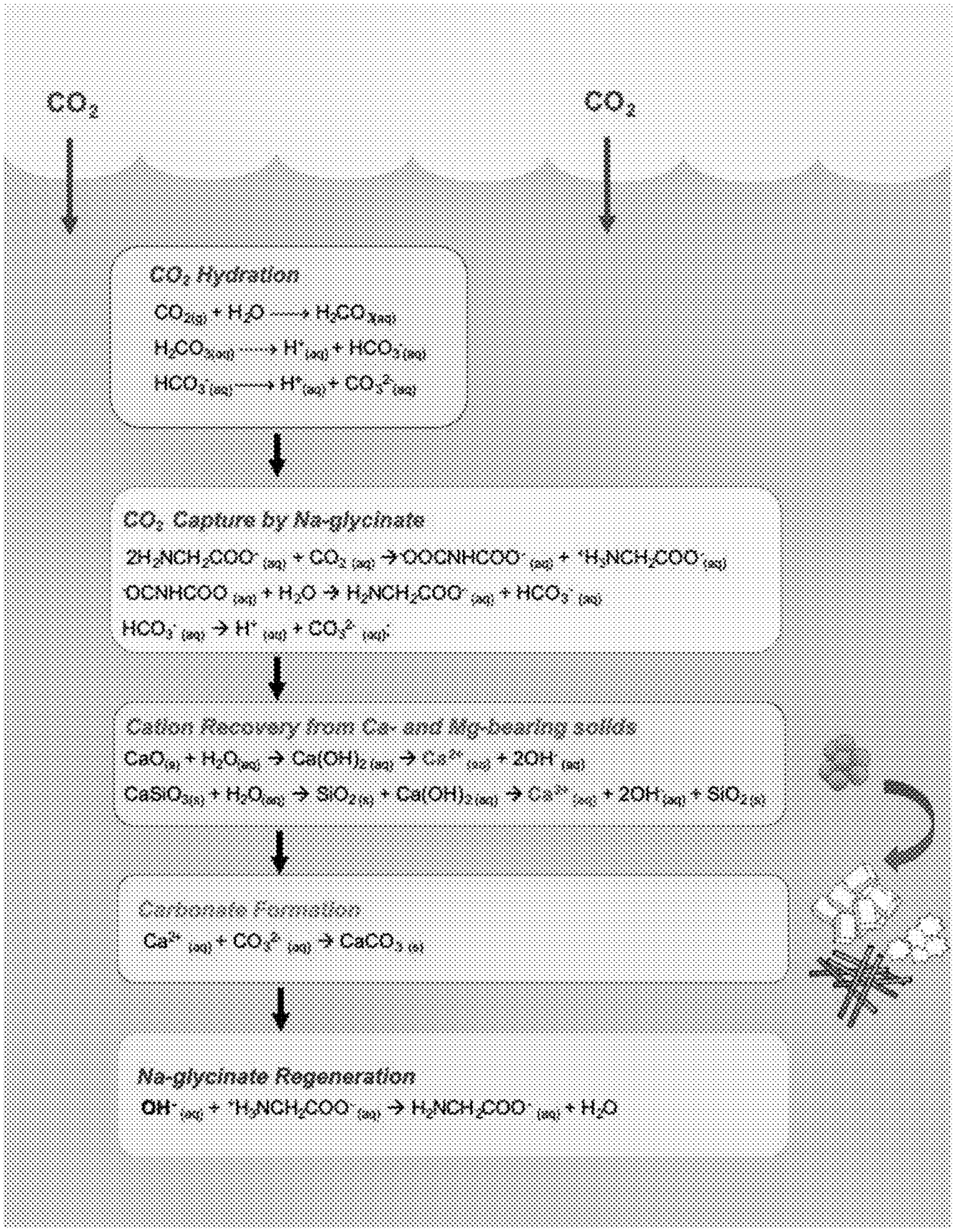
FIG. 14 is a schematic representation of the alkaline aqueous amine looping process for the carbon mineralization, including the reactions of $CO_2$ hydration, cation dissolution, $CO_2$ capture by amino acids, amino acid regeneration, and carbonation formation.
Figure 15:
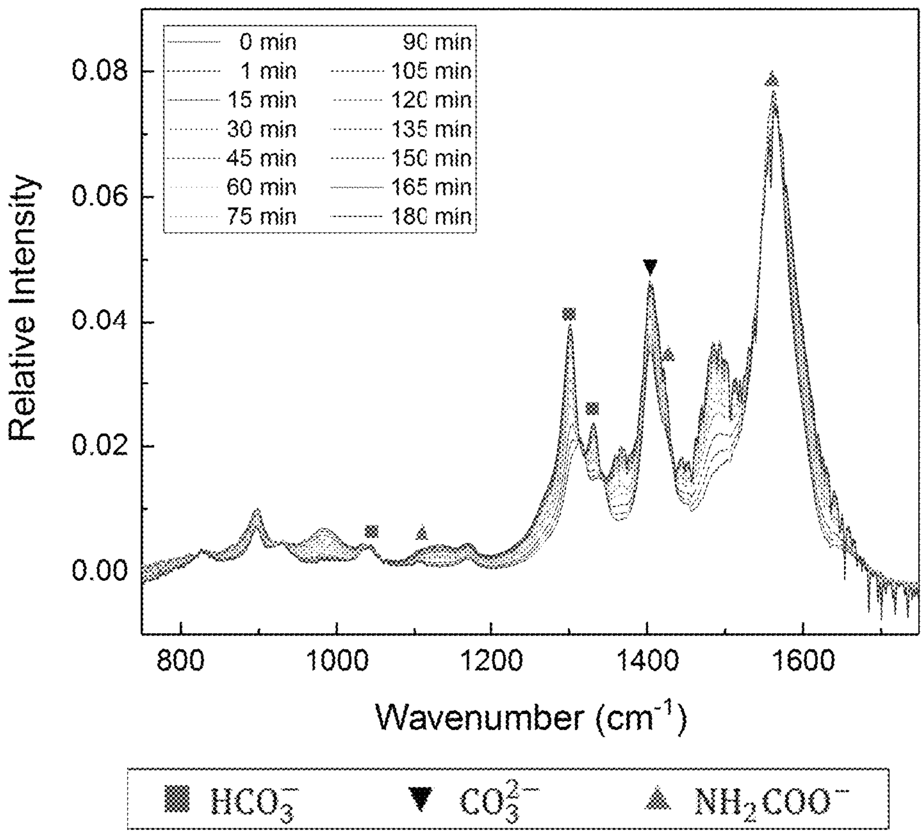
FIG. 15 shows changes of aqueous species during $CO_2$ capture using Na-glycinate determined using ATR-FTIR analyses. $HCO_3^-$ at 1005 $cm^{-1}$, 1300 $cm^{-1}$, and 1365 $cm^{-1}$. Milella et al., "Estimating Speciation of Aqueous Ammonia Solutions of Ammonium Bicarbonate: Application of Least Squares Methods to Infrared Spectra," *React. Chem. Eng.* 4:1284-1302 (2019), which is hereby incorporated by reference in its entirety. $CO_3^{2-}$ at 1395 $cm^{-1}$. Davis et al., "A Vibrational-Spectroscopic Study of the Species Present in the $CO_2$—$H_2O$ System," *J. Solution Chem.* 1:329-339 (1972), which is hereby incorporated by reference in its entirety. $NH_2COO^-$ at 1120 $cm^{-1}$, 1413 $cm^{-1}$, and 1545 $cm^{-1}$. Milella et al., "Estimating Speciation of Aqueous Ammonia Solutions of Ammonium Bicarbonate: Application of Least Squares Methods to Infrared Spectra," *React. Chem. Eng.* 4:1284-1302 (2019); Pretsch et al., "Structure Determination of Organic Compounds," Berlin: Springer-Verlag 108 (2000); and Hisatsune, "Low-temperature Infrared Study of Ammonium Carbamate Formation," *Can. J. Chem.* 62:945-948 (1984), all of which are hereby incorporated by reference in their entirety.

The experiments in the present disclosure are designed to evaluate the hypothesis that Na-glycinate is an effective $CO_2$ capture and transfer agent for the accelerated carbon mineralization. $CO_2$ capture using Na-glycinate proceeds via a zwitterionic mechanism to release bicarbonate ions into the aqueous phase. Rochelle, "Amine Scrubbing for $CO_2$ Capture," *Science* 325:1652-1654 (2009), which is hereby incorporated by reference in its entirety. Bicarbonate ions can dissociate to produce carbonate ions at high pH conditions, which aids carbon mineralization. Hydroxyl ions aid the regeneration of the sodium glycinate (FIG. 14). To probe the speciation behavior of Na-glycinate as it reacts with water, in-situ FT-IR measurements are performed. The carbon mineralization behavior of Na-glycinate with CaO and $CaSiO_3$ and the morphological features of the carbonate-bearing end materials are discussed in following sections.

$CO_2$ reaction with sodium glycinate—To determine the dynamic changes in the functional groups as $CO_2$ is captured using Na-glycinate, in-situ ATR FT-IR analyses were performed. 1 mL 1 M Na-glycinate is loaded into the cell and $CO_2$ at a pressure of 1 atm is supplied to this cell. $CO_2$ reacts with glycinate to generate the corresponding carbamic acid, followed by deprotonation by a second equivalent of glycine to produce carbamate and zwitterionic glycine (Reaction 1). Brethomé et al., "Direct Air Capture of $CO_2$ via Aqueous-Phase Absorption and Crystalline-phase Release Using Concentrated Solar Power," *Nat. Energy* 3:553-559 (2018); Custelcean et al., "Direct Air Capture of $CO_2$ with Aqueous Amino Acids and Solid Bis-Iminoguanidines (BIGs)," *Ind. Eng. Chem. Res.* 58:23338-23346 (2019); Hu et al., "Carbon Dioxide Capture by Solvent Absorption Using Amino Acids: A Review," *Chinese J. Chem. Eng.* 26:2229-2237 (2018); Guo et al., "Amino Acids as Carbon Capture Solvents: Chemical Kinetics and Mechanism of the Glycine+$CO_2$ Reaction," *Energy & Fuels* 27:3898-3904 (2013); Zhang et al., "Absorption of $CO_2$ by Amino Acid-Functionalized and Traditional Dicationic Ionic Liquids: Properties, Henry's Law Constants and Mechanisms," *Chem. Eng. J.* 214:355-363 (2013), which is hereby incorporated by reference in their entirety. Hydrolysis of the carbamate results in glycinate and bicarbonate ions (Reaction 2).

Reaction 1

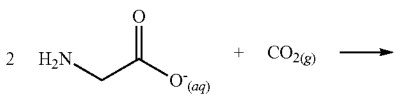

-continued

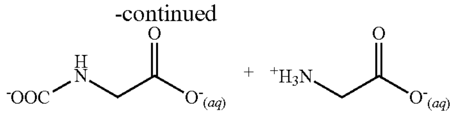

Reaction 2

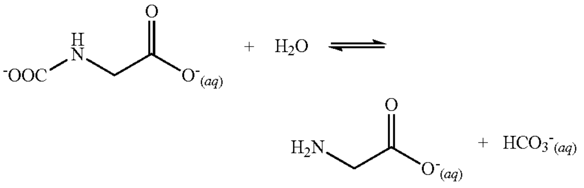

Reaction 3

Table 3 summarizes the band assignments of species. As $CO_2$ is captured by Na-glycinate, the peak that corresponds to the asymmetric stretching vibration of C—O at 1395 $cm^{-1}$ in $CO_3^{2-}$ ions increases rapidly from the start of the experiment to the first 90 minutes, and the peak increase slows from 90 min to 180 min. Davis et al., "A Vibrational-Spectroscopic Study of the Species Present in the $CO_2$—$H_2O$ System," *J. Solution Chem.* 1:329-339 (1972), which is hereby incorporated by reference in its entirety. This tendency is similar to the stretching modes in —CN and bending mode of —NH at 1120 $cm^{-1}$, 1413 $cm^{-1}$ and 1545 $cm^{-1}$ corresponding to the formation of $NH_2COO^-$ species. Milella et al., "Estimating Speciation of Aqueous Ammonia Solutions of Ammonium Bicarbonate: Application of Least Squares Methods to Infrared Spectra," *React. Chem. Eng.* 4:1284-1302 (2019), which is hereby incorporated by reference in its entirety. The area under the peaks of these representative peaks is integrated and normalized to determine the temporal evolution of the species. Further the evolution in the bicarbonate peaks that correspond to the δ(—C—OH) vibrations of the —C—OH group and ν(—C—O) vibrations of the —C—O group are consistent with Reaction 2 in which the hydrolysis of the carbamate ions results in the formation of glycinate and bicarbonate ions (Reaction 2). The availability of bicarbonate ions during the capture of $CO_2$ using Na-glycinate motivate the combination of this pathway with carbon mineralization of CaO and $CaSiO_3$.

TABLE 3

Main infrared band assignments of the species present in the $CO_2$—Na-glycinate-$H_2O$ system. The symbols ν, $\nu_a$ and δ indicate the stretching mode, the asymmetric stretching mode, and the bending mode of the relevant molecules, respectively.

| Species | Band Position ($cm^{-1}$) | Assignment | Reference |
|---|---|---|---|
| $NH_2COO^-$ | 1120 | υ(—CN) | [75, 86, 87] |
| | 1413 | υ(—CN) | [75, 88] |
| | 1545 | δ(—N—H) | [75, 86] |
| $HCO_3^-$ | 1105 | $\upsilon_a$(—C—OH) | [75] |
| | 1300 | δ(—C—OH) | [75] |
| | 1365 | υ(—C—O) | [75] |
| $CO_3^{2-}$ | 1395 | $\upsilon_a$(—CO) | [74] |

Davis et al., "A Vibrational-Spectroscopic Study of the Species Present in the $CO_2$—$H_2O$ System," *J. Solution Chem.* 1:329-339 (1972); Milella et al., "Estimating Speciation of Aqueous Ammonia Solutions of Ammonium Bicarbonate: Application of Least Squares Methods to Infrared Spectra," *React. Chem. Eng.* 4:1284-1302 (2019);

Pretsch et al., "Structure Determination of Organic Compounds," Berlin: Springer-Verlag 108 (2000); and Hisatsune, "Low-temperature Infrared Study of Ammonium Carbamate Formation," *Can. J. Chem.* 62:945-948 (1984); and Frasco, "Infrared Spectra of Ammonium Carbamate and Deuteroammonium Carbamate," *J. Chem. Phys.* 41:2134 (1964), all of which are hereby incorporated by reference in their entirety.

Effect of temperature—In these carbon mineralization experiments, the hypothesis that there is a non-monotonic temperature dependence on the carbon mineralization behavior of CaO and $CaSiO_3$ in the single step capture and carbonate mineralization approach is explored. $CO_2$ capture by aqueous solvents is generally favored below 40° C., while regeneration is favored at higher temperatures. Brethomé et al., "Direct Air Capture of $CO_2$ via Aqueous-Phase Absorption and Crystalline-phase Release Using Concentrated Solar Power," *Nat. Energy* 3:553-559 (2018); Garrabrant et al., "Energy-Efficient $CO_2$ Capture from Flue Gas by Absorption with Amino Acids and Crystallization with a Bis-Iminoguanidine," *Ind. Eng. Chem. Res.* 58:10510-10515 (2019); and Hu et al., "Carbon Dioxide Capture by Solvent Absorption Using Amino Acids: A Review," *Chinese J. Chem. Eng.* 26:2229-2237 (2018), all of which are hereby incorporated by reference in their entirety. However, higher temperatures favor the dissolution of CaO and $CaSiO_3$ and the precipitation of calcium carbonates. Gadikota, "Commentary: Ex Situ Aqueous Mineral Carbonation," *Front. Energy Res.* 4:21 (2016); Gerdemann et al., "Ex Situ Aqueous Mineral Carbonation," *Enviorn. Sci. Technol.* 41:2587-2593 (2007); and Gerdemann et al., "Ex-Situ and In-Situ Mineral Carbonation as a Means to Sequester Carbon Dioxide," *DOE/ARC*-2004-031 (2004), all of which are hereby incorporated by reference in their entirety. To investigate the influence of temperature on the overall kinetics of $CO_2$ capture and mineralization, experiments were performed at 25° C., 50° C., 75° C., and 90° C. in 1.0 M Na-glycinate for a reaction time of 3 hours with 15 wt % solid and a stirring rate of 300 rpm.

The extents of carbon mineralization of CaO at 25° C., 50° C., 75° C., and 90° C. are 77.0%, 95.1%, 94.2%, and 97%, respectively. The extents of carbon mineralization of $CaSiO_3$ at 25° C., 50° C., 75° C., and 90° C. are 6.6%, 16.6%, 31.0%, and 27.9%, respectively. These data show that near complete conversion of CaO to $CaCO_3$ can be achieved at temperatures in the range of 50-90° C. However, the conversion of $CaSiO_3$ to $CaCO_3$ does not exceed 31.0% in this temperature range. These data are consistent with prior published work using MEA as the solvent. Liu et al., "Integrated $CO_2$ Capture, Conversion, and Storage To Produce Calcium Carbonate Using an Amine Looping Strategy," *Energy & Fuels* 33:1722-1733 (2018), which is hereby incorporated by reference in its entirety. The highest reported conversion of $CaSiO_3$ to $CaCO_3$ was 36% with 50 wt % MEA. Lower extents of carbon mineralization with $CaSiO_3$ compared to CaO are attributed to slower dissolution rates and the formation of mass transfer limiting silica passivation layers. Daval et al., "The Effect of Silica Coatings on the Weathering Rates of Wollastonite (CaSiO3) and Forsterite (Mg2SiO4): An Apparent Paradox?," *Water-Rock Interact.* 713-717 (2010) and Daval et al., "Linking m-scale Measurements of the Anisotropy of Silicate Surface Reactivity to Macroscopic Dissolution Rate Laws: New Insights Based on Diopside," *Geochim. Cosmochim. Acta* 107:121-134 (2013), both of which are hereby incorporated by reference in their entirety.

The effect of competing reactions is more clearly delineated in the case of $CaSiO_3$ where complete conversion to $CaSiO_3$ is not achieved. One of the key considerations is the change in the reaction rate of $CO_2$ captured using glycinate as a function of temperature. Guo and co-workers showed that the rate constant of the glycine anion $NH_2CH_2CO_2^-$ reacting with $CO_2$ is represented by the following expression (Guo et al., "Amino Acids as Carbon Capture Solvents: Chemical Kinetics and Mechanism of the Glycine+$CO_2$ Reaction," *Energy & Fuels* 27:3898-3904 (2013), which is hereby incorporated by reference in its entirety):

$$k(M^{-1}s^{-1}) = 1.24\times 10^{12}\exp\left[-\frac{5459}{T(K)}\right]$$

Figures 17A, 17B, 17C:
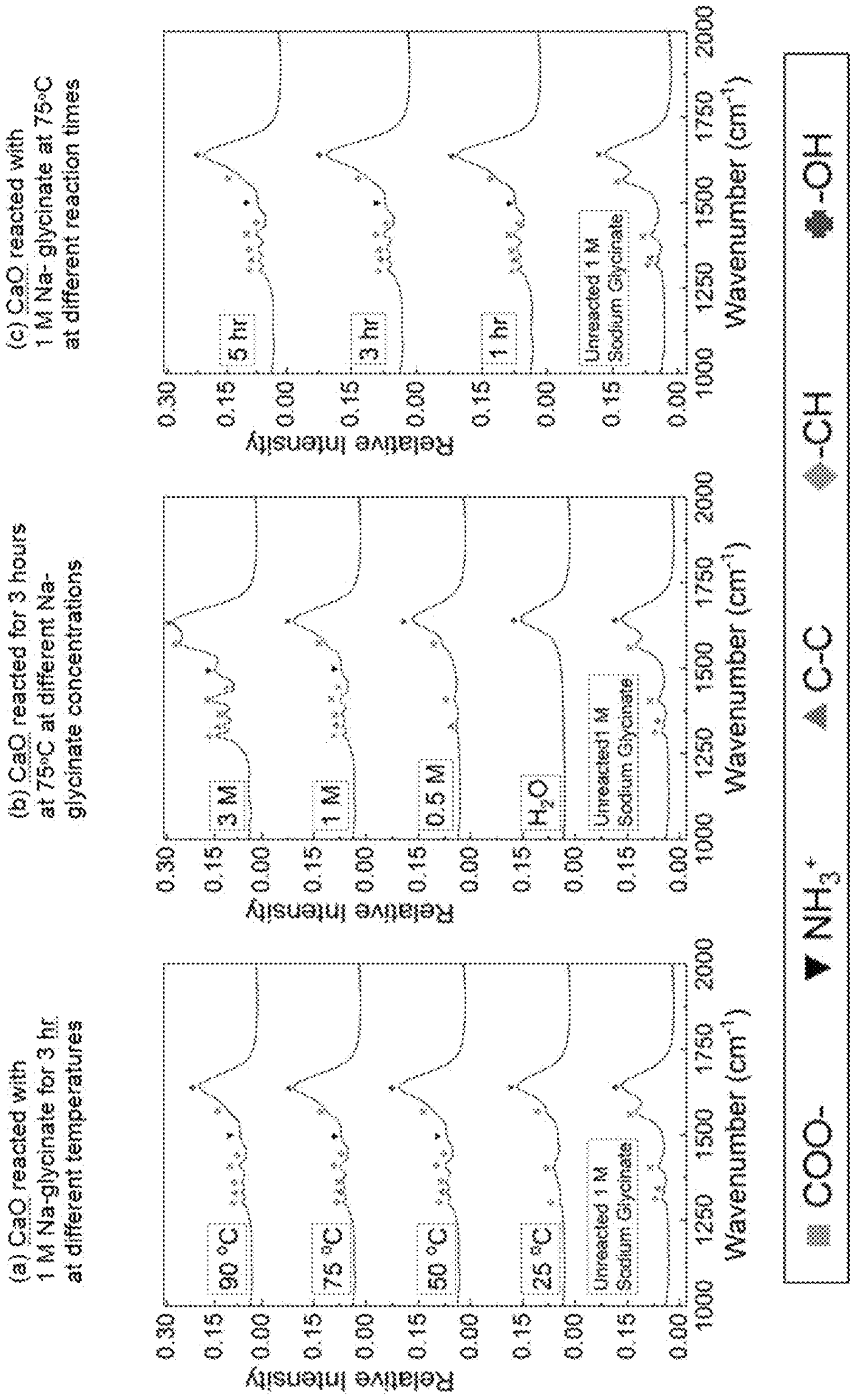
FIGS. 17A-17C show changes in the species present in the aqueous phase recovered after the carbon mineralization of CaO using ATR-FTIR analyses.
Figures 18A, 18B, 18C:
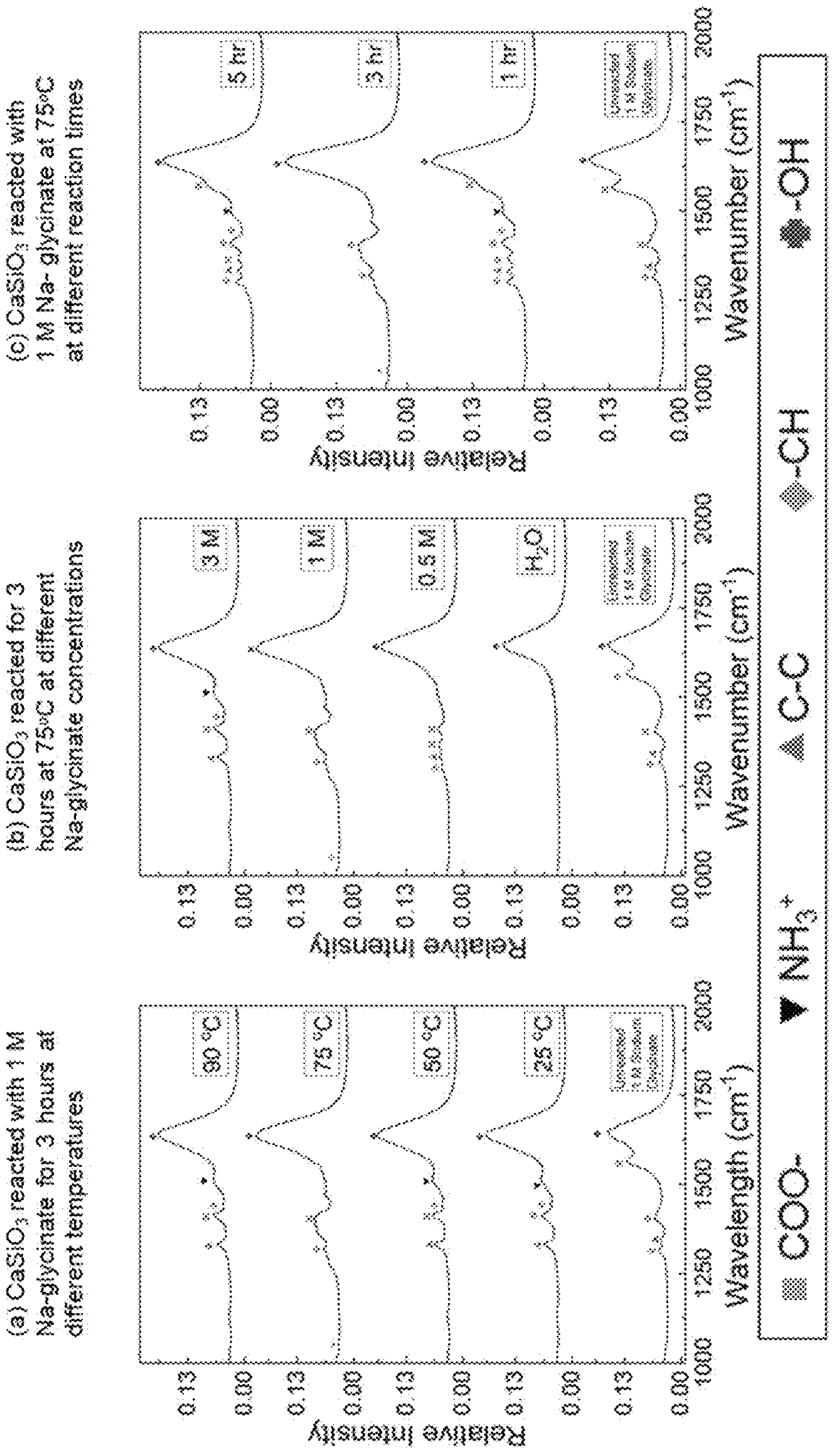
FIGS. 18A-18C show changes in the species present in the aqueous phase recovered after the carbon mineralization of $CaSiO_3$ using ATR-FTIR analyses.

The rate constants for the reaction between $CO_2$ and $NH_2CH_2CO_2^-$ at 25° C., 50° C., 75° C., and 90° C. are $1.37\times10^4$ $M^{-1}s^{-1}$, $5.67\times10^4$ $M^{-1}s^{-1}$, $1.91\times10^5$ $M^{-1}s^{-1}$, and $3.65\times10^5$ $M^{-1}s^{-1}$, respectively. Guo et al., "Amino Acids as Carbon Capture Solvents: Chemical Kinetics and Mechanism of the Glycine+$CO_2$ Reaction," *Energy & Fuels* 27:3898-3904 (2013), which is hereby incorporated by reference in its entirety. However, the highest extents of carbon mineralization of $CaSiO_3$ are noted at 75° C. as opposed to 90° C. The higher dissolution rates of $CaSiO_3$ and the decreasing solubility of $CaCO_3$ with increasing temperature favor carbonate formation at 75° C. as opposed to lower temperatures of 25° C. Palandri et al., "A Compilation of Rate Parameters of Water-Mineral Interaction Kinetics for Application to Geochemical Modeling," U.S. Geological Survey (2004) and Weyl et al, "The Change in Solubility of Calcium Carbonate with Temperature and Carbon Dioxide Content," *Geochim. Cosmochim. Acta* 17:214-225 (1959), both of which are hereby incorporated by reference in their entirety. FTIR analysis of the aqueous phase showed that the intensity of —N—H peak corresponding to $NH_2COO^-$ species at 1545 $cm^{-1}$ in unreacted 1 M Na-glycinate progressively decreases with increase in temperature in the case of CaO (FIG. 17A) and $CaSiO_3$ (FIGS. 18A-18C). The reduced concentration of $COO^-$ peak corresponding to the bicarbonate species in the fluids recovered post-reaction is consistent with the uptake of $CO_2$ from the aqueous phase to produce calcium carbonates.

Effect of amino acid salt concentration—To evaluate if carbon mineralization is limited by the concentration of the $CO_2$ capture solvent, concentrations of 0, 0.5 M, 1.0 M, and 3.0 M Na-glycinate at 75° C. for 3 hours with 15 wt % solid and a stirring rate of 300 rpm is investigated. The extents of carbon mineralization with CaO at 0, 0.5 M, 1.0 M, and 3.0 M Na-glycinate are 42.6%, 68.4%, 94.2%, and 92.1%, respectively. The extents of carbon mineralization with $CaSiO_3$ at 0, 0.5 M, 1.0 M, and 3.0 M Na-glycinate are 16.7%, 14.1%, 31.0%, and 23.6%, respectively. In the case of $CaSiO_3$ and CaO, the highest extents of carbon mineralization are achieved at 75° C. FT-IR analyses of the liquid effluents showed that the —$COO^-$ peak at a wavelength of 1595 $cm^{-1}$ is prominent in the effluent associated with the 3 M Na-glycinate case compared to concentrations at 0.5 M and 1.0 M (FIGS. 18A-18C). These data suggest that carbon mineralization at elevated concentrations of Na-glycinate is not limited by the availability of carbonate or bicarbonate ions. However, in the case of $CaSiO_3$, —$COO^-$ peak is not prominent, suggested that the carbonate-bearing species are consumed. It is also interesting to note that the —OH peak in the FT-IR data (FIGS. 17A-17C and FIGS. 18A-18C)

increases with the concentration of Na-glycinate. This is because the pH of the sodium glycinate used is high.

Figures 16A, 16B, 16C:
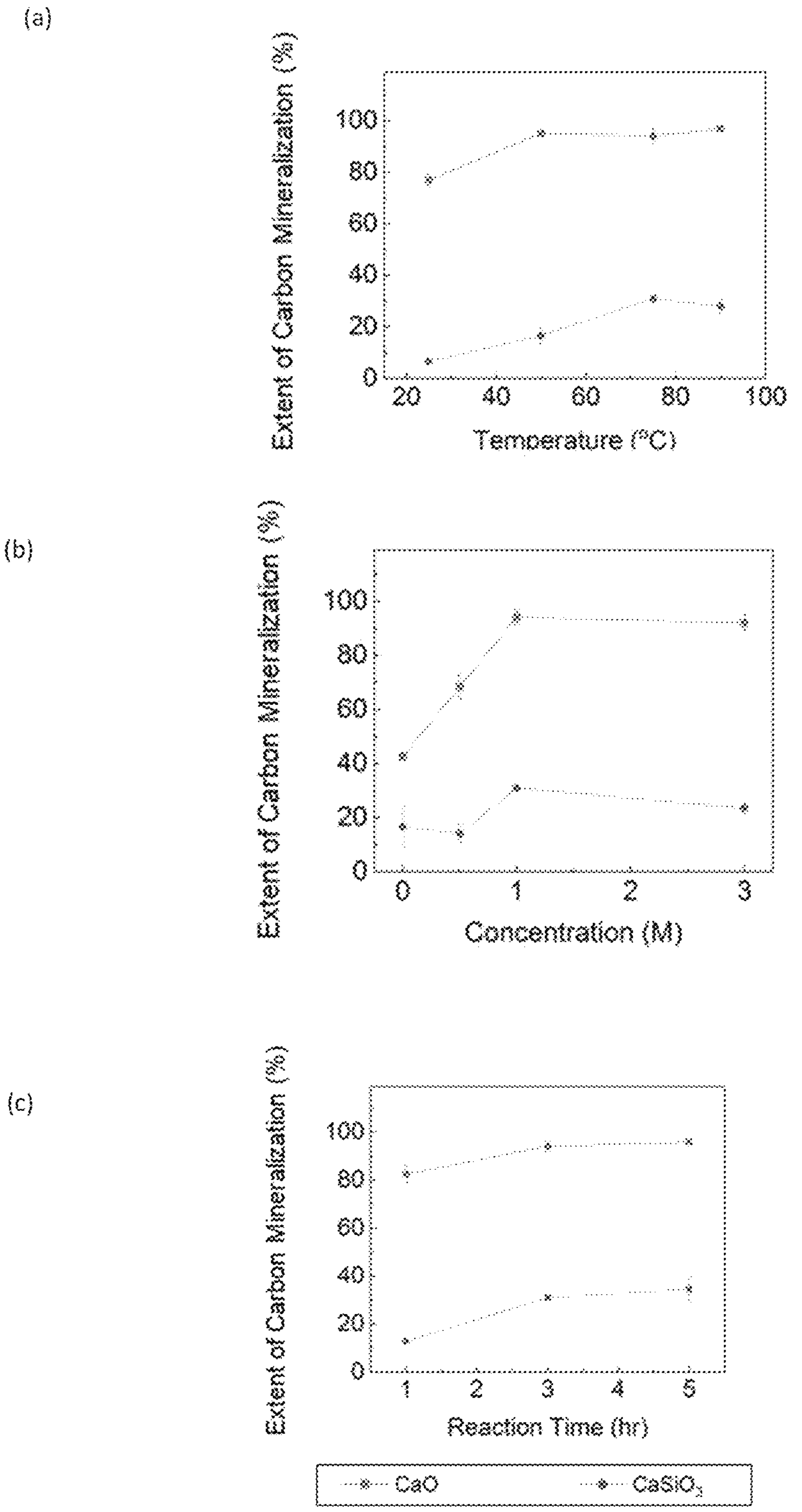
FIGS. 16A-16C show extent of carbonation of CaO (red) and $CaSiO_3$ (blue) with 1 M sodium glycinate at different temperatures of 25, 50, 75, and 90° C. for 3 h in (FIG. 16A), with different concentration of 0, 0.5, 1, and 3 M sodium glycinate at 75° C. for 3 h in (FIG. 16B), with 1 M sodium glycinate at 75° C. for different reaction time of 1, 3, and 5 hr in (FIG. 16C). The experimental configuration is shown in FIG. 21. All the experiments are performed at $P_{CO2}$=1 atm and a stirring rate of 300 rpm.

Effect of reaction time—To understand if the carbon mineralization reactions with Na-glycinate occur rapidly in the first hour of the reaction or gradually increases with time, carbon mineralization experiments were performed with Na-glycinate. The experiments were performed at 1, 3, and 5 hour time periods with 1 M Na-glycinate at 75° C. with a stirring rate of 300 rpm. The extents of carbon mineralization with CaO are 82.5, 94.2, and 95.9% at 1, 3, and 5 hours, respectively. The extents of carbon mineralization with $CaSiO_3$ are 12.8, 31.0, and 34.6% at 1, 3, and 5 hours, respectively. Significant carbon mineralization occurs in the first hour of the reaction in the case of CaO. A small increase in the extent of carbon mineralization of CaO between 3 hours and 5 hours is noted. In contrast, the kinetics of carbon mineralization of $CaSiO_3$ were considerably slower in the first hour of the reaction, with sufficiently high extents achieved at 31.0%. A small increase in the extent of carbon mineralization of $CaSiO_3$ between 3 hours and 5 hours is noted (FIG. 16C). A progressive decrease in the intensity of the —$COO^-$ group in the aqueous phase is consistent with the higher extent of carbon mineralization (FIGS. 17C and 18C).

Structural and morphological characterization of recovered materials—During the carbon mineralization of CaO and $CaSiO_3$, various forms of calcium carbonate such as calcite (rhombohedral), aragonite (spiky/orthorhombic), and vaterite (plate-like/hexagonal) can be formed. Prior studies showed that the process parameters such as the solvent for $CO_2$ capture and the temperature influence the crystalline habit of calcium carbonate. Arti et al., "Single Process for $CO_2$ Capture and Mineralization in Various Alkanolamines Using Calcium Chloride," *Energy & Fuels* 31:763-769 (2017) and Murnandari et al., "Effect of Process Parameters on the $CaCO_3$ Production in the Single Process for Carbon Capture and Mineralization," *Korean J. Chem. Eng.* 34:935-941 (2017), both of which are hereby incorporated by reference in their entirety. To investigate the influence of temperature, amino acid salt concentration, and reaction time, the products were analyzed using Wide Angle X-Ray Scattering (WAXS) measurements. The carbonate-bearing products were identified and characterized in the presence of 1 M sodium glycinate at different temperatures of 25, 50, 75, and 90° C. for 3 h in FIG. 19A, with different concentration of 0, 0.5, 1, and 3 M sodium glycinate at 75° C. for 3 h in FIG. 19B, with 1 M sodium glycinate at 75° C. for different reaction time of 1, 3, and 5 hr in FIG. 19C. The changes in the functional groups in solid CaO and $CaSiO_3$ when reacted to produce calcium carbonate are shown in FIGS. 22A-22C and 23A-23C, respectively.

Figures 19A, 19B, 19C, 19D, 19E, 19F:
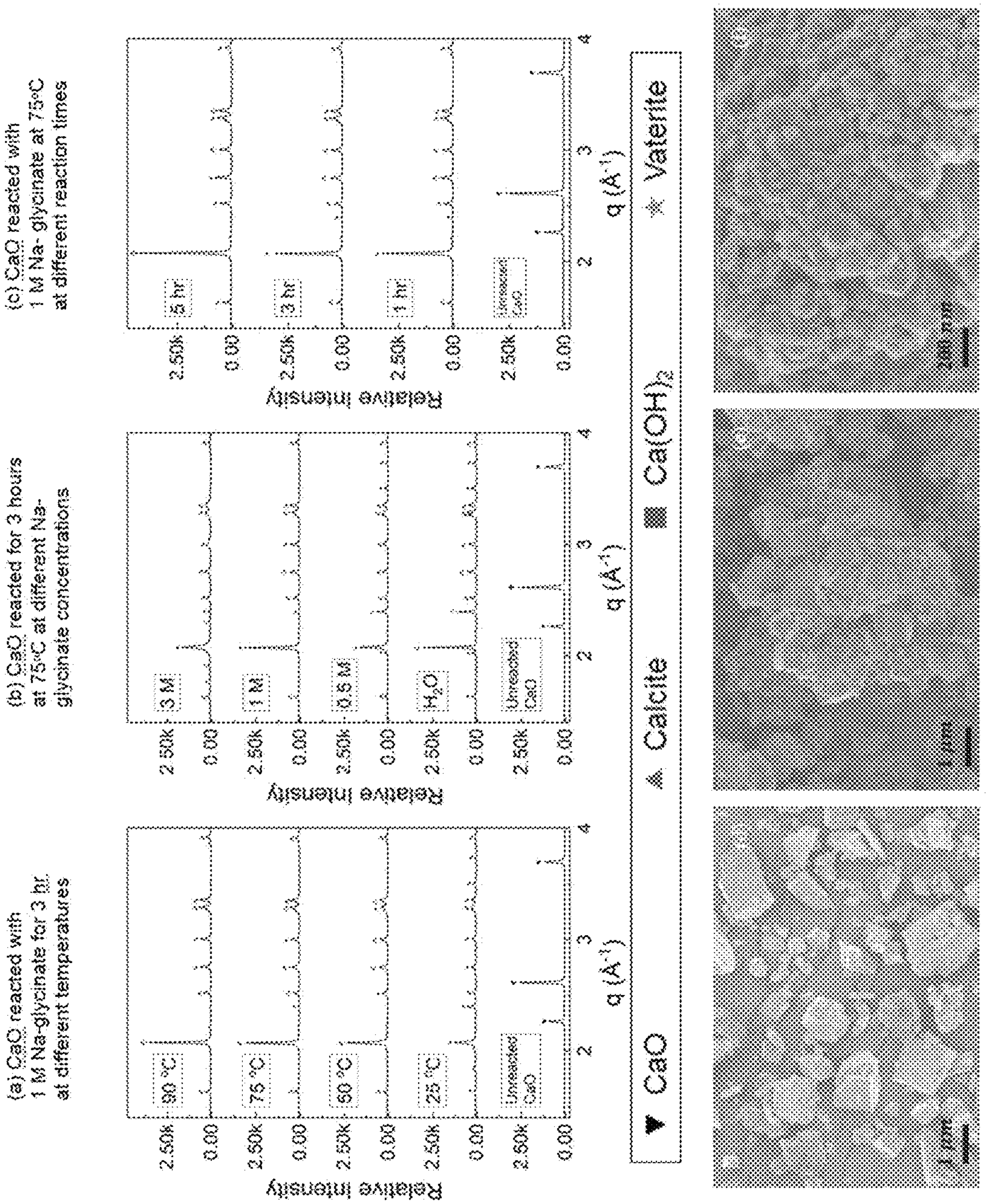
FIGS. 19A-19F show changes in the phases present in calcium oxide on carbon mineralization.

$CO_2$ absorption and mineralization at 25° C. in 1 M Na-glycinate results in the formation of $Ca(OH)_2$ and $CaCO_3$. With increasing temperature, $Ca(OH)_2$ phase disappears and calcite remains as the dominant phase (FIG. 19A). Müller et al., "Crystal Structure Refinement: A Crystallographer's Guide to SHELXL," Oxford Scholarship Online (2010); Chessin et al., "Positions and Thermal Parameters of Oxygen Atoms in Calcite," *Acta Cryst.* 18:689-693 (1965); Wang et al., "Structure and Carbonited Orientation of Vaterite ($CaCO_3$)," *Am. Minerl.* 94:380-386 (2009); Dal Negro et al., "Refinement of the Crystal Structure of Aragonite," *Am. Mineral.* 56:768-772 (1971); Primak et al., "X-Ray Diffraction Studies of Systems Involved in the Preparation of Alkaline Earth Sulfide and Selenide Phosphors," *J. Am. Chem. Soc.* 70:2043-2046 (1948); and Petch, "The Hydrogen Positions in Portlandite, $Ca(OH)_2$, as Indicated by the Electron Distribution," *Acta Cryst.* 14:950-957 (1961), all of which are hereby incorporated by reference in their entirety. The presence of calcium hydroxide at 25° C. is consistent with the lower extent of carbon mineralization of 77.0% compared to 95.1%, 94.2% and 97.0% at 50, 75, and 90° C., respectively. Similarly, calcium hydroxide is present in the samples when reacted in water or 0.5 M Na-glycinate, which correspond to extents of carbon mineralization of 42.6% and 68.4% respectively (FIG. 19B). However, in the case of 3 M Na-glycinate, vaterite and calcite are co-present. These data suggest that higher concentrations of carbamate ions (FIG. 17B) in case of 3 M Na-glycinate influence the formation of calcium carbonate polymorphs. Further, increase in the reaction time enhances the formation of calcite (FIG. 19C). The morphological features are images using SEM. FIGS. 19A-19C represent unreacted CaO, CaO reacted in water and CaO reacted in 1 M Na-glycinate at 75° C. for 3 hours. The formation of rhombohedral calcite is noted when CaO is reacted in water and in 1 M Na-glycinate (FIGS. 19B and 19C).

Figures 20A, 20B, 20C, 20D, 20E, 20F:
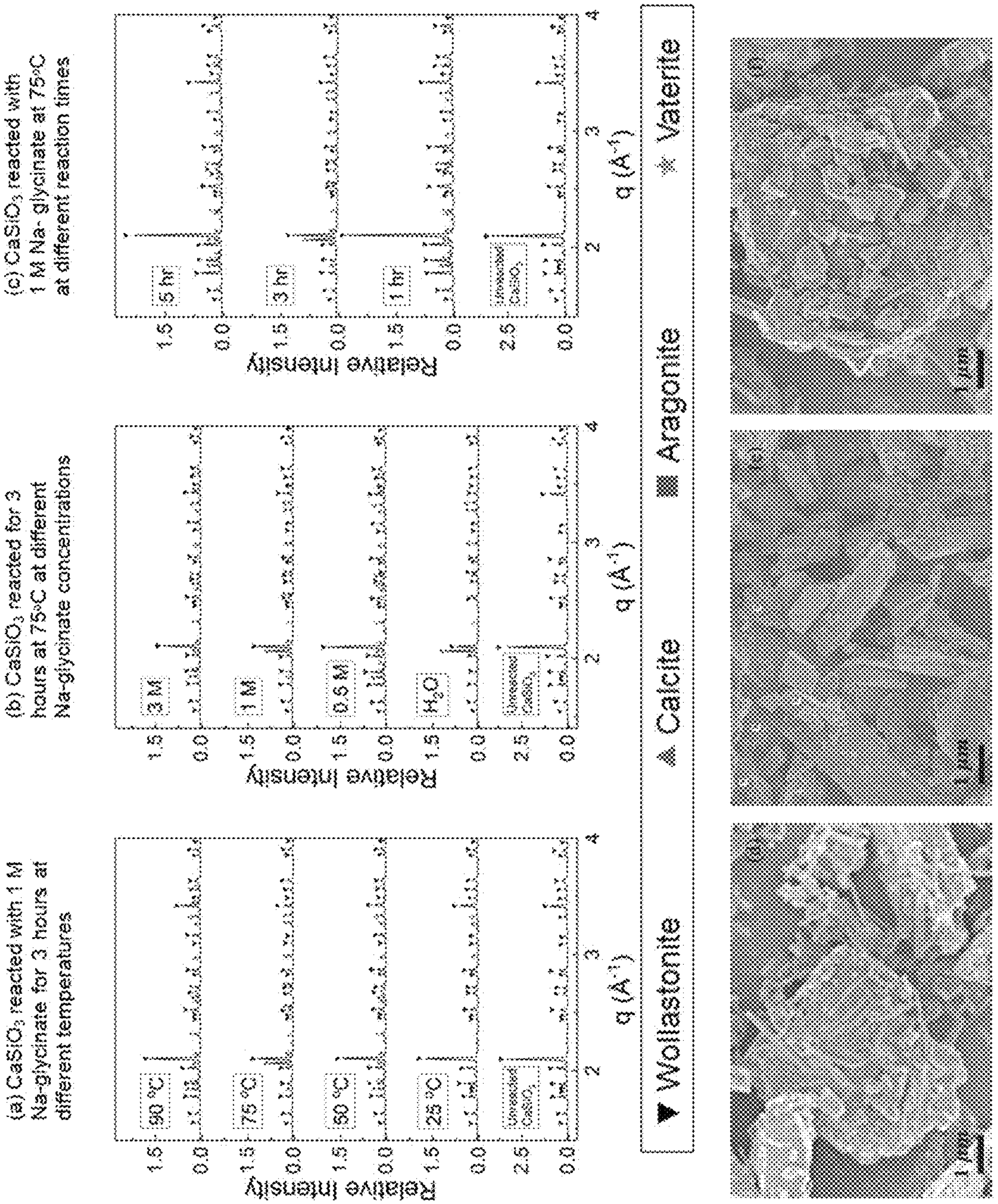
FIGS. 20A-20F show changes in the phases present in calcium silicate on carbon mineralization.

Unlike CaO, lower extents of carbon mineralization are noted in $CaSiO_3$. This is also evident from the presence of calcium silicate present in all the reacted samples. The co-presence of calcite, vaterite, and aragonite is noted in all the reacted samples (FIG. 20). Interestingly, the extent of carbon mineralization of $CaSiO_3$ in water and 1.0 M Na-glycinate are 16.7% and 31.0%, respectively. For this reason, the presence of rhombohedral calcite, spiky aragonite and plate-like vaterite is more sparse in FIG. 19E representing the water case compared to FIG. 19F representing the 1.0 M Na-glycinate case.

Example 8—Discussion of Examples 6-7

In the above examples, the single-step capture and mineralization of CaO and $CaSiO_3$ to calcium carbonate using Na-glycinate, an amino acid salt is investigated. The influence of reaction temperature in the range of 25° C.-90° C., reaction time in the range of 1-3 hours, and Na-glycinate concentrations in the range of 0.5-3 M on the carbon mineralization behavior of CaO and $CaSiO_3$ were probed. While lower temperatures aid the thermodynamics of $CO_2$ capture, higher temperatures favor the kinetics of mineral dissolution and carbonate precipitation. In this single step $CO_2$ capture and mineralization pathway, highest conversion of CaO and $CaSiO_3$ were achieved at 1.0 M Na-glycinate at 75° C. and with a reaction time of 3 hours in a system comprising 15 wt % solid and at a stirring rate of 300 rpm. Extents of carbon mineralization with CaO and $CaSiO_3$ are 94.2% and 31.0%, respectively. These data suggest that Na-glycinate undergoes multiple $CO_2$ capture and regeneration cycles into the aqueous phase facilitating greater availability of aqueous carbon species for carbonate precipitation. The dominant crystalline phase in materials with CaO as the precursor is calcite. Aragonite, calcite and vaterite are present in the materials with $CaSiO_3$ as the precursor. The results demonstrate that Na-glycinate is an environmentally benign alternative to aqueous amines for the single step $CO_2$ capture and mineralization with inherent chemical regeneration of the solvent.

Example 9—Novel Vortex-Flow Driven Process for Producing Calcium and Magnesium Carbonates Via Integrated $CO_2$ Capture and Utilization (VORTEX-$CO_2$)

The VORTEX-$CO_2$ technology addresses the societal need of utilizing multiple waste streams such as alkaline industrial residues (e.g., steel slag and coal fly ash) and anthropogenic $CO_2$ to produce value-added products. The customers for this technology are (i) industries that are experiencing challenges in disposing alkaline industrial residues rich in calcium and magnesium, and are interested in capturing and utilizing co-emitted $CO_2$ (e.g., iron and steel industries, cement and construction industries) and (ii) industries that have a need for calcium and magnesium carbonates (e.g., paper and construction industries). The major pain points motivating this technology are the costs associated with the treatment and landfilling of alkaline industrial residues particularly steel slag (that has heavy metal constituents), opportunity cost of not using anthropogenic $CO_2$ through the 45Q program which provides a tax credit of $35 per ton of $CO_2$ captured and used, and the need for high purity calcium and magnesium carbonates with uniform size distributions to meet their growing demand for green building materials.

The value proposition lies in unlocking and realizing the economic value of using alkaline industrial residues or naturally occurring minerals and anthropogenic $CO_2$ to produce value-added calcium and magnesium carbonates. Currently, there are no technologies on the market to simultaneously capture and convert $CO_2$ using regenerable $CO_2$ capture solvents to produce calcium or magnesium carbonates with uniform particle size distributions in less than three processing steps at temperatures in the range of 25-75° C. Thus, there is a need for novel, efficient, scalable, and commercially realizable processes for producing value-added inorganic carbonates from captured $CO_2$.

To address this need, the innovation harnesses the use of localized vortex flows in a Taylor-Couette (T-C) reactor. This system accelerates the formation of calcium and magnesium carbonates with uniform particle size distributions while regenerating the aqueous $CO_2$ capture solvent. Further, this innovation overcomes the challenge of non-uniform concentration gradients in conventional stirred systems that result in inconsistent particle size distributions of the crystallized materials.

A T-C reactor consists of two coaxial cylinders, with a rotating inner cylinder and fixed outer cylinder and inlets and outlets for continuous operation. Turbulent vortices are formed when the centrifugal force exceeds the stabilizing viscous force beyond a critical rotation speed. Vortex formation is simply controlled by the flow rate and the rotation speed of the cylinders. Localized mixing of the $CO_2$-loaded solvent and the Ca- and Mg-species results in uniform particle size distributions of Ca- and Mg-carbonates and the regeneration of the solvent in customized T-C reactors. By tuning the flow rate and the rotation rate, particles can be synthesized with sizes ranging from a few tens of nanometers to several micrometers. This technology will disrupt conventional approaches of synthesizing calcium and magnesium carbonates and will allow customers to harness the existing 45Q tax reforms for capturing and utilizing anthropogenic $CO_2$.

Studies demonstrated that T-C reactors overcome the challenges of non-uniform flow and concentration fields in conventional stirred reactors that result in inconsistent particle size distributions. Thus, T-C reactors provide the unique opportunity to accelerate $CO_2$ capture and carbonate crystallization processes while producing carbonate particles with uniform and consistent particle size distributions.

Over the past century, scientists have developed technical expertise in harnessing abundant fossil carbon resources to meet energy needs. There is now a growing societal realization that these activities are contributing to rising $CO_2$ concentrations in the atmosphere and have detrimental environmental impacts, despite the economic and social benefits that these technologies have brought to humanity. To advance market-driven solutions, emerging technologies that provide economic incentives to curb current $CO_2$ emissions into the atmosphere, and utilize these emissions are needed. These societal and economic needs motivated the development of integrated $CO_2$ capture and utilization technologies to produce value-added products such as calcium and magnesium carbonates.

Calcium carbonates ($CaCO_3$) are widely used as aggregates for building roads, additives in drilling fluids, and filler materials in the paper industry. Magnesium carbonates ($MgCO_3$) are used as filler materials in cosmetics, toothpaste, and in flooring materials. These needs are typically met by mining naturally occurring carbonates, as opposed to utilizing anthropogenic $CO_2$. For certain construction-related applications, these naturally occurring carbonates are calcined i.e., $CaCO_3$ and $MgCO_3$ are heated to temperatures as high as 750-850° C. and 350-400° C., respectively to produce oxides and emit $CO_2$. Calcination of naturally occurring $CaCO_3$ is one of the largest contributors to $CO_2$ emissions from cement industries. Naturally occurring $MgCO_3$ is also calcined to produce MgO which is used in bricks. Cost-effective processes that can reuse anthropogenic $CO_2$ to produce synthetic carbonates can meet these needs. Certain applications of these carbonates as filler materials can store $CO_2$ for long periods of time. These environmental factors motivate the development of new technologies for carbon capture and utilization, with implications for storage for specific applications.

Figure 24:
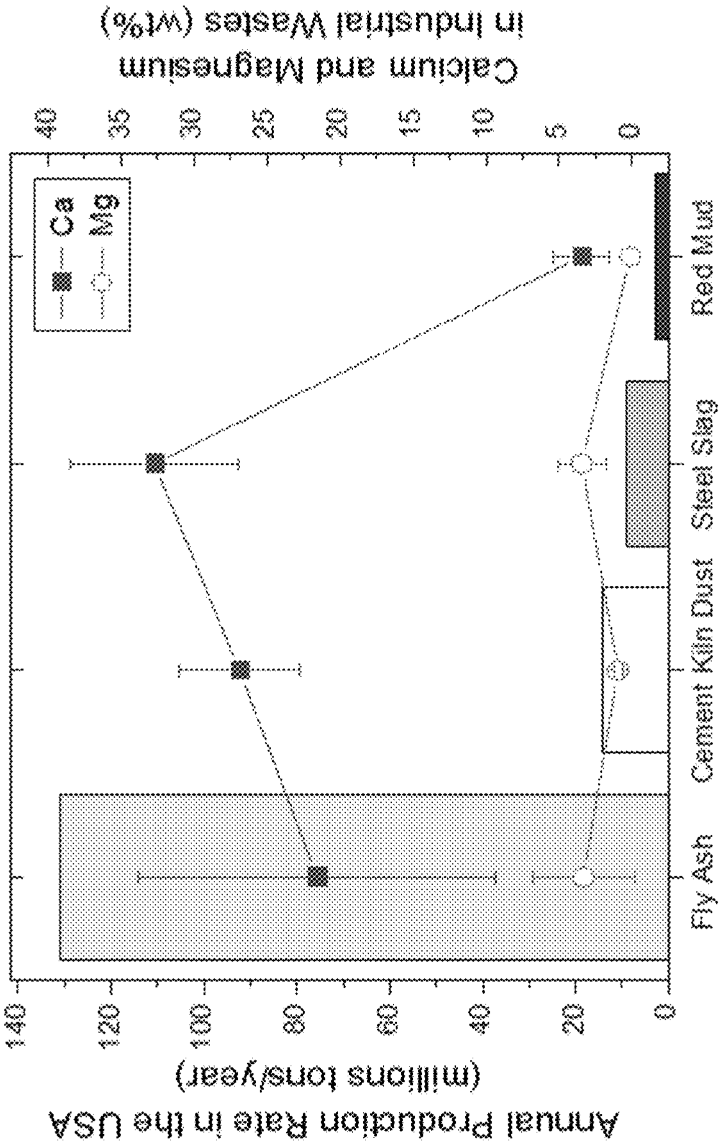
FIG. 24 shows annual production rate in the United States and average calcium and magnesium concentrations in fly ash, cement kiln dust, steel slag, and red mud.

Another societal challenge is the large quantities of Ca- and Mg-rich industrial residues that cost industries time, effort, and money to process and dispose in landfills. Examples of these wastes include iron and steel slag generated during the iron and steel making processes, cement kiln dust produced during the production of construction materials, fly ash generated in coal-producing facilities, and red mud generated in aluminum industries. FIG. 24 represents the production rates of these materials and the associated content of Ca and Mg. Novel processes that can utilize these residues to produce value-added products such as carbonates can reduce the associated wastes. It is estimated that 200-300 million tons of $CO_2$ can be captured and stored as carbonates in these alkaline industrial residues globally every year. To date, there is no technology to (i) synthesize anthropogenic carbon-bearing materials with specific particle sizes without the need for additional post-processing steps such as grinding, (ii) accrue carbon credits by offsetting $CO_2$ emissions, and (iii) eliminate tipping fees for disposing alkaline residues.

Several "pain points" were identified in the current market that the VORTEX-DAC technology can address. These pain points include the costs associated with the treatment and landfilling of alkaline industrial residues particularly steel slag, opportunity cost of not capturing and utilizing $CO_2$ through the 45Q program which provides a tax credit of $35 per tonne of $CO_2$ captured and used, and the need for $CaCO_3$ and $MgCO_3$ to meet their growing demand in various industrial sectors.

Inorganic carbonates such as Ca- and Mg-carbonates have several applications depending on the purity and the morphological specificity of these materials. High purity Ca- and Mg-carbonates can be used in filler materials. This technology has the potential to produce high purity silica that has several industrial applications. Low purity carbonates co-present with silica can be used in construction and building materials. This technology leverages the growing market for global green building materials which is currently estimated at USD 192.3 billion with an approximate growth rate (CAGR) of 11.2% in 2016. Table 4 summarizes the current global market for carbonates, applications, and the selling price.

TABLE 4

Current global market for carbonates, summary of applications, and estimated selling price

| | Current global market | Application | Fraction of global market | Estimated Selling Price |
|---|---|---|---|---|
| High purity nano-calcium carbonate | USD 3.3 billion in 2018 and is expected to witness a CAGR of 8.9% from 2019 to 2025 | Plastic, Rubber, Building and Construction | 1% --> USD 33.19 million | $85/kg (98%, 50 nm) |
| Calcium carbonate | USD 22.95 billion in 2018 and is estimated to witness a CAGR of 7.4% from 2019 to 2025 | Paper, Paints and Coatings, Plastics, Adhesives and Sealants | 1% --> USD 230 Million | $18/kg |
| Magnesium carbonate | USD 67 million in 2020 currently and is expected to reach USD 80 million by the end of 2026, growing at a CAGR of 2.5% during 2021-2026 | Pharmaceuticals, Plastic & Rubber Industry, Personal Care & Cosmetics, Paints & Inks, Pulp & Paper Industry, Food & Beverage | 1% --> USD 670,000 | $294/kg |
| Precipitated silica | USD 1.96 billion in 2018 and is expected to expand at a CAGR of 7.9% | Rubber, Agrochemicals, Oral care, Food | 1% --> USD 1.96 million | $2030/kg (nano powder) |

These analyses are important when considering customizing the technology to meet customer needs. Two principal categories of end customers were identified: 1) those who need high purity carbonates for use as specialty minerals or chemicals. Examples of these customers include whole-sale distributors or sellers of chemicals, pharmaceutical companies that use high quality filler materials, and paper industries; 2) those with a strong need to convert alkaline industrial residues using $CO_2$ as opposed to disposing them.

This technology can be scaled-up to produce customized particle sizes of $CaCO_3$ or $MgCO_3$ or implement it at industries that are looking to offset the cost of treating alkaline industrial residues and utilize the 45Q tax credits for capturing and utilizing $CO_2$. Examples of these customers include iron and steel manufacturers, cement manufacturers, aluminum producers, and fly ash generators such as coal-fired power plants. Even with partial market penetration, this volume would be sufficient for the manufacturer of the reactor systems to benefit from the strong price scaling and provide cash-flow to support continued research and development and identify diverse customers and markets.

The innovation is in the synthesis of carbonates with uniform particle morphologies using $CO_2$ captured by aqueous solvents that are regenerated as the carbonates are formed. Well-defined particle sizes are achieved in a specialized Taylor-Couette Carbonate Conversion (also referred to herein as "$TC^3$") reactor. This specialized reactor system is integrated with an absorption column for $CO_2$ capture. The two scientific principles underlying this innovation are: (i) $CO_2$ capture solvents are chemically regenerated in alkaline environments in which dissolved calcium and magnesium react to produce calcium and magnesium carbonates, and (ii) turbulent vortex flows enhance localized mixing which accelerates solvent regeneration and carbonate formation.

Figure 25:
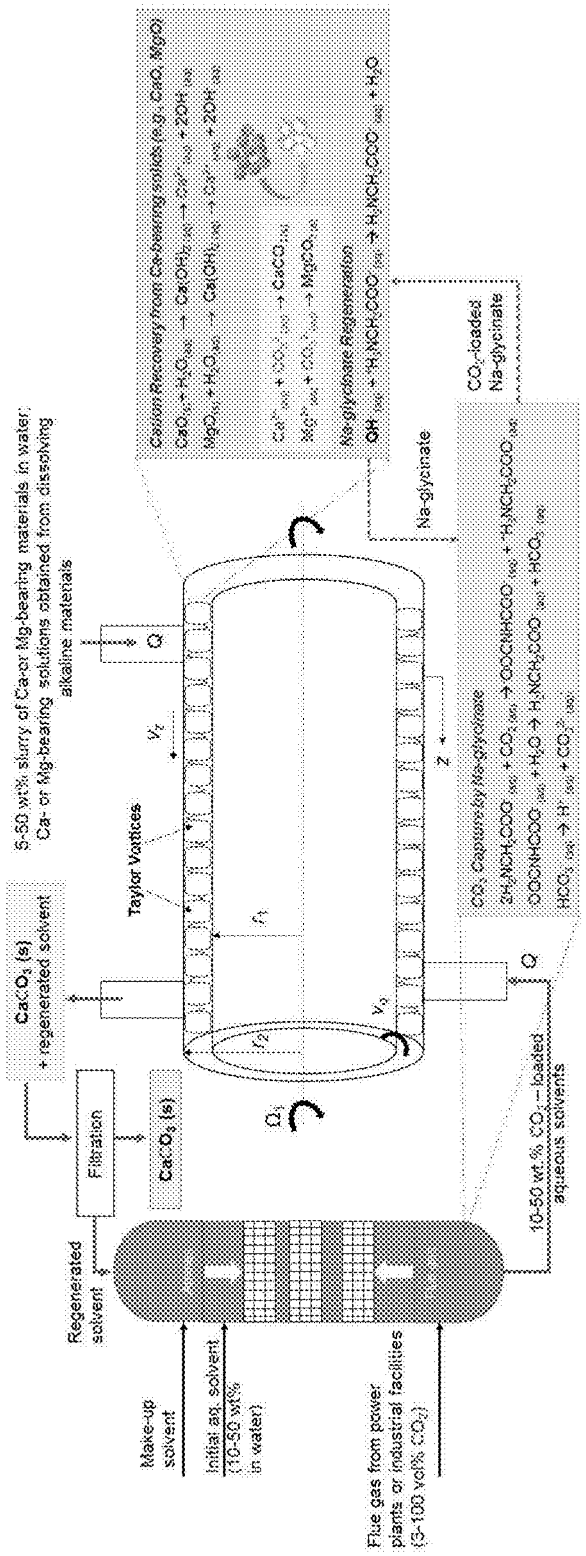
FIG. 25 shows a schematic representation of the $TC^3$ reactor integrated with an absorber for $CO_2$ capture to produce carbonates with inherent solvent regeneration.

Significant energy savings are realized in this innovation compared to conventional $CO_2$ capture and thermal regeneration of solvents. Solvent regeneration and carbonate formation occurs simultaneously at 50-75° C. as opposed to the thermal regeneration of the solvent which occurs at 120-140° C. In particular, the use of alkaline industrial residues or alkaline-bearing fluids allows for the simultaneous treatment of alkaline residues (e.g., steel slag, fly ash) and $CO_2$ emissions. FIG. 25 is a schematic representation of the $CO_2$ absorption and the solvent regeneration process to produce carbonates in the $TC^3$ reactor. During the installation of the reactor, the process engineers are provided with unprecedented capabilities to customize the setup to treat the specific alkaline industrial residue of interest. Post-installation, the performance of the reactor and the carbonate conversions achieved will continue to be monitored.

Figure 26:
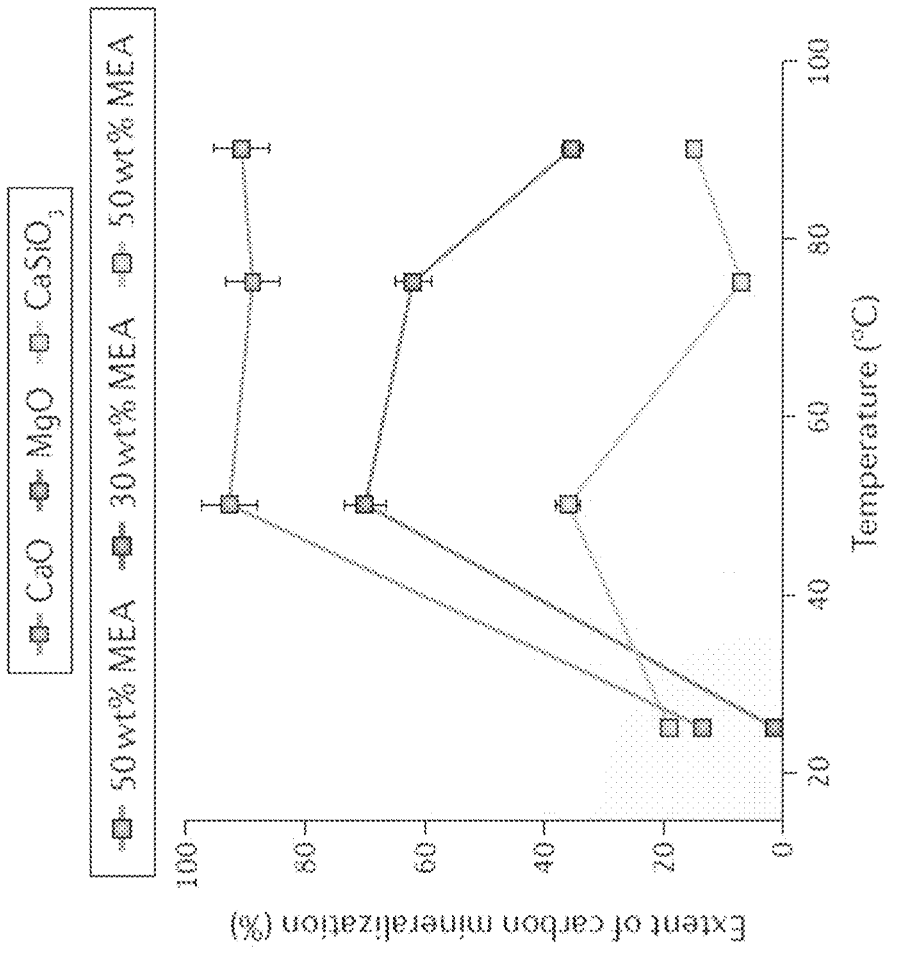
FIG. 26 shows effect of temperature on the extent of carbon mineralization with MEA (50 wt % MEA for CaO, 30 wt % MEA for MgO and 50 wt % MEA for $CaSiO_3$, 15 wt % solid precursors, $p(CO_2)$=1 atm, 3 h stirring at 300 rpm).
Figure 27:
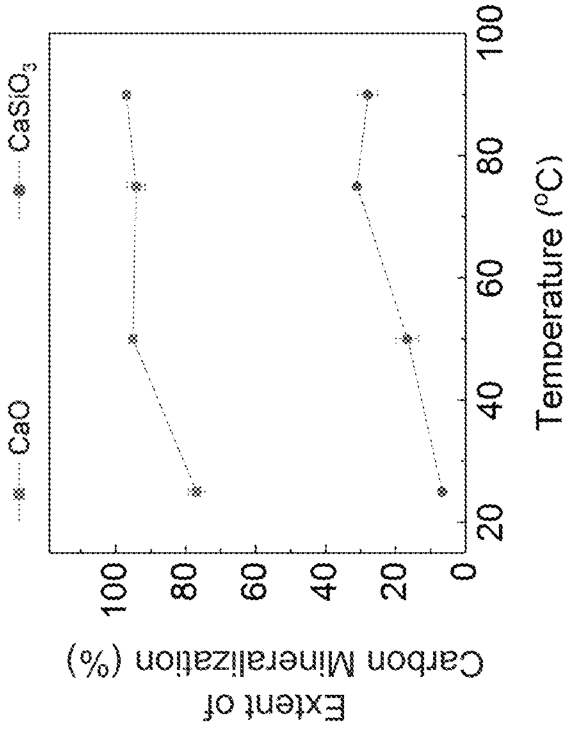
FIG. 27 shows effect of temperature on the extent of carbon mineralization with 1.0 M sodium glycinate, 15 wt % solid precursors, $p(CO_2)$=1 atm, 3 h stirring at 300 rpm.

A key component of this invention is the demonstration of the solid Ca- and Mg-carbonate formation with inherent solvent regeneration. The effectiveness of amine-based solvents such as monoethanolamine (MEA) and amino acid salt solvents such as sodium glycinate have been demonstrated in producing Ca- and Mg-bearing solids with solvent regeneration. Compared to MEA, sodium glycinate is less corrosive and more environmentally benign with similar performance for $CO_2$ capture and regeneration. One molecule of sodium glycinate captures one molecule of $CO_2$, while two MEA molecules are needed to capture one molecule of $CO_2$. Near complete conversion of CaO to $CaCO_3$ is achieved using MEA (FIG. 26) and sodium glycinate (FIG. 27) at 50° C. after reacting for 3 hours in a stirred tank reactor. In comparison, about 35% conversion of $CaSiO_3$ is achieved at 50° C. with MEA and at 75° C. with Na-glycinate. The particle sizes of CaO and $CaSiO_3$ are in the range of 10-30 μm. However, one of the key challenges with stirred reactor systems is the development of concentration gradients and flow fields with distance from the impeller resulting in non-uniform particle size distributions.

The T-C reactor provides vortex flows that accelerate the kinetics of solvent regeneration and carbonate formation. Prior research efforts demonstrate that vortex flows in T-C reactors result in narrower and well-defined particle size distributions of crystalline materials. This approach is an alternative to the conventional approaches of grinding carbonates post-synthesis to produce materials with specific particle sizes.

Another less explored technical challenge is the synthesis of carbonate-bearing materials with morphological specificity, starting from alkaline industrial precursors. Prior studies focused on the synthesis of carbonates from alkaline industrial residues were performed in stirred tank reactors using non-regenerable chemicals such as acids and bases. In contrast, this VORTEX-$CO_2$ technology represents a "step-change" advancement over the existing approaches given the use of regenerable solvents.

Figure 28:
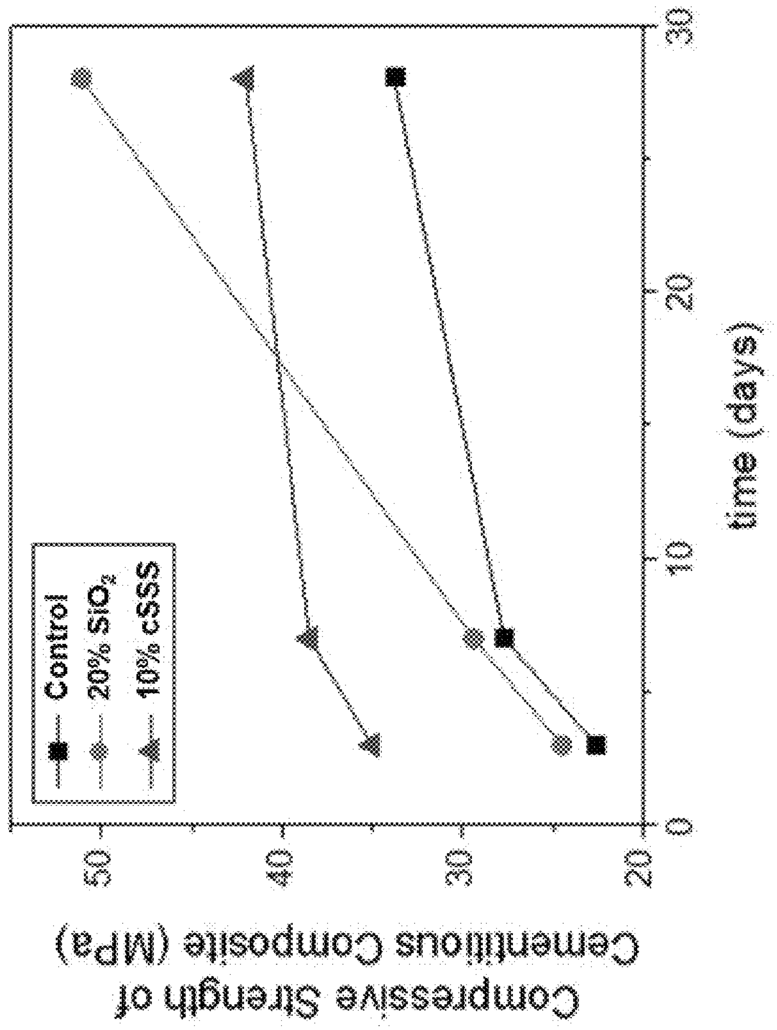
FIG. 28 shows compressive strengths of cementitious composites prepared with no additives (control case), 20% Si-rich materials and 10% carbonated stainless steel slag (cSSS).

In June 2020, DOE targets called for reducing the cost of $CO_2$ capture to about $30/ton of $CO_2$. This technology is estimated to cost $20-$30/ton of $CO_2$ since the chemical regeneration of the solvent occurs at substantially lower temperatures compared to thermal generation. Further, this cost does not include the avoided cost of disposing alkaline industrial residues in landfills which is estimated to cost $55/ton in the United States and the potential revenue from selling the produced carbonates. Studies have shown that replacing Ordinary Portland Cement (OPC) with 10% carbonated stainless steel slag (cSSS) results in a significant increase in the compressive strength of construction materials (FIG. 28). These data illustrate the effectiveness of these carbonate-bearing materials in enhancing the compressive strength of cementitious materials.

One of the unique features of the VORTEX-$CO_2$ technology is that it can be integrated with absorption technologies (e.g., amino acid salts or amines) for $CO_2$ capture. The chemical regeneration of the solvent with inherent formation of Ca- or Mg-carbonates occurs at 50-75° C., which is substantially lower compared to the thermal regeneration of the solvent which occurs at 100-140° C. depending on the solvent type. Thus, the VORTEX-$CO_2$ technology can harness waste heat in an industrial or power plant facility.

Prior approaches for producing carbonates utilized chemically consumptive pH swing approaches that utilize strong acids (e.g., hydrochloric acid or nitric acid) to dissolve the Ca and Mg constituents and precipitate carbonates at high pH conditions for which strong bases such as sodium hydroxide are used. In contrast, the inherent regeneration and reuse of the sodium glycinate solvent is chemically and energetically efficient.

Alkaline industrial residues such as steel slag and coal fly ash are produced to the order of several million tons every year. Landfilling these materials is often complicated by the presence of corrosive constituents such as nickel and chromium. Therefore, the conversion of these materials to carbonates is suggested to reduce their alkalinity, and lock in the heavy metals in a solid matrix. These alkaline industrial residues are often co-generated with $CO_2$ on-site. The availability and compositions of fly ash produced from coal-fired power plants, steel slag generated during steel manufacturing, cement kiln dust produced during cement manufacturing, and red mud generated during aluminum production are shown in FIG. 24. The heterogeneity in the compositions of these materials is represented by the large error bars in this figure.

Figure 29:
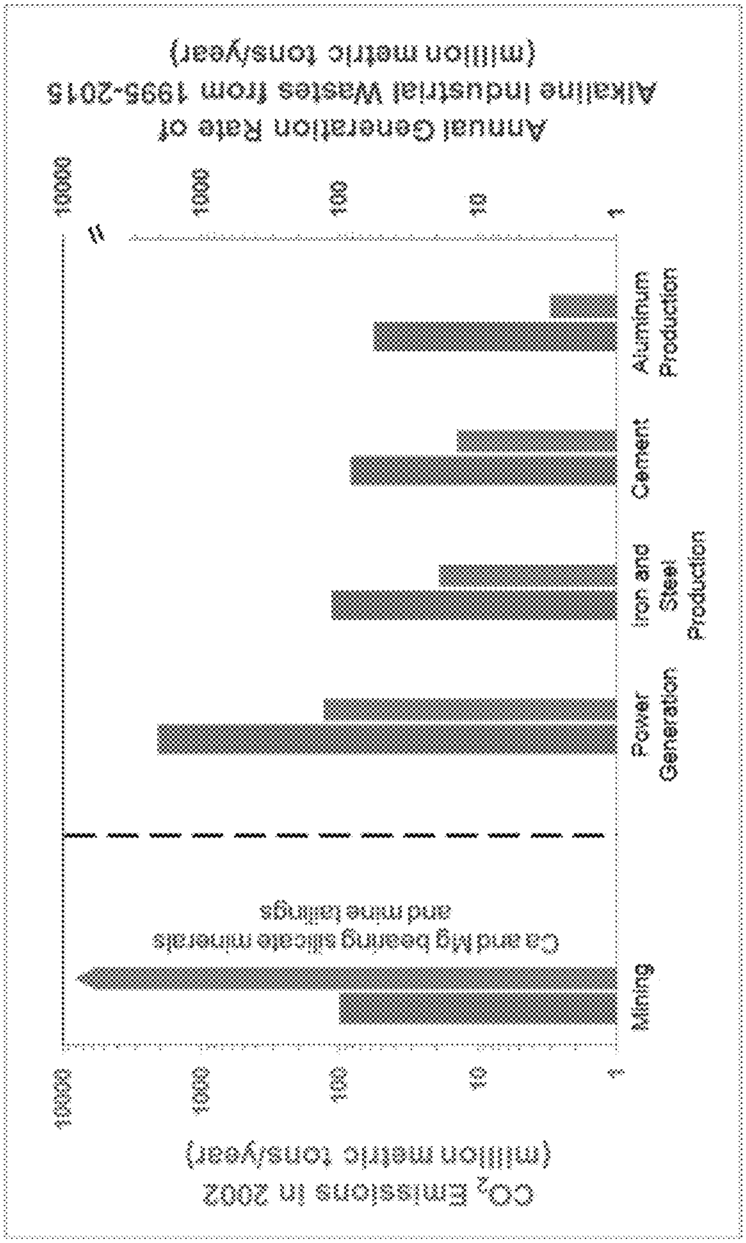
FIG. 29 shows annual emission rate of $CO_2$ produced from each industrial sector and corresponding co-generated alkaline industrial wastes.

FIG. 29 represents the availability of alkaline industrial residues and the corresponding $CO_2$ emissions. From this figure, it can be inferred that the mining industry has sufficient residues to offset its $CO_2$ emissions. However, the $CO_2$ emissions in power generation, iron and steel production, cement and aluminum production exceed the availability of these residues. About 200-300 million tons of $CO_2$ can be stored in these residues and $10^4$-$10^6$ gigatons of carbon can be stored in naturally occurring minerals. Thus, novel, cost-effective, and environmentally beneficial technologies that can harness these resources and deliver value to customers are needed.

Construction and carbonate materials from anthropogenic $CO_2$—The concept of curing synthetic Ca-silicate materials to produce construction materials using $CO_2$ has been well developed and deployed. This unique technology harnesses the carbon mineralization behavior of synthetic Ca-silicate to produce high strength constructions materials. Alternatively, $CO_2$ is injected into wet concrete to react with Ca in cement to produce nano-sized $CaCO_3$ which strengthens concrete. However, these technologies need a separate $CO_2$ capture and compression step to produce high purity and pressurized $CO_2$ and do not utilize $CO_2$ in flue gas streams directly.

Treatment of alkaline industrial residues with $CO_2$—There is technology to convert steel slag into carbonates in their facility in Inner Mongolia. This technology was implemented based on the concept of pH swing where acidic solutions are used to enhance the dissolution of Ca and Mg constituents and aid silica precipitation. Basic solutions aid the formation of solid Ca- and Mg-bearing carbonates. The challenge with this technology is the significant consumption of acids and bases. This technology involves multiple unit operations and the recovery of the reagents is challenging. Thus, there is a market need for technologies that directly utilize regenerable solvents and flue gas streams in fewer unit operations to produce value-added products with specific morphologies.

$CO_2$ capture from flue gas—Solvents, sorbents, or membranes are conventionally used to capture $CO_2$ from flue gas streams. In the case of solvents, changes in temperature (or temperature-swing) are used to recover high purity $CO_2$. In the case of solvents, temperatures in the range of 120-140° C. are typically needed to regenerate $CO_2$-loaded solvents. These solvent-based processes via thermal regeneration have been commercialized. Alternatively, the solvents can be regenerated chemically using salt solutions such as $CaCl_2$ and the resulting product is $CaCO_3$. Chemical regeneration of the solvent occurs at temperatures lower than 90° C., which is significantly lower than the temperatures needed for thermal regeneration. Given the high content of Ca or Mg in alkaline residues, these materials are well-suited for carbonate formation and solvent regeneration. However, the use of novel reactor systems that harness vortex flows to accelerate the regeneration of solvents and produce particles with morphological specificity has not been reported.

The hardware components and products and services that distinguish this technology are discussed below.

Hardware—The $TC^3$ reactor is designed to produce carbonate-bearing materials via the regeneration of amine or amino acid solvents (e.g., sodium glycinate). This system comprises a rotating inner cylinder and a fixed outer cylinder with two inlets—one for the $CO_2$-loaded solvent and another for the alkaline residues, and an outlet for the product stream. The chemical interactions between the $CO_2$-loaded solvent and the alkaline residues and the kinetics of carbonate formation are tuned by changing the rotation speed of the inner cylinder and the flow rates which influence the axial flow and mixing behavior. This reactor is customized to include pH probes and sample withdrawal ports to track the reaction progress. Temperature probes and sensors are incorporated. The pH and temperature sensing elements operate with simple, common electrical interfaces that are compatible with existing wired and wireless logging equipment and with integrated wireless solutions. The reactor configuration will be adapted based on the type of alkaline industrial residue being treated and the carbonates of interest. The service of determining the conversions and kinetics is also provided for customizing the reactor configuration.

Products and Services. As an integral part of the proposal, the $TC^3$ reactor prototypes will be used to begin the development of standard methods for producing a range of carbonate-bearing materials with specific particle sizes, along with the kinetics of regeneration of the $CO_2$-capture solvent. To produce high purity Ca- or Mg-carbonates, Ca and Mg can be extracted from the alkaline industrial residues using low pH solutions and supply these solutions to the $TC^3$ reactor. The particle size distributions of these materials will be determined and supplied to potential customers.

For companies that are interested in treating their waste on-site to produce value-added products, a scale-up analyses of the integrated $CO_2$ capture and $TC^3$ reactor configuration will be supplied. This reactor scheme can also be deployed for on-site processing of alkaline industrial residues. The chemical compositions of these residues can be characterized and the carbonate conversions and kinetics of solvent regeneration can be tested in the reactor. The long-term objective is to supply a range of carbonate-bearing products based on varying particle sizes and purity to meet specific market needs using the $TC^3$ reactor. This process is an alternative to energy intensive grinding or comminution processes for producing carbonates needed post-processing to obtain specific particle sizes. Thus, the energy demand and cost of synthesizing these carbonates is expected to be substantially lower compared to conventional grinding approaches. The knowledge gained during these laboratory experiments lays the foundation for a new class of processing routes for producing Ca- and Mg-carbonates and remediation services of alkaline industrial residues.

The hypothesis is that the VORTEX-$CO_2$ technology will need to be adapted for producing two types of materials: high purity Ca- and Mg-carbonates and particles with mixtures of carbonates and silica. To produce high purity Ca- or Mg-carbonates, Ca- or Mg-rich solutions obtained post-extraction from alkaline industrial residues, and the $CO_2$-loaded aqueous solvent such as sodium glycinate will be used. This setup involves liquid-liquid contacting resulting in the precipitation of high purity Ca- and Mg-carbonates. To directly convert alkaline industrial residues to Ca- and Mg-carbonates, uniformly ground alkaline residues will be contacted with the $CO_2$-loaded solvent, thus involving solid-liquid contacting and simultaneous dissolution of the residues and solid carbonate formation. Thus, there is a need to develop a calibrated understanding of the reactivities of the alkaline industrial residues as a function of the composition and morphology of these materials. This information is needed to inform the scale-up of the customized $TC^3$ reactor.

Design the $TC^3$ reactor—The goal is to develop a customized Taylor-Couette Carbonate Conversion ($TC^3$) reactor for producing Ca- or Mg-carbonates with uniform particle size distributions and regenerating the solvent. This T-C reactor system consists of two coaxial cylinders, with a rotating inner cylinder and fixed outer cylinder and inlets and outlets for continuous operation. FIG. 29 is a schematic representation of the T-C reactor. Flow driven by cylinder rotation results in azimuthal laminar flow and an axisymmetric cellular fluid motion. The destabilizing centrifugal force exceeds the stabilizing viscous force when the transition from purely azimuthal laminar flow to an axisymmetric cellular fluid motion occurs beyond a critical rotation speed. The critical Taylor number ($T_{ac}$) will be determined for the system comprising the $CO_2$-loaded solvent and Ca- or Mg-bearing species that determines the hydrodynamic instability and marks the Taylor-Couette flow (TCF) regime.

Uniformly spaced counter-rotating cellular vortices, with each pair forming an axial wave, is characterized by critical wavenumber ($a_c$) and wavelength ($\lambda_c$). The flow between the concentric cylinders is divided into cellular elements, each of which consists of counter-rotating vortices. Because these vortex pairs are usually equal in size, it is assumed that mixed fluid is uniformly distributed along the vortices, so that it spends identical residence time in each cellular element. Mathematical expressions representing the Taylor number and Axial Reynolds number are represented below.

$$\text{Taylor number: } T_a = \frac{2 \times r_i^2 \times d^4}{r_o^2 - r_i^2} \times \left(\frac{\Omega_i}{\nu}\right)^2 \quad (1)$$

$$\text{Axial Reynolds number: } R_{e_z} = \frac{Q}{\pi \times (r_i + r_o) \times \nu} \quad (2)$$

In these expressions, $r_i$, $r_o$, and d represent the inner radius, outer radius, and the differences in these radii. The angular velocity of the inner cylinder and the kinematic viscosity are represented by $\Omega_i$ and $\nu$, respectively. Q represents the axial flow rate of the inlet solution and is calculated as:

$$Q = \frac{\text{Volume flow rate}}{\text{Cross sectional area of the tube}}$$

The morphology of the particles is tuned based on the residence time in the reactor, which is controlled by the Axial Reynolds number $R_{e_z}$. To produce larger particles, more collisions are indeed which is achieved through a smaller $R_{e_z}$ by tuning the flow rate of the inlet solution, Q. Therefore, the T-C reactor provides direct access to the axial flow rate and angular velocity to tune the chemical interactions. These flow rates will be tuned to achieve fast kinetics and high conversions.

Figures 30A, 30B:
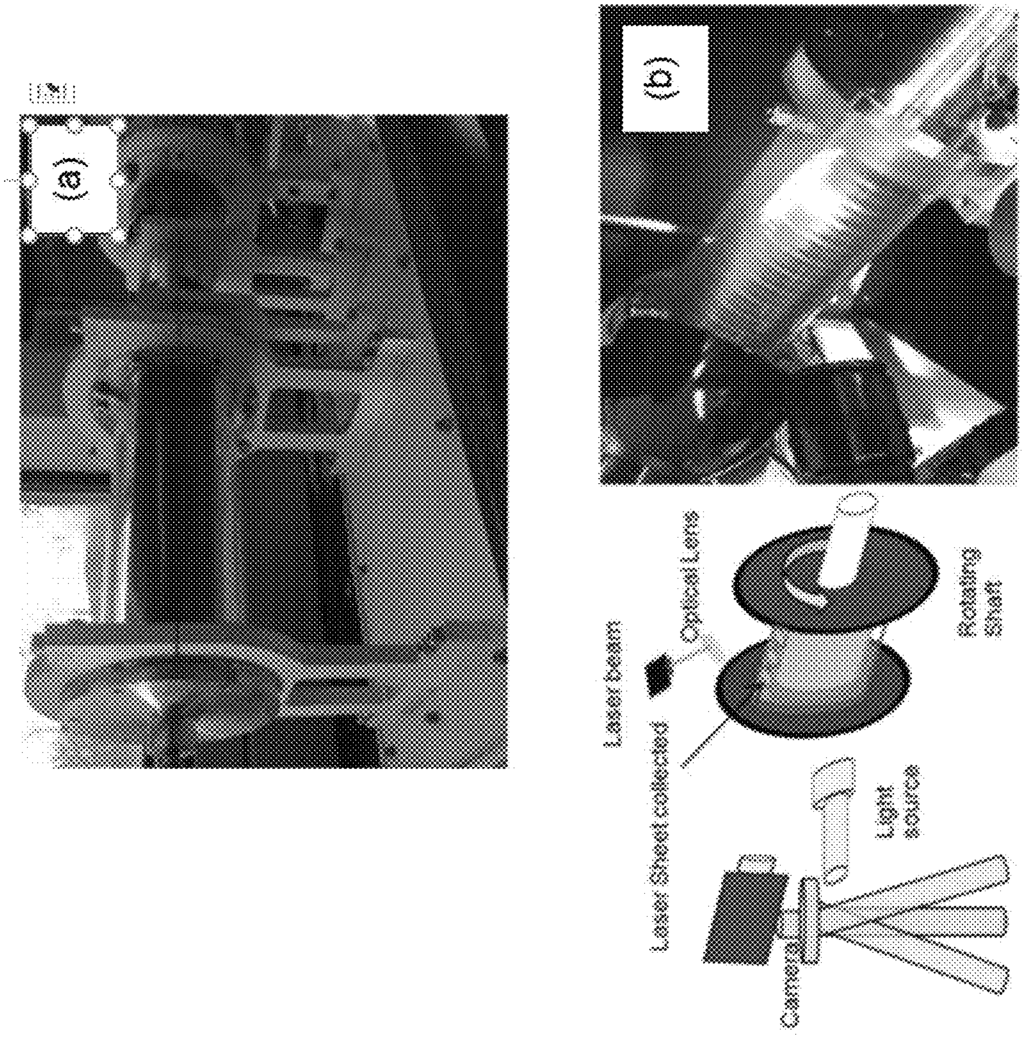
FIGS. 30A-30B shows a schematic representation of a Taylor-Couette reactor.

Important features of the $TC^3$ reactor—The laboratory-scale $TC^3$ reactor is designed specifically to have a pH probe, temperature controls, and sampling ports to evaluate changes in the composition. The ratio of the inner and outer radii and the gap between the inner and outer cylinders is tuned to achieve vortex flows. The inner cylinder rotation rate is controlled by a phase inverter, connected to a motor drive that provides rotation rates in the range of 30-1800 rpm. The reactor is operated in a horizontal configuration since significant changes in the interfacial area with increasing rotational speed are achieved in this configuration as opposed to a vertical configuration (FIG. 30A). The transition from laminar Taylor Couette flow to turbulent Taylor vortex flow are estimated from flow visualization experiments. The lab-scale prototype has inner and outer cylinder dimensions of 0.0227 m and 0.0253 m with the ratio of inner and outer radii of 0.9. The reactor length and volume are 0.3 m and 117 ml, respectively. This prototype reactor will be scaled up to meet the specific requirements of the customers.

The onset of Taylor-Couette vortex flows is determined from flow visualization (FIG. 30B). Light reflectance off specific particles is used to make the flow field visible. Pigmented titanium dioxide coated mica flakes (4×32 microns, 3.1 g/ml, from Kalliroscope Corporation) will be used. These particles align themselves with the local shear stress direction, and light reflectance off these particles will enhance the visibility of the flow field. The onset of instability is marked by alternating light and dark bands indicating the presence of counter-rotating Taylor vortices. To create an opaque and highly light scattering solution, the flakes were added to the fluids at a volume fraction of $2\times10^{-5}$. The observer incident light will be reflected back resulting in the white coloring of the local fluid, when the face of the mica flakes is oriented towards the observer. The spacing of each white fluid region corresponds to differences in the orientation of the flow-aligned mica particles, which characterize the shape and length of the formed vortices. Different flow regimes were identified via flow visualization using a high speed CCD video camera, which acquired and stored the images directly in 256 shades of gray. The on-board memory is sufficient for 3300 images, which can be captured at any rate up to 1000 Hz. To adjust image quality for different operating conditions, parameters, such as, exposure, image capturing rate (Hz), and movie playing speed (frames per second) were modified accordingly. Spectral image analysis is done through a procedure that is applied using a software written on the basis of Matlab. By applying a fast Fourier transform (FFT) algorithm to the intensity profile, a discrete Fourier transform is then adjusted to obtain $a_c$.

A plexi-glass outer cylinder of the $TC^3$ reactor will be used for visualization to determine the critical Taylor number, and machine ports for pH probes, temperature sensors, and periodic fluid sampling in the $TC^3$ reactor. Instead, the gap between the inner and outer cylinders is kept relatively small (i.e., ratio of inner cylinder radius to outer cylinder radius is 0.9) to increase the number of vortices and the axial flow. An absorber for $CO_2$ capture is used that will be connected to the $TC^3$ reactor.

Develop calibration methods for the $TC^3$ reactor—The aim is to develop calibration methods to ensure that the $TC^3$ reactor is functioning effectively. one calibration approach that involves the use of $Ca(OH)_2$ and $CO_2$ gas to produce nano-scale $CaCO_3$. This approach is described below.

Calcium hydroxide ($Ca(OH)_2$) at a concentration of 2.5 wt % is reacted with $CO_2$ gas in a T-C reactor to produce $CaCO_3$ as represented by this reaction: $Ca(OH)_2+CO_2 \rightarrow CaCO_3+H_2O$. The loading of 2.5 wt % is about 16 times its saturation solubility of $CaCO_3$. The resulting pH of the solution is 12 at the beginning of the experiment. The remaining $Ca(OH)_2$ remains suspended in this slurry. The initial temperature is maintained at 20° C. The inner walls of the reactor were carefully rinsed with dilute acetyl acid solutions and distilled water to minimize precipitation on the surfaces. A peristaltic pump is used to fill the reactor and pump fluid. The experiments are performed at gas flow rates of 0.5 L/min. A change in the pH from 12 to 7 is indicative of the completion of the reaction. When the $Ca(OH)_2$ phase is completely consumed, after which the pH reaches a steady-state of 6. pH is measured every 30 seconds. 60 ml of the final suspension is collected and centrifuged at 6500 rpm for 15 minutes to collect the nanoparticles.

The samples are washed once with deionized water, centrifuged once again at the same conditions and then dried at 110° C. for 1 hour to remove all remaining moisture, before characterizing the PCC product properties. The particle size distributions of the obtained PCC were determined using dynamic light scattering (DLS) measurements at $CO_2$ flowrates of 0.02 and 0.1 L/min.

Figures 31A, 31B:
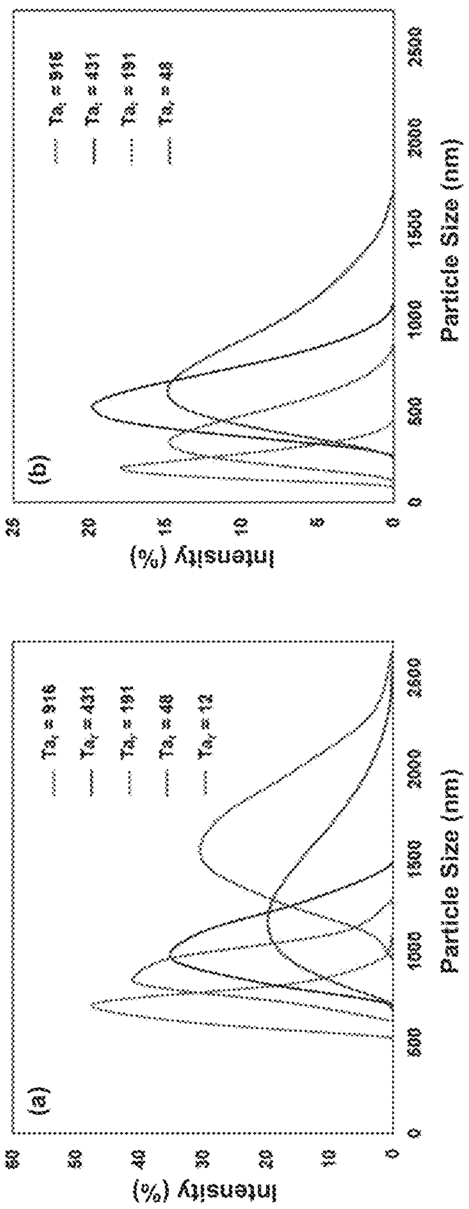
FIGS. 31A-31B show change in particle size distribution.

Preliminary data was collected to demonstrate the effectiveness of this approach in producing nano-scale $CaCO_3$ as shown in FIGS. 31A and 31B. The reduced Taylor number, Tar is the ratio of the actual Taylor number and the critical Taylor number. As shown in FIGS. 31A and 31B higher reduced Taylor numbers and $CO_2$ concentrations result in smaller particle sizes with narrower distributions. The fraction of monodispersed particles was observed to increase with higher rotation rates, especially when reaching fully developed turbulent Taylor vortex flow (TTVF). The ultrasonic treatment of the crystals minimized the potential for bimodality associated with tertiary agglomeration. This calibration approach will be expanded include a wider range of temperatures (25-90° C.), wider range of $Ca(OH)_2$ concentrations (2.5-15 wt %) and wider ranges of flow rates (0.02-5 L/min). In addition to $CO_2$ gas, a calibration approach will be developed using $CO_2$-loaded sodium glycinate and $Ca(OH)_2$ as a representative calibration base case.

Potential risks and mitigation strategy. Unanticipated effects of flow rates and rotation speeds resulting in non-uniform particle size distributions from one batch to another is a risk. During the calibration stage, the experimental bounds of flow rates, rotation speeds, and chemical compositions for producing uniform particle size distributions of carbonates will be determined.

Accelerate the kinetics of $CO_2$ capture and carbonate conversion using $TC^3$ reactor—The aim is to demonstrate the kinetic enhancement in carbonate conversions and solvent regeneration using the $TC^3$ reactor compared to conventional reactor systems. To realize this aim, the chemical compositions and morphologies of industrial and mining residues will be characterized protocols will be developed for preparing input feedstreams to either produce high purity Ca- or Mg-carbonates or particles with carbonates and silica, the kinetics of carbonate conversion will be determined, and process-scale, techno-economic, and life cycle assessments will be developed as discussed below.

Characterize the chemical compositions and morphologies of industrial and mining residues—Various alkaline industrial residues will be procured such as steel slag, coal fly ash, cement and lime kiln dust, and Mg-rich mining residues from the United States Geological Survey (see letter of support). Some naturally occurring Ca- and Mg-silicate minerals (e.g., $Mg_2SiO_4$, $CaSiO_3$, $MgSiO_3$) will be obtained that are abundant in these alkaline industrial residues for testing. The elemental composition of these materials will be determined using X-Ray Fluorescence (XRF). X-ray diffraction (XRD) measurements will be performed to determine the compositions of various crystalline phases such as oxides, hydroxides, or silicates of Ca, Mg, Na, or K present in these materials. The particle sizes will be determined using light scattering measurements. BET analyses will be performed to determine the pore size distributions and the surface areas of these materials. Commercially available pure precursors will be procured such as Ca- and Mg-oxides, hydroxides, and silicates for a systematic comparison.

Develop a strategy for producing pure carbonates and particles bearing carbonates and silica—To produce high purity carbonates (>95% $CaCO_3$ or $MgCO_3$ by molar mass), solutions rich in Ca- or Mg obtained from alkaline industrial residues will need to be used. To obtain Ca-rich solution, Ca-rich industrial residues such as coal fly ash or steel slag are dissolved in nitric acid. Mg-rich solutions are obtained by dissolving mining residues such as Mg-silicate bearing materials remaining after the extraction of Ni or Fe in nitric acid. These concentrations will be analyzed using ICP-AES. One important consideration is the abundance of iron co-present. Iron constituents will be separated by increasing the pH to 5-6 which causes the precipitation of iron oxide. The resulting Ca- or Mg-rich solution is used in the studies. To directly convert industrial residues such as coal fly ash and steel slag, these materials are ground to consistent particle sizes of 10-20 μm, which is known to result in high conversions. The goal is to develop alkaline input feed streams to produce high purity carbonates and particles with carbonate and silica constituents.

Figure 32:
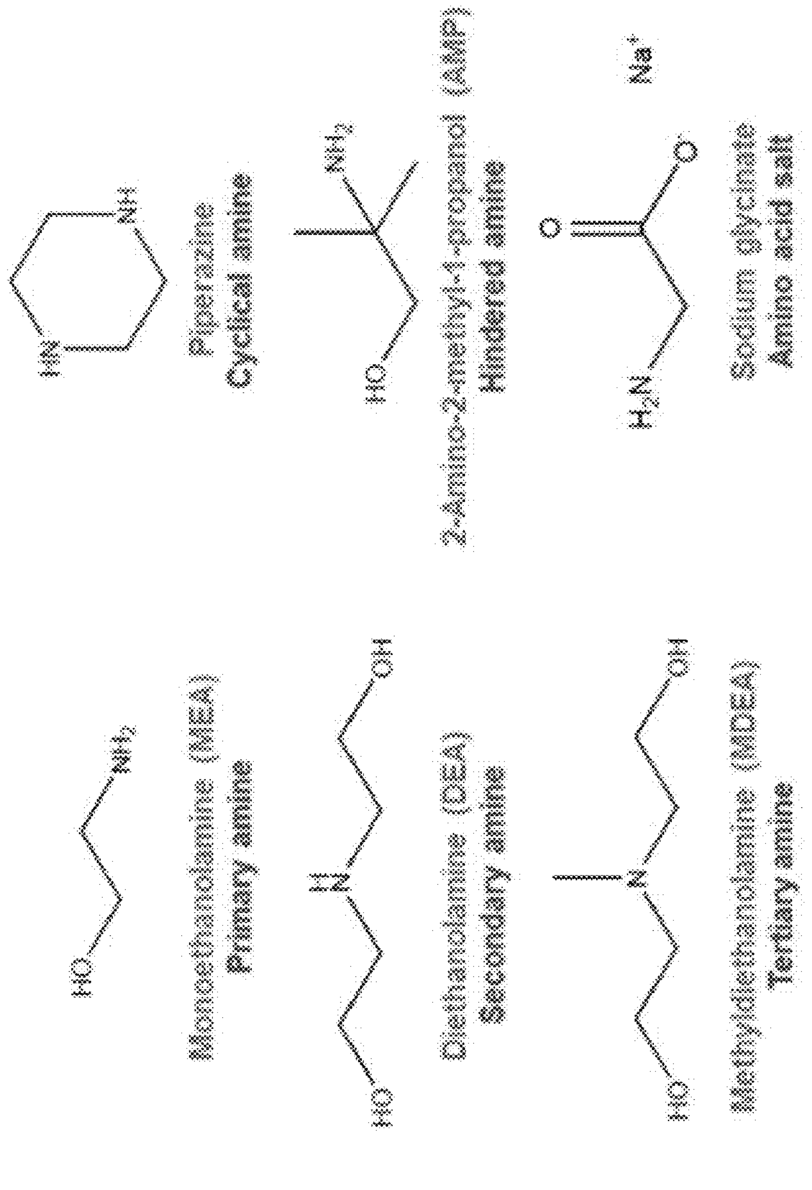
FIG. 32 shows chemical structures of aqueous solvents.

Determine the influence of solvent and alkaline industrial residues on $CO_2$ capture and carbonate conversion—The aim is to determine the kinetic enhancement in carbonate conversion and solvent regeneration using the $TC^3$ reactor. The hypothesis that higher carbonate yields and faster residence times are achieved using the $TC^3$ reactor compared to stirred reactors will be tested. The influence of various $CO_2$-loaded aqueous solvents such as sodium glycinate, monoethanoamine (MEA), diethanolamine (DEA), piperazine (PZ), 2-amino-2-methyl-1-propanol (AMP) and methyl diethanolamine (MDEA) on producing high carbonate yields in the $TC^3$ reactor (see FIG. 32 for the chemical structures) will be evaluated. These are some of the commonly studied solvents, and various blends incorporating this family of solvents has been recommended for $CO_2$ capture. The compositions of these amines in the range of 10-50 wt %, dissolved Ca- or Mg-rich solutions with concentrations ranging from 0.1-1M, and the ground alkaline industrial residues with slurry compositions of 5-50 wt % will be studied. The input streams that are prepared will be used in these studies. Select experiments will be performed using pure precursors such as the oxides, hydroxides and silicates of Ca and Mg for a consistent comparison. Alkaline industrial residues are often rich in silica which can limit reactivity. The hypothesis that turbulent vortex flows enhance fluid-solid contacting, thus resulting in more uniform particle size distributions will be tested.

The flow rates and rotation speeds that result in carbonate conversions >80% and faster residence times compared to conventional stirred systems will be determined. The hypothesis that these conversions will be achieved much faster in a $TC^3$ reactor and that the particle size distributions are more reproducible and uniform will be investigated. Concurrent experiments will be performed in a semi-batch stirred reactor to compare the kinetics and size distributions of these materials. The carbonate content will be determined using thermogravimetric analyses, and the solvent composition will be determined using quantitative ATR-FTIR and NMR measurements. The particle size distributions will be determined using laser diffraction and zeta sizer analyses. The goals is to quantify enhancement in kinetics of carbonate formation and solvent regeneration in the $TC^3$ reactor compared to stirred systems. The success metric is two-fold enhancement in the kinetics of carbonate formation and solvent regeneration in $TC^3$ reactor compared to conventional stirred reactor systems.

Slower kinetics and longer residence times compared to continuously stirred reactor systems are major risks. Entrainment and deposition of particles at the inlets or outlets and unanticipated chemical changes in these materials could be some of the causes. To delineate entrainment or deposition effects, flow visualization will be used. To probe the effects of unanticipated chemical changes, experiments will be performed with pure material precursors such as commercial oxides, hydroxides and silicates of Ca and Mg. If direct use of alkaline industrial residues is a challenge, Ca- and Mg-hydroxides will be produced and used.

Process-scale and techno-economic assessments, life cycle analyses, and scale-up strategies for commercializing the VORTEX-$CO_2$ technology—The aim is to develop process scale assessments for the VORTEX-$CO_2$ technology to capture and convert 1 ton of $CO_2$/day. The influence of $CO_2$-bearing flue gas streams with compositions ranging from 1-100 vol % will be evaluated. ASPEN Plus simulation software will be used to size the equipment based on the kinetic parameters determined from the disclosure. Appropriate models such as the electrolyte-NRTL property method will be utilized to account for thermodynamic behaviors in multiphase reaction environments. The sensitivity to process variables such as temperature, aqueous solvent chemistry, and slurry compositions on the sizes of the process units will be evaluated. The energy needs associated with operating the $TC^3$ reactor will be analyzed. These assessments will be connected to the cost of mineral processing and process scale evaluations. The overall net carbon that is captured and stored will be assessed using hybrid Economic Input-Output Life Cycle assessments. These insights will be used to determine if this technology can be commercialized through licensing, or if a plant will be built to convert alkaline industrial residues and $CO_2$ into value-added products. The commercial value of the end-products as shown in Table 4 will be evaluated. The tax incentives provided by the 45Q program will be considered when developing the commercial strategy in North America. The goal is determination of mass, energy flows and associated costs normalized to one ton of $CO_2$ captured. The success metric is identification of reaction parameters that result in cash positive (net estimated profits >$10/ton of $CO_2$ captured) and net carbon storage potential. Customers who will use the materials in the carbonate form, as opposed to regenerating $CO_2$ will be identified.

Figure 33:
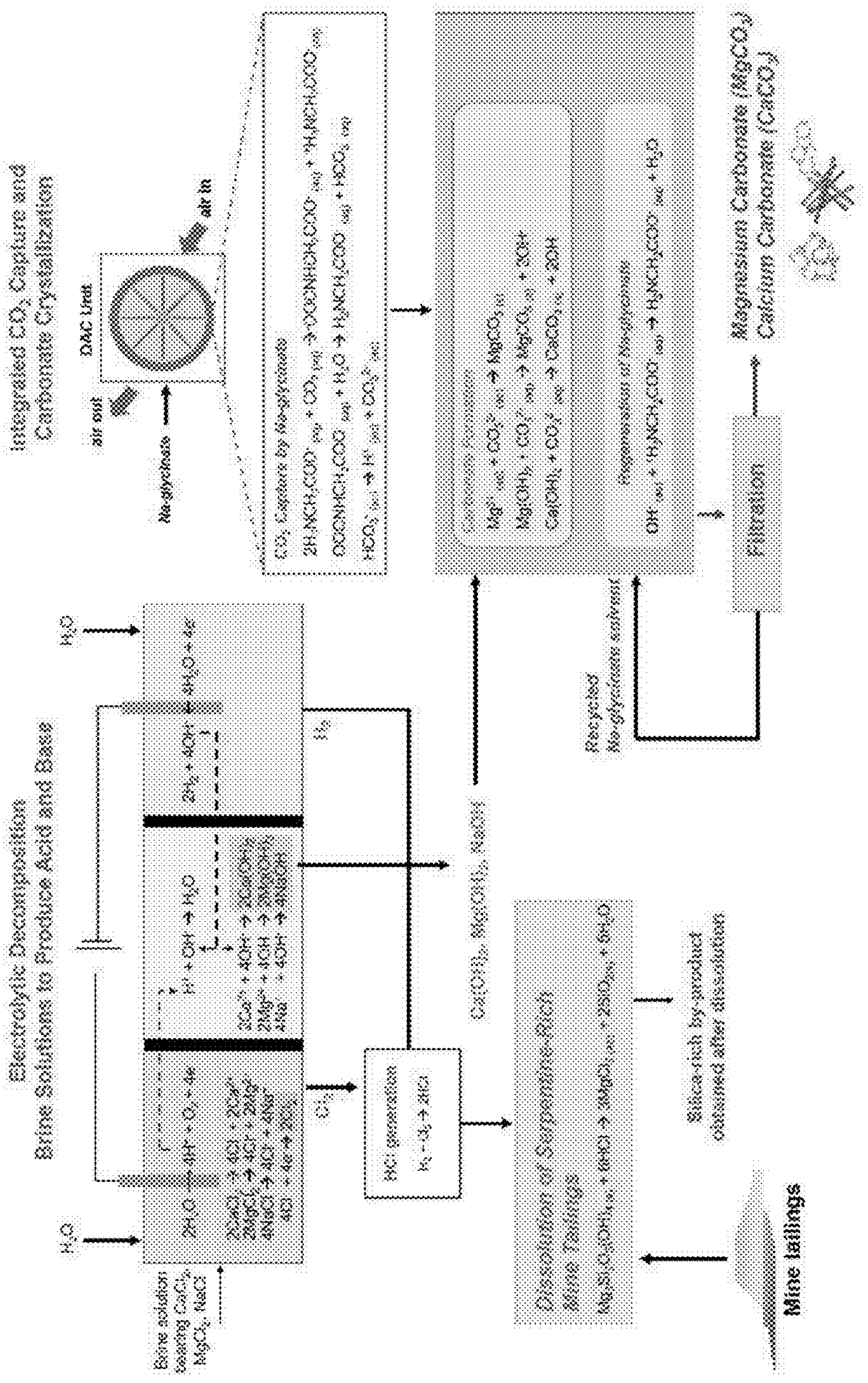
FIG. 33 is a schematic representation of acceleration carbon mineralization of mine tailings using $CO_2$ captured from air and the electrochemical generation of acids and based from chloride brines.

Example 10—Integrated Direct Air Capture and Removal Via Accelerated Carbon Mineralization Synergistically Using Alkaline Industrial Residues, Minerals or Mine Tailings and Chloride-Rich Brines The aim of this project is to accelerate carbon mineralization in remote locations with silicate minerals, industrial residues and mine-tailings (e.g., kimberlite tailings generated during diamond mining), where the lack of access to point-source emissions of $CO_2$ and processing water with low salt concentrations are current barriers to deployment. One of the less explored, but highly transformative routes to accelerate carbon mineralization is through hybrid absorption-crystallization pathways, in which $CO_2$ from air is captured by using regenerable, environmentally benign solvents, such as sodium glycinate. $CO_2$-loaded solvents react to produce magnesium carbonate, while regenerating the solvent. Simultaneously, acid (HCl) and bases (NaOH, Ca(OH)2, and Mg(OH)2) can be electrochemically produced from brines recovered from geological carbon storage in remote locations. The acids can then be used to accelerate the dissolution of the magnesium silicate minerals abundant in mine tailings, and the alkaline earth bases can be mineralized into Ca- and Mg-carbonates. In turn, the NaOH can be used to regenerate the sodium glycinate solvents. A schematic of the proposed concept is shown in FIG. 33.

This integrated process overcomes challenges associated with inadequate availability of concentrated point source emissions of $CO_2$ and processing water at mine tailings disposal sites. Modular and coupled technologies are needed to address these challenges, along with beneficiation of multiple waste streams such as industrial residues, brines and $CO_2$, producing value products to off-set processing costs (silica and precipitated carbonates), and potentially generating carbon credits or carbon off-sets for trading. With rising penetration of low-cost renewable electricity expected over the course of the next 5-10 years, economical scale-up of the electrochemical decomposition of brines will be increasingly favorable. The project is timely given recent evidence of the effectiveness of hybrid absorption-carbonate crystallization with inherent solvent (e.g., Na-glycinate) regeneration. Na-glycinate solvents have been proposed as an environmentally benign alternative, with comparable CO2 capture rates, to corrosive and thermally- or oxidatively-degrading amines, such as monoethanolamine. Another timely and less explored topic is the utilization of brines to produce acids and bases through modular electrochemical processes. Management of chloride-rich brines generated from industrial and mining processes and due to their displacement from deep saline aquifers for $CO_2$ injection and storage is another emerging societal challenge. Electrochemical strategies to utilize these brines are proposed which can be synergistically applied in other applications requiring brine treatment. Synergies in direct air capture of $CO_2$, recovery of value-added acids and bases from corrosive and low-value brines, and thermodynamically downhill carbon mineralization pathways are harnessed to create disruptive integrated technologies for accelerated $CO_2$ removal.

Example 11—Designing A Prototype Taylor-Couette Crystallizer for the Integrated and Low Temperature $CO_2$ Capture, Conversion and Storage to Produce Calcium Carbonate with Morphological and Structural Specificity Designing and translating energetically and atomistically efficient engineering solutions into practice is critical to address the grand societal challenge of producing energy and resources while reducing detrimental environmental impacts. Specifically, adaptive and modular systems are needed to curb the unabated emissions of greenhouse gases (e.g., $CO_2$) from wide ranging sources including $CO_2$ produced from anaerobic digestors, facilities producing cement, iron and steel, and coal- or natural gas-fired power plants. This perspective has led to address the question: How to design an adaptive device to accelerate the capture, conversion and storage of $CO_2$ from point source emissions via thermodynamically downhill pathways? Addressing this challenge requires demonstration of the scientific viability of the chemical pathways and the process for implementing these pathways. Towards this end, an Aqueous Alkaline Amine Looping (A3L) pathway was developed to simultaneously convert and store $CO_2$ as calcium carbonate ($CaCO_3$) at temperatures below 90° C. Liu & Gadikota, "Integrated $CO_2$ Capture, Conversion, and Storage To Produce Calcium Carbonate Using an Amine Looping Strategy," *Energy & Fuels* 33:1722-1733 (2018), which is hereby incorporated by reference in its entirety. Briefly, this pathway is based on initial findings that aqueous amines and amino acid-bearing solvents can capture $CO_2$ via absorption. The captured $CO_2$ in the aqueous phase reacts with the dissolved Ca-bearing species to precipitate $CaCO_3$, while chemically regenerating the solvent. The feasibility of this coupled reaction pathway was evident from the near complete conversion of alkaline precursors such as CaO to $CaCO_3$ at 50° C. with 30 wt % $CO_2$-loaded monoethanolamine (MEA) and a slurry reaction environment comprising 15 wt % solid in 3 hours. Liu & Gadikota, "Integrated $CO_2$ Capture, Conversion, and Storage To Produce Calcium Carbonate Using an Amine Looping Strategy," *Energy & Fuels* 33:1722-1733 (2018), which is hereby incorporated by reference in its entirety.

Figure 34:
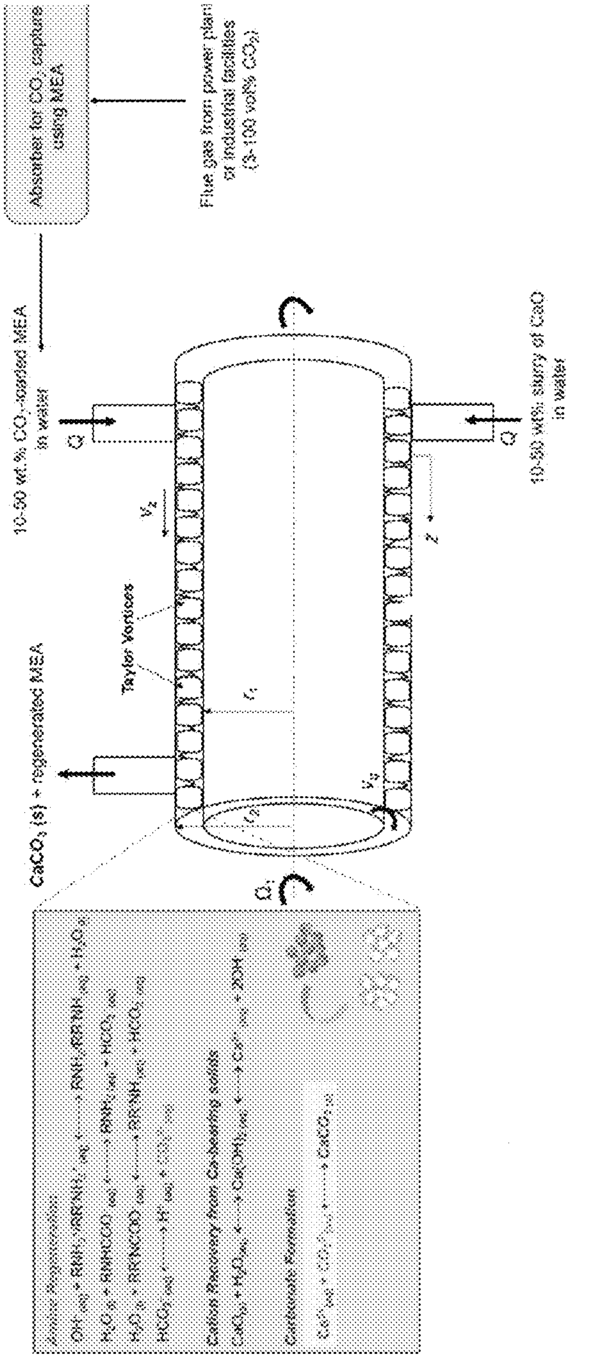
FIG. 34 shows a schematic representation of the Taylor-Couette device representing the inlet and outlet streams. The reactions associated with the dissolution of CaO species, reactions with $CO_2$-loaded amines to produce Ca-bearing carbonates.

Metastable phases such as aragonite and vaterite were co-present with stable phases such as calcite, and broader multi-modal particle size distributions were evident. This observed polymorphism and lack of morphological specificity challenge the use of these carbonates in real-world applications where single crystal phases with well-controlled morphologies are desired. The observed polymorphism is attributed to the non-uniform flow and concentration fields arising from mixing in batch reactor environments. Specifically, the concentration gradients and flow fields differ with distance from the impeller in a batch process. To address this challenge, achieving tunable controls on flow fields is essential. Prior work has established that consistent and controlled internal crystal structures and particle morphologies can be achieved by tuning vortex flows using Taylor-Couette (T-C) Crystallizers. Aljishi et al., "Effect of Flow Structure at the Onset of Instability on Barium Sulfate Precipitation in Taylor-Couette Crystallizers," *J. Cryst. Growth* 373:20-31 (2013) and Nguyen et al., "Multiple Feeding Strategy for Phase Transformation of GMP in Continuous Couette-Taylor Trystallizer," *Cryst. Growth Des.* 12:2780-2788 (2012), both of which are hereby incorporated by reference in their entirety. Briefly, T-C Crystallizers contain two concentric rotating cylinders with confined fluids. It has been scientifically proven that vortex flows arising from the onset of flow instabilities yield smaller unit cell dimensions with narrower and smaller crystal size distributions. Aljishi et al., "Effect of Flow Structure at the Onset of Instability on Barium Sulfate Precipitation in Taylor-Couette Crystallizers," *J. Cryst. Growth* 373:20-31 (2013) and Nguyen et al., "Multiple Feeding Strategy for Phase Transformation of GMP in Continuous Couette-Taylor Trystallizer," *Cryst. Growth Des.* 12:2780-2788 (2012), both of which are hereby incorporated by reference in their entirety. The feasibility of achieving tunable crystal structures and morphologies in barium sulfate crystals has been demonstrated. Aljishi et al., "Effect of Flow Structure at the Onset of Instability on Barium Sulfate Precipitation in Taylor-Couette Crystallizers," *J. Cryst. Growth* 373:20-31 (2013), which is hereby incorporated by reference in its entirety. Coupling the use of T-C Crystallizers with the Aqueous Alkaline Amine Looping (A3L) pathways will allow for development of a device with tunable flow controls to synthesize $CaCO_3$ with structural and morphological specificity while effectively regenerating the amine-bearing solvent (FIG. 34).

Extensive research efforts have led to the commercialization of $CO_2$ capture technologies such as the use of amine-bearing solvents in commercial scale operations in the Petra Nova, Quest and Boundary Dam projects. Mission Innovation, *Accelerating Breakthrough Innovation in Carbon Capture, Utilization, and Storage*, Houston, Texas, 2017, which is hereby incorporated by reference in its entirety. $CO_2$ capture and regeneration temperatures in these processes are 40-60° C. and 120-140° C., respectively. The captured $CO_2$ is injected and stored in underground geologic formations. To convert, store and use $CO_2$, Solidia Technologies has commercialized the use of $CO_2$ to cure cement by reacting with calcium silicate to produce a carbonate shell which binds the sand grains. U.S. Pat. No. 8,114,367, which is hereby incorporated by reference in its entirety. Only partial conversion of the silicate to carbonate is achieved using this route and this technology is specific to the cement industry. To date, there are no devices that integrate $CO_2$ capture with conversion and storage to produce carbonates with structural and morphological specificity and the inherent regeneration of the solvent media at a low temperature of ~50° C. by harnessing internal flow controls and without additional unit operations. The aim is to establish a continuous scalable manufacturing system to produce calcium carbonate with morphological and structural specificity at temperatures in the range of 25-75° C. and time scales to the order of minutes as opposed to hours. A functioning prototype of a T-C Crystallizer is designed and adapted to achieve this aim.

Design of Taylor-Couette (T-C) Crystallizer—A T-C Crystallizer is created to operate at temperatures in the range of 25° C.-75° C. The crystallizer with 100 ml volume is assembled and modified based on the previous design experiences. Temperature controls are newly equipped using the resistance heating mechanism. This crystallizer is designed to perform proof-of-principle tests with flow rates to the order of few ml/min and to produce calcium carbonate to the order of a few grams. The outcome is a prototype device to demonstrate proof-of-principle for accelerated $CO_2$ conversion and storage as $CaCO_3$.

Influence of aqueous chemistry and vortex flows on $CaCO_3$ structure and morphology—The influence of $CO_2$-loaded aqueous amine compositions (e.g., 10-50 wt. % monoethanolamine (MEA) in water) and slurry compositions of CaO (range from 10-50 wt % in water) at temperatures in the range of 25° C.-75° C. on $CaCO_3$ structure and morphology are investigated. Flow rates to the order of 50-100 ml/min are probed. As shown in FIG. 34, the inlet streams are not pre-mixed and instead enter through separate inlets. The influence of laminar and turbulent vortex flows on the structure and morphology of the carbonates are contrasted. The hypothesis that rapid mixing in the localized vortex flow fields reduces the unit cell dimensions and yields smaller and repeatable morphologies of calcium carbonates is tested. Cylinder rotation are varied from 100 rpm to 1,000 rpm representing laminar, vortex, and turbulent flows, respectively. The crystal structures of the carbonate-bearing products are determined using X-Ray Diffraction (XRD) and carbonate content using Thermogravimetric Analyses (TGA). BET measurements are performed for surface area and pore size analyses and the nano-scale morphologies are determined using Scanning and Transmission Electron Microscopy (SEM/TEM). XRD and SEM/TEM are available. TGA and BET measurements are performed. The results from these experiments are directly mapped to published data where batch reactor environments were used to investigate the efficacy of the aqueous alkaline amine looping process (Liu & Gadikota, "Integrated $CO_2$ Capture, Conversion, and Storage To Produce Calcium Carbonate Using an Amine Looping Strategy," *Energy & Fuels* 33:1722-1733 (2018), which is hereby incorporated by reference in its entirety) and $CaCO_3$ supersaturation. The outcome is to quantify chemical and flow regime controls on the structural and morphological features of $CaCO_3$.

Scale-up of Taylor-Couette (T-C) Crystallizer—Insights into the residence times, flow regimes and aqueous chemical compositions yielding stable $CaCO_3$ phases obtained are used to modify and test a scaled-up version of the T-C Crystallizer. The large scale T-C system is modified to handle flow rates to the order of 1 liter per min of solutions bearing $CaCO_3$. Scaling relationships are used to determine the flow velocities yielding turbulent and localized vortex flows to achieve the desired crystalline habits and particle sizes. The optimal aqueous chemical compositions identified will be considered when designing this system. The outcome is a bench-scale design of T-C Crystallizer optimized for $CaCO_3$ structure and morphology.

While the novel technology has been illustrated and described in detail in the figures and foregoing description, the same is to be considered as illustrative and not restrictive in character, it being understood that only the preferred embodiments have been shown and described and that all changes and modifications that come within the spirit of the novel technology are desired to be protected. As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A system for producing one or more solid inorganic carbonate compound or bicarbonate compound by capturing, converting, and storing carbon dioxide comprising: a carbon dioxide source; one or more precursor compound; one or more carbon dioxide capture solvent or capture additive; and one or more reactors, wherein said one or more precursor compound and said one or more carbon dioxide capture solvent or capture additive react in said reactor under conditions effective to produce one or more solid inorganic carbonate compound or inorganic bicarbonate compound, wherein the one or more reactors comprise a Taylor-Couette carbonate conversion reactor to provide vortex flows for producing the one or more solid inorganic carbonate compound or inorganic bicarbonate compound and to regenerate the one or more carbon dioxide capture solvent or capture additive via an in-situ chemical recycle.

2. The system of claim 1, wherein the one or more reactors comprises a first inlet, and said first inlet is positioned to accept carbon dioxide loaded capture solvent or capture additive.

3. The system of claim 1, wherein the one or more reactors comprises a second inlet, and said second inlet is positioned to accept one or more precursor compound.

4. The system of claim 1, wherein the one or more reactors comprises an outlet, and said outlet comprises an exit stream for said one or more solid inorganic carbonate compound.

5. The system of claim 1, wherein the one or more reactors comprises a rotating inner cylinder and a fixed outer cylinder, wherein rotation rate of the rotating inner cylinder is between about 30 rpm to about 1800 rpm.

6. The system of claim 1, wherein reacting said one or more precursor compound with said one or more carbon dioxide capture solvent or capture additive occurs for a period of time between about 1 hour to about 15 hours.

7. The system of claim 1, wherein the one or more reactors comprises a rotating inner cylinder and a fixed outer cylinder, and wherein the ratio of the inner and outer radii of the cylinder and the gap between the inner and outer cylinders are configured to achieve vortex flows, and wherein the cylinders function as a tubular reactor.

8. The system of claim 1, wherein the reacting said one or more precursor compound with said one or more carbon dioxide capture solvent or capture additive occurs at a gas flow rate between about 0.02 L/min to about 5 L/min.

9. The system of claim 1, wherein a concentration of said one or more precursor compound is between about 2.5 wt % to about 15 wt %.

10. The system of claim 1, wherein the system further comprises an absorber integrated with or fluidically connected to the Taylor-Couette carbonate conversion reactor, and wherein the absorber is configured to capture $CO_2$ by said one or more carbon dioxide capture solvents.

11. The system of claim 1, wherein the one or more solid inorganic carbonate compound has substantially uniform size distributions, and wherein a substantially uniform particle size is controlled and varies from a ten-nanometer scale to a micrometer scale by tuning and controlling a flow rate and a rotation rate of the reactor.

12. The system of claim 1, wherein the one or more reactors comprises a rotating inner cylinder and a fixed outer cylinder, wherein rotation of the rotating inner cylinder produces vortex flow between the rotating inner cylinder and the fixed outer cylinder.

13. The system of claim 1, wherein the one or more reactors comprises a rotating inner cylinder and a fixed outer cylinder, wherein rotation of the rotating inner cylinder produces uniformly spaced counter-rotating cellular vortices between the rotating inner cylinder and the fixed outer cylinder.

14. The system of claim 1, wherein said reacting occurs at a temperature of about 25° C.-75° C.

15. The system of claim 1, wherein said reacting occurs at a temperature of about 20-90° C.

16. The system of claim 1, comprising at least one of: one or more pH probe, one or more sample withdrawal port, and one or more temperature sensor.

17. The system of claim 1, wherein the one or more precursor compound comprises fly ash, steel slag, minerals, mine-tailings, industrial residues, or rocks.

18. The system of claim 1, wherein the one or more precursor compound comprises fly ash, steel slag, minerals, mine-tailings, industrial residues, or rocks, wherein the one or more precursor compound has a particle size between about 10 μm to about 20 μm.

19. The system of claim 1, wherein the one or more carbon dioxide capture solvent or capture additive comprises an amine selected from the group consisting of sodium glycinate, monoethanolamine, piperazine, diethanolamine, 2-amino-2-methyl-1-propanol, and methyldiethanolamine.

20. The system of claim 1, wherein the one or more carbon dioxide capture solvent or capture additive comprises an amine, wherein a concentration of the amine ranges from between about 0.1 M and about 2.0 M.

* * * * *